US011849877B2

(12) United States Patent
Richardson

(10) Patent No.: US 11,849,877 B2
(45) Date of Patent: Dec. 26, 2023

(54) PORTABLE COFFEE BREWING SYSTEM

(71) Applicant: Brett C. Richardson, Green Bay, WI (US)

(72) Inventor: Brett C. Richardson, Green Bay, WI (US)

(73) Assignee: Adrian Rivera Maynez Enterprises, Inc., La Mirada, CA (US)

(*) Notice: Subject to any disclaimer, the term of this patent is extended or adjusted under 35 U.S.C. 154(b) by 81 days.

(21) Appl. No.: 17/564,756

(22) Filed: Dec. 29, 2021

(65) Prior Publication Data

US 2022/0125234 A1    Apr. 28, 2022

Related U.S. Application Data

(63) Continuation-in-part of application No. 16/290,121, filed on Mar. 1, 2019, now Pat. No. 11,246,445, which is a continuation-in-part of application No. 15/979,895, filed on May 15, 2018, now Pat. No. 10,219,647, which is a continuation-in-part of application No. 15/660,504, filed on Jul. 26, 2017, now Pat. No. 10,231,568, which is a continuation of application No. 15/246,598, filed on Aug. 25, 2016, now Pat. No. 9,743,797, which is a continuation-in-part of application No. 14/585,317, filed on Dec. 30, 2014, now Pat. No. 9,743,796.

(60) Provisional application No. 63/134,470, filed on Jan. 6, 2021, provisional application No. 61/922,239, filed on Dec. 31, 2013.

(51) Int. Cl.
*A47J 31/00* (2006.01)
*A23F 5/26* (2006.01)
*A47J 31/057* (2006.01)
*A47J 31/06* (2006.01)

(52) U.S. Cl.
CPC ............... *A47J 31/005* (2013.01); *A23F 5/26* (2013.01); *A47J 31/0576* (2013.01); *A47J 31/0626* (2013.01)

(58) Field of Classification Search
CPC ......... A23F 5/262; A23F 5/26; A47J 31/0626; A47J 31/0576; A47J 31/005
USPC ....................................................... 99/302 R
See application file for complete search history.

(56) References Cited

U.S. PATENT DOCUMENTS

| X834430 | 10/1906 | Wightman et al. |
| 2,350,335 A | 6/1944 | Baker |

(Continued)

FOREIGN PATENT DOCUMENTS

| CA | 2989054 A1 | 12/2016 |
| CN | 206314985 U | 7/2017 |

(Continued)

*Primary Examiner* — Eric S Stapleton
(74) *Attorney, Agent, or Firm* — IP Strategies

(57) ABSTRACT

A portable coffee brewing system includes a container, a lid assembly, a pump positioned within a hollow interior of lid assemble, a basket configured to hold an amount of coffee grounds and a tube fluidically connecting the pump to the basket. The lid assembly is connected adjacent the upper end of the container. The tube has an upper end of the tube fluidically connected to the pump and a lower end fluidically connected to the basket. When activated, the pump moves fluid via the tube to cause liquid in the hollow interior of the container to be moved through the amount of coffee grounds in the hollow interior of the basket thereby brewing coffee.

35 Claims, 59 Drawing Sheets

(56) References Cited

U.S. PATENT DOCUMENTS

| | | | |
|---|---|---|---|
| 2,570,997 A | 10/1951 | Willman | |
| 2,878,746 A | 3/1959 | Schwinger | |
| 3,181,951 A | 5/1965 | Gronvold | |
| 3,396,654 A | 8/1968 | Folke | |
| 3,469,522 A | 9/1969 | Prosen | |
| 3,568,589 A | 3/1971 | Robau | |
| 4,825,759 A | 5/1989 | Grome et al. | |
| 5,868,062 A | 2/1999 | Enomoto | |
| 6,250,208 B1 * | 6/2001 | Helps | A47J 31/0615 99/305 |
| 7,798,373 B1 * | 9/2010 | Wroblewski | B05B 11/00 222/401 |
| 8,096,230 B2 | 1/2012 | Levin | |
| 9,743,797 B2 | 8/2017 | Richardson | |
| 10,219,647 B2 * | 3/2019 | Richardson | A47J 31/057 |
| 10,258,185 B2 | 4/2019 | Hyman et al. | |
| 10,980,369 B2 | 4/2021 | Glucksman | |
| 11,246,445 B2 * | 2/2022 | Richardson | A23F 5/262 |
| 11,559,166 B2 | 1/2023 | Grosman et al. | |
| 2002/0029694 A1 | 3/2002 | Wong | |
| 2004/0055472 A1 * | 3/2004 | Stoner | A47J 31/4478 99/302 R |
| 2004/0055473 A1 * | 3/2004 | Stoner | A47J 31/4467 99/295 |
| 2009/0050834 A1 * | 2/2009 | Boise | A63H 27/10 251/320 |
| 2009/0050835 A1 * | 2/2009 | Boise | A63H 27/10 251/320 |
| 2009/0246341 A1 | 10/2009 | Pitner et al. | |
| 2010/0282089 A1 * | 11/2010 | Boussemart | A47J 27/21 99/281 |
| 2011/0072979 A1 * | 3/2011 | Fogg, IV | A47J 36/2466 99/302 R |
| 2012/0269025 A1 | 10/2012 | Liu | |
| 2015/0000533 A1 | 1/2015 | Ha et al. | |
| 2015/0027315 A1 | 1/2015 | Lussi et al. | |
| 2015/0068404 A1 | 3/2015 | Rivera | |
| 2016/0360917 A1 * | 12/2016 | Richardson | A47J 31/005 |
| 2017/0290354 A1 | 10/2017 | Pabst et al. | |
| 2018/0116444 A1 | 5/2018 | Rivera | |
| 2018/0263403 A1 * | 9/2018 | Richardson | A47J 31/005 |
| 2018/0368612 A1 | 12/2018 | Stein | |
| 2019/0191913 A1 | 6/2019 | Richardson | |
| 2020/0054161 A1 | 2/2020 | Zhu | |
| 2021/0219766 A1 | 7/2021 | Glucksman | |
| 2022/0125234 A1 * | 4/2022 | Richardson | A23F 5/262 |

FOREIGN PATENT DOCUMENTS

| | | |
|---|---|---|
| CN | 206403624 U | 8/2017 |
| CN | 107788844 A | 3/2018 |
| CN | 108158401 A | 6/2018 |
| CN | 109528005 A | 3/2019 |
| CN | 206560336 U | 10/2023 |
| WO | 2012090126 A1 | 7/2012 |
| WO | 2012160482 A1 | 11/2012 |
| WO | 2010041003 A1 | 4/2017 |
| WO | 2018119162 A1 | 6/2018 |
| WO | 2018148828 A1 | 8/2018 |

* cited by examiner

PORTABLE COFFEE BREWING SYSTEM

CROSS REFERENCE TO RELATED APPLICATIONS

This application is a continuation-in-part of U.S. patent application Ser. No. 16/290,121 which was filed on Mar. 1, 2019, which was a continuation-in-part of U.S. patent application Ser. No. 15/979,895 which was filed on May 15, 2018, which was a continuation-in-part of U.S. patent application Ser. No. 15/660,504 which was filed on Jul. 26, 2017, which was a continuation of U.S. patent application Ser. No. 15/246,598 which was filed on Aug. 25, 2016, which was a continuation-in-part of U.S. patent application Ser. No. 14/585,317 filed on Dec. 30, 2014, which claims the benefit of U.S. Provisional Application No. 61/922,239 filed Dec. 31, 2013.

This application also claims the benefit of U.S. Provisional Application No. 63/134,470 filed Jan. 6, 2021.

FIELD OF THE DISCLOSURE

This disclosure relates to coffee brewing. More specifically, and without limitation, this disclosure relates to a portable coffee brewing system.

OVERVIEW OF THE DISCLOSURE

Coffee brewing is old and well known in the art. Initially, coffee was brewed by mixing ground coffee beans with water in a pot or other vessel which was placed over a source of heat. As the water warmed, the ground beans released flavors into the water, thereby forming what is known as coffee. Once this process was completed, the coffee grounds were separated from the coffee and the coffee was consumed.

With the advent and mass adoption of electricity, the technology of coffee brewing took a major leap forward. With the use of electricity, countless forms and designs of coffee machines or coffee makers (hereinafter "coffee makers") were developed. Manufacturers of these coffee makers include Cuisinart, Mr. Coffee, Hamilton Beach, Kitchen Aid, Bunn and countless others. Conventionally these devices include a base, an internal heating element which is connected to a source of electricity, a reservoir for holding water, a pot to receive the coffee and a coffee grounds holding device to hold the coffee grounds. Typically, these devices are designed to sit on a counter top and be used in a kitchen in a stationary and non-portable manner. As such, these conventional coffee makers are often bulky and are formed of multiple pieces and therefore these devices are not easily portable.

Understanding that conventional coffee makers are generally non-portable, yet many coffee drinkers like to take their coffee with them in the morning to work or to run errands, some manufacturers developed what are commonly known as personal coffee makers. These personal coffee makers are designed to make a single serving of coffee that can be poured into a to-go cup or travel mug. Some of these personal coffee makers are even designed to pour directly into the cup or travel mug, thereby avoiding the additional step of having to pour the coffee from the pot into the cup or travel mug. While these personal coffee makers have made it somewhat easier for someone to take coffee with them on the go, these personal coffee makers themselves are no more portable than conventional coffee makers.

Therefore, for the reasons stated above, and for other reasons stated below, which will become apparent to those skilled in the art upon reading and understanding the specification, and the drawings, there is a need in the art for a portable coffee brewing system.

Thus, it is a primary object of the disclosure to provide a portable coffee brewing system that improves upon the state of the art.

Another object of the disclosure to provide a portable coffee brewing system that is easy to use.

Yet another object of the disclosure to provide a portable coffee brewing system that brews a pleasing and high quality cup of coffee.

Another object of the disclosure to provide a portable coffee brewing system that is inexpensive to manufacture.

Yet another object of the disclosure to provide a portable coffee brewing system that has an intuitive design.

Another object of the disclosure to provide a portable coffee brewing system that has a robust and durable design.

Yet another object of the disclosure to provide a portable coffee brewing system that has a long and useful life.

Another object of the disclosure to provide a portable coffee brewing system that has a simple and ergonomic design.

Yet another object of the disclosure to provide a portable coffee brewing system that allows a user to make a fresh cup of coffee whenever and wherever they so desire.

Another object of the disclosure to provide a portable coffee brewing system that allows a user to load the device with water and coffee grounds at one time and one place while allowing for brewing of the coffee at another time and another place.

Another object of the disclosure to provide a portable coffee brewing system that uses what are known as K-cups.

Yet another object of the disclosure to provide a portable coffee brewing system that has an appealing design.

Another object of the disclosure to provide a portable coffee brewing system that is safe to use.

Yet another object of the disclosure to provide a portable coffee brewing system that is easy to clean.

Another object of the disclosure to provide a portable coffee brewing system that does not leak.

Yet another object of the disclosure to provide a portable coffee brewing system that uses disposable coffee grounds holding devices.

Another object of the disclosure is to provide a portable coffee brewing system that is sealed and does not spill or leak in transport.

Yet another object of the disclosure is to provide a portable coffee brewing system capable of recirculating fluid.

Another object of the disclosure is to provide a portable coffee brewing system that can accommodate a K-cup.

Yet another object of the disclosure is to provide a portable coffee brewing system that consumes little to no power.

Another object of the disclosure is to provide a portable coffee brewing system that can operate on a timer.

Yet another object of the disclosure is to provide a portable coffee brewing system that facilitates cold brewing.

Another object of the disclosure is to provide a portable coffee brewing system that required little maintenance.

These and other objects, features, or advantages of the disclosure will become apparent from the specification, drawings and claims.

BRIEF SUMMARY OF THE DISCLOSURE

A portable coffee brewing system includes a container, a lid assembly, a pump positioned within a hollow interior of lid assemble, a basket configured to hold an amount of coffee grounds and a tube fluidically connecting the pump to the basket. The lid assembly is connected adjacent the upper end of the container. The tube has an upper end of the tube fluidically connected to the pump and a lower end fluidically connected to the basket. When activated, the pump moves fluid via the tube to cause liquid in the hollow interior of the container to be moved through the amount of coffee grounds in the hollow interior of the basket thereby brewing coffee. In one or more arrangements, pump alternates between drawing air out from upper end of tube pushing air into upper end of tube. When air is drawn out from tube, lower pressure in tube draws liquid in container into basket, through coffee grounds, and into lower end of the tube. Conversely, when air is pushed into tube, higher pressure in tube pushes liquid back in the opposite direction into hollow interior of the container. In this manner, liquid is moved back and forth through coffee grounds during the brew process.

BRIEF DESCRIPTION OF THE DRAWINGS

FIG. 30 is an elevation section view of the portable coffee brewing system shown in FIGS. 24-29, the section view along line AA shown in FIG. 24;

DETAILED DESCRIPTION OF THE DISCLOSURE

Figure 1:
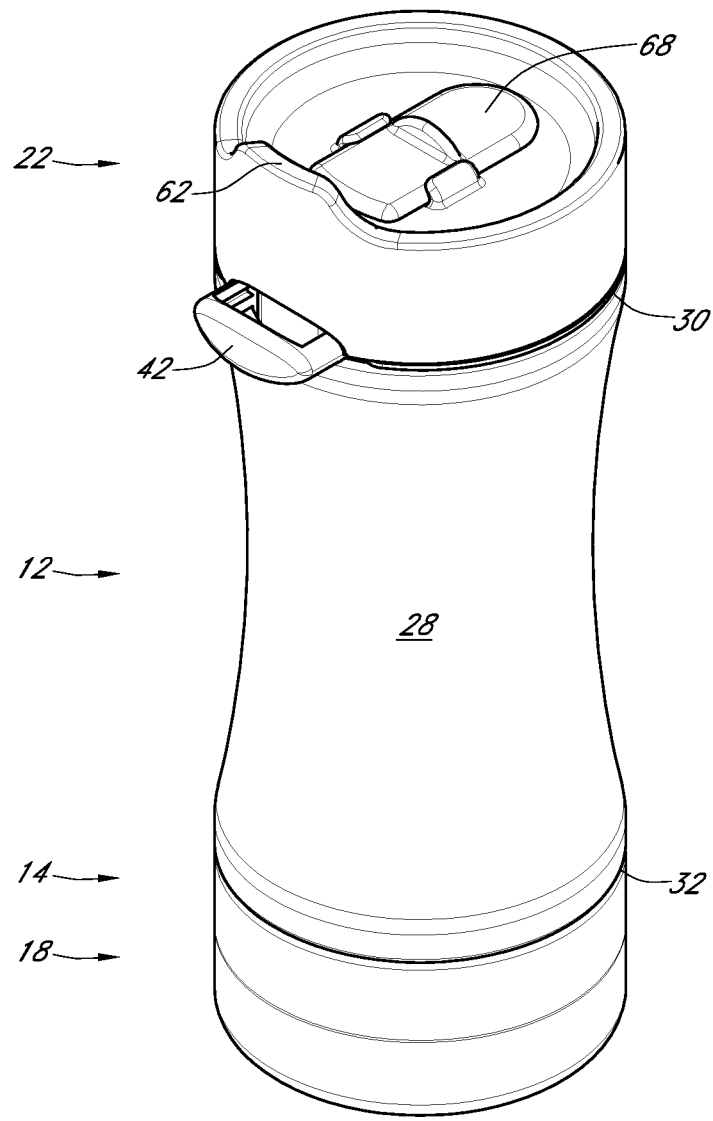
FIG. 1 is a perspective view of a portable coffee brewing system with the lid in a closed position.
Figure 2:
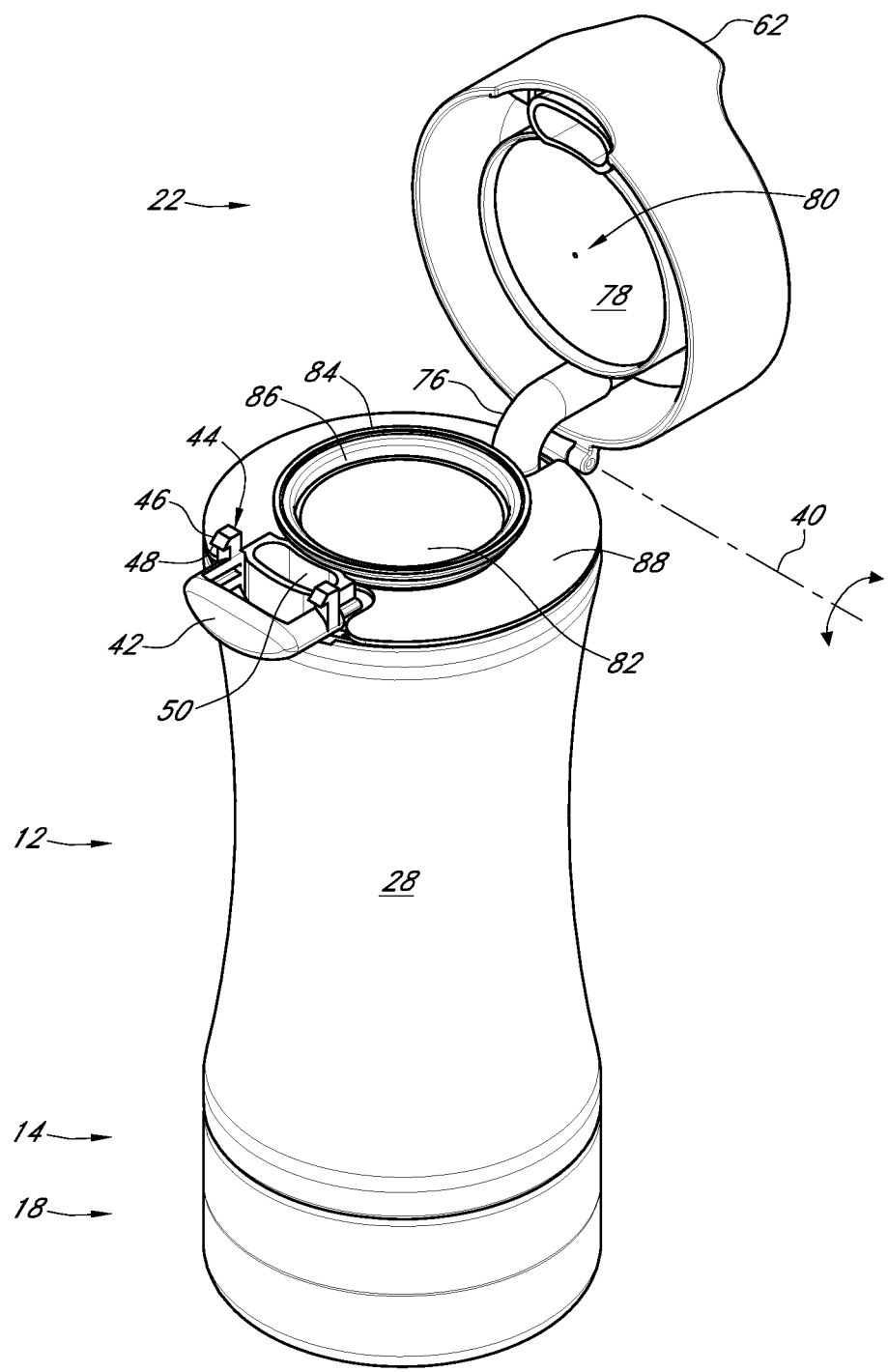
FIG. 2 is a perspective view of a portable coffee brewing system with the lid in an open position showing the K-cup holder or insert.

In the following detailed description of the embodiments, reference is made to the accompanying drawings which form a part hereof, and in which is shown by way of illustration specific embodiments in which the disclosure may be practiced. The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure. It will be understood by those skilled in the art that various changes in form and details may be made without departing from the principles and scope of the invention. It is intended to cover various modifications and similar arrangements and procedures, and the scope of the appended claims therefore should be accorded the broadest interpretation so as to encompass all such modifications and similar arrangements and procedures. For instance, although aspects and features may be illustrated in or described with reference to certain figures or embodiments, it will be appreciated that features from one figure or embodiment may be combined with features of another figure or embodiment even though the combination is not explicitly shown or explicitly described as a combination. In the depicted embodiments, like reference numbers refer to like elements throughout the various drawings.

It should be understood that any advantages and/or improvements discussed herein may not be provided by various disclosed embodiments, or implementations thereof. The contemplated embodiments are not so limited and should not be interpreted as being restricted to embodiments which provide such advantages or improvements. Similarly, it should be understood that various embodiments may not address all or any objects of the disclosure or objects of the invention that may be described herein. The contemplated embodiments are not so limited and should not be interpreted as being restricted to embodiments which address such objects of the disclosure or invention. Furthermore, although some disclosed embodiments may be described relative to specific materials, embodiments are not limited to the specific materials or apparatuses but only to their specific characteristics and capabilities and other materials and apparatuses can be substituted as is well understood by those skilled in the art in view of the present disclosure.

It is to be understood that the terms such as "left, right, top, bottom, front, back, side, height, length, width, upper, lower, interior, exterior, inner, outer, and the like as may be used herein, merely describe points of reference and do not limit the present invention to any particular orientation or configuration.

As used herein, "and/or" includes all combinations of one or more of the associated listed items, such that "A and/or B" includes "A but not B," "B but not A," and "A as well as B," unless it is clearly indicated that only a single item, subgroup of items, or all items are present. The use of "etc." is defined as "et cetera" and indicates the inclusion of all other elements belonging to the same group of the preceding items, in any "and/or" combination(s).

As used herein, the singular forms "a," "an," and "the" are intended to include both the singular and plural forms, unless the language explicitly indicates otherwise. Indefinite articles like "a" and "an" introduce or refer to any modified term, both previously-introduced and not, while definite articles like "the" refer to a same previously-introduced term; as such, it is understood that "a" or "an" modify items that are permitted to be previously-introduced or new, while definite articles modify an item that is the same as immediately previously presented. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof, unless expressly indicated otherwise. For example, if an embodiment of a system is described as comprising an article, it is understood the system is not limited to a single instance of the article unless expressly indicated otherwise, even if elsewhere another embodiment of the system is described as comprising a plurality of articles.

It will be understood that when an element is referred to as being "connected," "coupled," "mated," "attached," "fixed," etc. to another element, it can be directly connected to the other element, and/or intervening elements may be present. In contrast, when an element is referred to as being "directly connected," "directly coupled," "directly engaged" etc. to another element, there are no intervening elements present. Other words used to describe the relationship between elements should be interpreted in a like fashion (e.g., "between" versus "directly between," "adjacent" versus "directly adjacent," "engaged" versus "directly engaged," etc.). Similarly, a term such as "operatively", such as when used as "operatively connected" or "operatively engaged" is to be interpreted as connected or engaged, respectively, in any manner that facilitates operation, which may include being directly connected, indirectly connected, electronically connected, wirelessly connected or connected by any other manner, method or means that facilitates desired operation. Similarly, a term such as "communicatively connected" includes all variations of information exchange and routing between two electronic devices, including intermediary devices, networks, etc., connected wirelessly or not. Similarly, "connected" or other similar language particularly for electronic components is intended to mean connected by any means, either directly or indirectly, wired and/or wirelessly, such that electricity and/or information may be transmitted between the components.

It will be understood that, although the ordinal terms "first," "second," etc. may be used herein to describe various elements, these elements should not be limited to any order by these terms unless specifically stated as such. These terms are used only to distinguish one element from another; where there are "second" or higher ordinals, there merely must be a number of elements, without necessarily any difference or other relationship. For example, a first element could be termed a second element, and, similarly, a second element could be termed a first element, without departing from the scope of example embodiments or methods.

Similarly, the structures and operations discussed herein may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, to provide looping or other series of operations aside from single operations described below. It should be presumed that any embodiment or method having features and functionality described below, in any workable combination, falls within the scope of example embodiments.

As used herein, various disclosed embodiments may be primarily described in the context of brewing coffee, the embodiments are not so limited. It is appreciated that the embodiments may be adapted for use in preparing and/or consuming other hot or cold beverages such as tea, apple cider, hot chocolate, or any other beverage. The system is merely shown and described as being used in in the context of brewing coffee for ease of description and as one of countless examples.

A portable coffee brewing system 10 is presented in the figures. The system 10 includes a container 12, a heating element housing 14 that holds a heating element 16, an electrical components housing 18 that holds electrical components 20, a lid 22, a holder or insert 24, and a coffee grounds holding device 26.

Container: Container 12 is formed of any suitable size, shape and design and is any form of a liquid holding vessel such as a cup, a mug, a travel mug, a thermal mug, or the like. In one arrangement, as is shown, container 12 includes a sidewall 28 that extends in a generally circular manner from an upper end 30 to a lower end 32.

Sidewall 28 connects at or near its lower end 32 to bottom wall 34 that defines the bottom of the hollow interior 36 formed by container 12. Sidewall 28 terminates in an open upper end to which lid 22 is connected.

In one arrangement, sidewall 28 includes connecting features, such as threads, snap-fit-features, grooves or the like, adjacent either the interior surface or exterior surface of the open upper end 30 of sidewall 28. These connecting features are used for connecting lid 22 to container 12 in a manner that allows lid 22 to be opened if not removed entirely.

In one arrangement, as is shown, lid 22 connects to container 12 by hinge 38. In the arrangement shown, hinge 38 is positioned in the rearward upper end of sidewall 28. Lid 22 pivots upon hinge 38 between an open position and a closed position around axis 40 that extends through the center of hinge 38.

In one arrangement, as is shown, a button 42 is positioned at or near the upper end 30 of sidewall 28, on the opposite side of container from opposite hinge 38. Button 42 is formed of any suitable size, shape and design and is used to hold lid 22 in a closed position as well as release lid 22 to an open position. Button 42 slides laterally a distance toward and away from the center of container 12 and is urged forward by a biasing member (not shown) such as a spring, compressible piece of material or a flexible member, so as to hold lid 22 in a closed position.

In the arrangement shown, button 42 includes a pair of latching arms 44, one on either side of button 42, the latching arms 44 each having a rounded or angled upper surface 46 that connects to a generally flat bottom surface 48 or locking surface. These latching arms 44 engage and connect to mating features in the underside of lid 22.

As the lid 22 is lowered, the bottom surface of lid 22 engages the rounded or angled surfaces 46 of latching arms 44 which causes the button 42 to move rearward against the force of biasing member and towards the center of container 12. This movement continues until the rounded or angled surface 46 of latching arms 44 pass the mating feature of lid 22, at which point the biasing member forces the button 42 forward as the flat or locking surfaces 48 of latching arms 44 engage and hold onto the lid 22 thereby locking the lid 22 in a closed position.

Button 42 is positioned in front of and/or around a pour spout 50 connected to container 12. Pour spout 50 is formed of any suitable size, shape and design. In the arrangement shown, as one example, pour spout 50 is connected to the interior surface of sidewall 28 adjacent its upper end 30 opposite hinge 38. Pour spout 50 provides fluid communication from the hollow interior 36 of container 12 to lid 22.

Container 12 includes a lip 52. Lip 52 is formed of any suitable size, shape and design. In one arrangement, as is shown, lip 52 extends around the interior surface of sidewall 28 and extends inward therefrom a distance. Lip 52 is recessed a distance below the upper end 30 of sidewall 28.

Container 12 also includes a drip tube 54. Drip tube 54 is formed of any suitable size, shape and design. In one arrangement, as is shown, drip tube 54 is a generally circular tube that extends from below the bottom wall 34 to at or near the upper end 30 of sidewall 28. In one arrangement, drip tube 54 is connected to, positioned within sidewall 28 of container 12. In this arrangement, where drip tube 54 is a separate piece from container 12, drip tube 54 is removable so as to allow cleaning or replacement of drip tube 54. Alternatively, drip tube 54 is formed on or in sidewall 28 as part of sidewall 28.

The lower end of drip tube 54 fluidly connects to heating element 16, either directly or by way of connection to one or more other components. The upper end of drip tube 54 fluidly connects to lid 22, either directly or by way of connection to one or more other components. In this way, drip tube 54 provides a fluid conduit from below bottom wall 34 to lid 22.

Container 12 also includes a drain 56. Drain 56 is formed of any suitable size, shape and design. In one arrangement, as is shown, drain 56 is positioned within bottom wall 34 and provides a fluid passageway from the hollow interior 36 of container 12 to the heating element 16. In one arrangement, the drain 56 is centrally positioned in the bottom wall 34 so as to allow the heating element container 14 to be screwed onto the lower end 32 of container 12 in a removable and replaceable fashion. Alternatively, as in the arrangement shown, drain 56 is positioned in an off-center arrangement.

Drain 56 includes a filter or screen 58 that covers the drain 56 and prevents particles, such as coffee grinds, from entering drain 56 and plugging it. Drain 56 also includes a valve or check valve 60. Check valve 60 allows for fluid to flow through valve 60 in one direction, but prevents fluid flow in an opposite direction. In this application, check valve 60 allows fluid to flow from hollow interior 36 to heating element 16, but prevents flow in the opposite direction. In this way, as the fluid is boiled by the heating element 16, the fluid is forced up the drip tube 54, through lid 22 and back into the hollow interior 36 thereby causing continuous circulation of fluid.

Lid: Lid 22 is formed of any suitable size, shape and design. Lid 22 connects to the upper end 30 of container 12. In one arrangement, as is shown, lid 22 is generally circular in shape when viewed from above and matingly engages the upper end 30 of container 12.

The rearward side of lid 22 connects to hinge 38 and the forward side of lid 22 connects to button 42. In this way, lid 22 is locked in a closed position by button 42, while releasing button 42 allows lid 22 to be opened upon hinge 38 thereby providing access to the hollow interior 36 of container 12.

The forward end of lid 22 includes a lip 62 that protrudes above the upper edge 64 of lid 22. Lid 22 includes a pour spout 66 that is positioned just rearward of lip 62. Pour spout 66 of lid 22 fluidly connects with pour spout 50 of container 12 when lid 22 is in a closed position.

Pour spout 66 of lid 22 is selectively opened and closed by cover 68. Cover 68 is any device that opens and closes pour spout 66. In the arrangement shown, as one example, cover 68 slides forward, to cover and close pour spout 66, and slides rearward to uncover pour spout 66, however any other form of a cover is hereby contemplated for use.

Lid 22 includes a passageway 70 therein (which is depicted by arrow 70). Passageway 70 is formed of any suitable size, shape and design and provides a fluid conduit from drip tube 54 to holder or insert 24 and/or coffee grounds holding device 26.

In one arrangement, as is shown, passageway 70 includes a vertical portion 72 that is positioned at the rearward side of lid 22 and fluidly communicates with drip tube 54, and a horizontal portion 74 that extends toward the center of lid 22 and fluidly communicates with holder or insert 24 and/or coffee grounds holding device 26.

In one arrangement, vertical portion 72 of passageway 70 connects to a flexible tube portion 76. Flexible tube portion 76 connects the upper end of drip tube 54 to the lower end of vertical portion 72 of passageway 70. As flexible tube portion 76 is flexible, it allows for opening and closing of lid 22 while keeping passageway 70 and drip tube 54 in fluid sealed communication.

In an alternative arrangement, vertical portion 72 and the upper end of drip tube 54 connect and seal to one another when lid 22 is in a closed position, whereas when lid 22 is in an open position vertical portion 72 and the upper end of drip tube 54 separate from one another. In this arrangement, to ensure proper sealing any form of a connection can be used. As examples, a compressible seal is positioned between the vertical portion 72 and the upper end of drip tube 54, the vertical portion 72 and the upper end of drip tube 54 are formed in mating overlapping condition when closed, or any other arrangement.

In one arrangement, as is shown, horizontal portion 74 is generally circular in shape and includes a sloped bottom wall 78 that angles downward as it extends toward the center of lid 22. This sloped bottom wall 78 includes at least one nipple 80 having an opening therein. Nipple 80 extends downward from the sloped bottom wall 78 such that when lid 22 is closed, nipple 80 punctures the coffee grounds holding device 26 thereby providing an opening and access for fluid into the coffee grounds holding device 26. As the bottom wall 78 is sloped downward, as the horizontal portion 74 fills with fluid, the force of gravity moves the fluid along the sloped bottom wall 78 into the coffee grounds holding device 26.

Holder or Insert: Holder or insert 24 is formed of any suitable size, shape and design. In one arrangement, as is shown, holder or insert 24 is sized and shaped to be positioned between container 12 and lid 22 and held in place there between when lid 22 is in a closed position. Holder or insert 24 includes a generally circular opening 82 positioned at its middle that is defined by a collar 84 that extends around the opening 82. Collar 84 includes at least one step 86 therein that is narrower than the collar 84. This step 86 is sized and shaped to matingly receive and hold a similar step in coffee grounds holding device 26 so as to prevent coffee grounds holding device 26 from falling through holder or insert 24.

A flange 88 extends outward from collar 84 in a generally flat and planar manner. Flange 88 is sized and shaped to fit just within the interior surface of sidewall 28 and sit on top of lip 52 adjacent the upper end 30 of container 12. Flange 88 includes a forward notch 90 therein that is sized and shaped to fit around the pour spout 66 of container 12. Flange 88 also includes a rearward notch 92 therein that is sized and shaped to fit around the area wherein drip tube 54 connects with passageway 70 of lid 22.

A frame member 96 connects to and extends downward from collar 84. Frame member 96 extends downward from collar 84 and connects to a bottom wall 98 having a nipple 100 with an opening therein. Nipple 100 extends upward from bottom wall 98. Frame member 96 and bottom wall 98 are sized and shaped to receive coffee grounds holding device 26 therein with close and tight clearance therein. Frame member 96 and bottom wall 98 may be skeletonized in shape, or they can be formed of a solid continuous wall.

When coffee grounds holding device 26 is placed in holder or insert 24 and lid 22 is closed, nipple 100 penetrates the bottom wall of coffee grounds holding device 26 thereby providing an exit for fluid flowing into the coffee grounds holding device 26.

Coffee Grounds Holding Device: Coffee grounds holding device 26 is formed of any suitable size, shape and design. In one arrangement, as is shown, coffee grounds holding device 26 is formed of what is commonly known as a "K-cup" which was designed and originally manufactured and distributed under the name Keurig which is part of Keurig Green Mountain, Inc. which has its headquarters in Waterbury, Vermont. These coffee grounds holding devices 26 are single use, single serve and are formed of a plastic container that is generally circular sidewall 102 in shape and narrows as it extends downward before terminating in a bottom wall 104. The coffee grounds holding device 26 includes a flange 106 connected to the upper end of sidewall 102 and extends outward therefrom, as well as one or more steps 108 positioned between the flange 106 and the sidewall 102.

The hollow interior formed by the coffee grounds holding device 26 is enclosed by a foil cover 110. A filter member 112 is positioned within the hollow interior of the coffee grounds holding device 26 and holds an amount of coffee grounds 114 therein. The filter member 112 allows for the passage of fluids there through while preventing the passage of coffee grounds 114. This arrangement allows for quick and easy insertion and removal of a coffee grounds holding device 26 into holder or insert 24 when the lid 22 is in an open position.

Heating Element Housing: Heating element housing 14 is formed of any suitable size, shape and design. In one arrangement, as is shown, heating element housing 14 is generally circular in shape or disc shaped and connects to the lower end 32 of container 12. Heating element housing 14 connects to container 12 by any manner or means. In one arrangement, heating element housing 14 is permanently connected to and sealed to the bottom of container 12, such as by use of welding, adhesive, friction fit, locking engagement, or any other method or means. In an alternative arrangement, heating element housing 14 is connected to the bottom of container 12 by any removable manner or means such as threaded engagement, snap fit, friction fit or any other method or means. By being removable, this allows the components of heating element housing 14 to be accessed and cleaned. By being permanently affixed, this ensures that heating element housing 14 is permanently and properly sealed ensuring that water does not infiltrate the hollow interior of heating element housing 14. In one arrangement, as is shown, the upper end of heating element housing 14 has a step 116 that is matingly received by, and fits just within, the interior surface of the lower end 32 of container 12, just below bottom wall 34.

Heating element housing 14 holds heating element 16. Heating element 16 is formed of any device which receives and heats fluids in container 12. In one arrangement, as is shown, heating element 16 is formed of an electrical conduit 118 that is connected to heating tube 120.

Electrical conduit 118 and heating tube 120 are formed of any suitable size, shape and design. In the arrangement shown, electrical conduit 118 and heating tube 120 are formed in a U-shape, however any other shape is hereby contemplated, such as a coil, spiral, zig-zag, or any other shape.

In the arrangement shown, electrical conduit 118 includes an opening through its middle that receives an electrical filament that when powered generates heat. Heating tube 120 is in direct physical contact to electrical conduit 118 throughout all or the majority of its length so that heat generated by electrical conduit 118 is efficiently absorbed or transmitted to heating tube 120, which is a hollow tube.

The entry end of heating tube 120 is fluidly connected to drain 56 so as to receive fluid from container 12. The exit end of heating tube 120 is fluidly connected to the lower end of drip tube 54. Due to the one-way check valve 60 in drain 56, heating tube 120 receives fluid from container 12, as the fluid is heated by electrical conduit 118 the fluid boils and expands. The expanding fluid cannot move against the check valve 60 and therefore it is forced up the drip tube 54.

In one arrangement, heating element housing 14 is insulated so as to sealing the heat generated from electrical conduit 118 and to prevent heat from transferring to other portions of the device 10.

Electrical Components Housing: Electrical components housing 18 is formed of any suitable size, shape and design. In one arrangement, as is shown, electrical components housing 18 is generally circular in shape or disc shaped and connects to the lower end of heating element housing 14 and thereby forms the bottom of portable coffee brewing system 10. Electrical components housing 18 connects to container 12/heating element housing 14 by any manner or means. In one arrangement, electrical components housing 18 is permanently connected to and sealed to the bottom of container 12/heating element housing 14, such as by use of welding, adhesive, friction fit, locking engagement, or any other method or means. In an alternative arrangement, electrical components housing 18 is connected to the bottom of container 12/heating element housing 14 by any removable manner or means such as threaded engagement, snap fit, friction fit or any other method or means. By being removable, this allows the components of electrical components housing 18 to be accessed and cleaned. By being permanently affixed, this ensures that electrical components housing 18 is permanently and properly sealed ensuring that water does not infiltrate the hollow interior of electrical components housing 18.

Electrical components housing 18 holds electrical components 20. Electrical components 20 are formed of any electrical components needed to turn on, turn off and control the portable coffee brewing system 10. These electrical components 20 are electrically connected to electrical conduit 118 and thereby powers on and powers off electrical conduit 118.

In one arrangement, as is shown, electrical components 20 include a switch 122 which controls the flow of energy to the electrical conduit 118.

In one arrangement, as is shown, electrical components 20 also include a sensor 124 which senses the temperature of the fluids within the container 12 and/or the temperature of the electrical conduit 118 and/or the temperature of the heating tube 120.

In one arrangement, as is shown, electrical components 20 also include a microprocessor 126 which receives information from the other electrical components 20 and processes this information based on instructions stored in memory and outputs results. In one arrangement, microprocessor 126 includes a clock or clock function which controls the amount of time the amount of time or duration that the electrical conduit 118 is powered.

In one arrangement the sensor 124 turns on and turns off the power to electrical conduit 118 based upon the sensed temperature, in another arrangement, the sensor 124 transmits the sensed temperature to the microprocessor 126 which controls the turning on and turning off of the power to the electrical conduit 118.

In one arrangement, the check valve 60 is mechanical in nature, whereas in another arrangement microprocessor 126 controls the operation of check valve 60. In this arrangement, the microprocessor 126 is programmed to close the check valve 60 a period of time before cutting power to the electrical conduit 118. This allows the remaining amount of fluid in the heating tube 120 to be boiled and transmitted up the drip tube 54 so as clearing the drip tube 54 and heating tube 120 before turning off the system 10. This prevents fluid from being stuck in the heating tube 120 between uses.

Electrical components housing 18 includes any other electrical components needed to operate portable coffee brewing system 10.

In an alternative arrangement, electrical components housing 18 and heating element housing 14 are combined into a single housing.

Socket & Plug: A socket 128 is connected to the portable coffee brewing system 10. Socket 128 is formed of any suitable size, shape and design and serves to connect portable coffee brewing system 10 to an external power source. Any form of a socket 128 that connects two components together and allows for electrical transmission there between is hereby contemplated for use, these include a two wire socket, a three wire socket, a headphones jack, a USB socket, or any other form of socket. Socket 128 is sized and shaped to matingly receive plug 130 in a removable manner. Plug 130 is connected to a power lead 132 which is designed to be connected to an external power source, such as a wall-plug-in, a USB port, a cigarette lighter socket in a vehicle, or any other source of power.

In Operation: A user desiring to use the portable coffee brewing system 10 fills opens the lid 22 by pressing button 42. This allows lid 22 to be pivotally opened on hinge 38. This exposes the holder or insert 24. If no coffee grounds holding device 26 is present, the user can simply pour the desired amount of water into the container 12 through the opening in the center of the holder or insert 24. If a coffee grounds holding device 26 is present, the user can remove coffee grounds holding device 26 or the holder or insert 24 entirely which will expose the open upper end of container 12 allowing the user to fill it with the desired amount of fluid.

Once container 12 is filled with fluid, the user replaces the holder or insert 24 by aligning the forward notch 90 with the pour spout 66 and the rearward notch 92 with the drip tube 54 and allows the holder or insert 24 to sit upon lip 52. Once the holder or insert 24 is this fully installed position, the user selects their desired coffee ground holding device 26 (also known as a K-cup) and places the coffee ground holding device 26 within the opening 82 until it settles there within and the flange 106 and steps 108 of coffee ground holding device 26 engages the collar 84 and steps 86 of holder or insert 24.

With the container 12 filled with water, and the coffee ground holding device 26 installed in the installed holder or insert 24, the user next closes the lid 22. As the lid is closed, the rounded or angled upper surface 46 of latching arms 44 engage the underside of lid 22 as it is forced downward toward container 12. As the lid 22 moves downward, the rounded or angled upper surfaces 46 of latching arms 44 force the button 42 rearward against the biasing force of biasing member until the bottom surface or locking surface 48 of latching arms 44 grab hold of the lid 22. In this position, the lid 22 is fully closed and the seam line between the upper end 30 of container 12 is fully sealed with the lower end of lid 22 in a watertight manner. In one arrangement, a compressible member, such as a plastic or rubber or composite O-ring is placed at the intersection of the container 12 and lid 22 to ensure proper sealing.

As the lid 22 is closed, this forces nipple 80 in the bottom surface of lid 22/sloped bottom wall 78 to penetrate the cover 110 of the coffee grounds holding device 26 thereby providing a fluid passageway into the coffee grounds holding device 26. Similarly, as the lid 22 is closed, this forces nipple 100 in the bottom wall 98 of holder or insert 24 to penetrate the bottom wall 104 of the coffee grounds holding device 26 thereby providing a fluid passageway out of the coffee grounds holding device 26 and into container 12.

In this condition, the portable coffee brewing system 10 is both portable as well as ready to brew a fresh cup of coffee.

When the user arrives at their location, such as at their office, they plug power lead 132 into an external power source and then they insert plug 132 into socket 128 which powers the device. In the arrangement wherein the check valve 60 is powered, the microprocessor 126 opens the powered check valve 60 which allows fluid to pass through drain 56 and into heating tube 120. Alternatively, wherein the check valve 60 is unpowered, fluid is allowed to move through drain 56 and into heating tube 120, but not the opposite direction.

Simultaneously, power is transmitted to the electrical conduit 118 which generates heat. This heat is transmitted to heating tube 120 and fluid within the heating tube 120, which is allowed through check valve 60 is heated. As the fluid is heated, its volume expands and fluid is forced through the only escape it has, and that is through the drip tube 54 (because it cannot move against or in the opposite direction of the check valve 60.

The heated fluid travels up the drip tube 54, through the flexible tube portion 76 and into the passageway 70 in lid 22. That is the fluid first moves through the vertical portion 72 of the passageway 70 before entering the horizontal portion 74 of the passageway 70. From there, the force of gravity, as well as the hydrodynamic forces of the expanding fluid coming up the drip tube 54, forces the heated fluid to drain down the sloped bottom wall 78 of the passageway 70, through the opening in nipple 80 and into coffee grounds holding device 26.

Once the heated fluid is in the coffee grounds holding device 26, the heated fluid drains through the coffee grounds 114, through the filter member 112 and out of the hole in the bottom wall 104 of coffee grounds holding device 26 formed by nipple 100. As the heated fluid, which is now coffee, passes through nipple 100 the heated fluid enters the again container 12 and the process is repeated in a continuous flow, similar to the process of what is known as a percolator.

Throughout the process, the sensor 124 and microprocessor 126 track the system. The sensor 124 and/or the microprocessor 126 will turn on or turn off the power to the electrical conduit 118 when the temperature exceeds a maximum predetermined temperature, or when the predetermined amount of time for brewing has been exceeded.

When the coffee is fully brewed, the user unplugs the power lead 132 and slides the cover 68 rearward thereby exposing the pour spout 66 which allows the user to drink directly from the container 12.

To remove and replace the coffee grounds holding device 26 the lid 22 is again opened and the coffee grounds holding device 26 is replaced.

Alternative Arrangement: In an alternative arrangement, with reference to FIGS. 7-8D a portable coffee brewing system 210 is presented in the figures. The system 210 includes a container 212. Container 212 is any form of a liquid holding vessel such as a cup, a mug, a travel mug, a thermal mug, or the like. In one arrangement, container 212 includes a sidewall 214 that surrounds and connects at its bottom edge to bottom 216. Sidewall 214 terminates in an open upper end 218 adjacent its end opposite bottom 216. In one arrangement, sidewall 214 includes connecting features 220, such as threads, snap-fit-features, grooves or the like, adjacent either the interior surface and/or exterior surface of the open upper end 218 of sidewall 214. These connecting features 220 are used for connecting lid 222 to container 212.

Lid 222 is formed of any suitable size shape and design. Lid 222 is removably connected to the open upper end 218 of container 212 and therefore seals and closes container 212 in a water-tight manner. Lid 222 also serves to hold the brewing components therein as is further described herein.

As one example, in the arrangement shown, lid 222 is formed of a lower component 224 and an upper component 226. The lower end 227 of lower component 224 includes a connecting member 228 that is sized and shaped to connect with or matingly engage connecting features 220 of the upper end of sidewall 214. As one example, in the arrangement shown, connecting features 220 of the upper end of sidewall 214 are threads positioned on the inside of the sidewall 214, whereas the a connecting member 228 of the lower end of lower component 224 includes a slightly necked-in portion with threads on its exterior surface that are sized and shaped to engage the threads of the connecting feature 220. In this way, as one example, lower component 224 can be installed on and removed from container 212 in a manner that seals the two components together. Lower component 224 can be removably and replaceably connected to container 212 in countless other ways, such as by replacing the threads of the connecting member 228 with a flexible and/or compressible seal that allows for a press-fit frictional engagement between container 212 and lower component 224, or any other arrangement that allows two components to be connected together.

Lower component 224 includes a main body 230 that is connected to the upper end of connecting member 228. In one arrangement, the exterior surface of main body 230 is wider than the connecting member 228 such that the exterior surface of main body 230 is approximately in parallel alignment or smooth and continuing alignment with the exterior surface of sidewall 214 so as to provide a flush and flat alignment between the lower component 224 and the container 212 when connected together.

A lower straw 232 extends outwardly from the bottom of lower component 224 a distance into the open interior of container 212 when installed thereon. Lower straw 232 also extends through at least a portion of lower component 224 and terminates in an open upper end 233 which is aligned to receive and connect to a portion of upper component 226 as is described herein.

Lower component 224 also includes a coffee basin 234 therein. Coffee basin 234 is any size which is designed to receive and hold coffee grounds therein for brewing purposes. In the arrangement shown, coffee basin 234 is an opening or recess in the lower portion 224. In the arrangement shown, the lower end of coffee basin 234 includes a nozzle 236 or opening through which liquid can pass after passing through the coffee grounds held in the coffee basin 234. Alternatively, the lower end of coffee basin 234 includes a plurality of nozzles 236 or a mesh or filter material, or any other device that serves the purpose of holding coffee grounds while allowing liquid to pass through it.

A passageway 238 is positioned adjacent the coffee basin 234. Passageway 238 is an opening that extends through the lower component 224 from the lower end to the upper end. Passageway 238 is sized and shaped to be large enough to easily allow coffee to flow out of the container 212 through the passageway 238 when a user desires to drink from container 212, and is also large enough for a user to add cream and sugar to the container through passageway 238 when they so desire.

Lower component 224 terminates in an upper edge 240 that is generally flat. Adjacent the upper edge 240 is a hinge 242. Hinge 242 connects lower component 224 to upper component 226 such that the upper component 226 can rotate upon hinge 242 between a closed position, wherein the upper component 226 is engaged with the lower component 224, and an open position, wherein the upper component 226 is separated from the lower component 224 (save for connection by hinge 242) thereby providing access to coffee basin 234 and passageway 238.

Upper component 226 is formed of any suitable size, shape and design. In the arrangement shown, upper component 226 includes a main body 230 that has an exterior surface that is approximately the same size and shape of the main body 230 of lower component 224, and container 212 such that when the three components 212, 224, 226 are connected together the exterior surface is generally smooth and flat. Upper component 226 has a bottom edge 244 that is generally flat and engages the upper edge 240 of lower component 224 when the two components are connected together.

Upper component 226 includes a pump 246 and a heating element 248 positioned within the upper component 226. Pump 246 is any form of a device that takes electric energy and converts it to mechanical movement and serves to move liquid from one position to another. Heating element 248 is any form of a device that takes electric energy and heats a liquid. An upper straw 250 is connected to the inlet side of pump 246 and heating element 248. A lower end of upper straw 250 protrudes a distance from the bottom edge 244 of upper component 226 and engages the upper end 233 of lower straw 232 of lower component 224. In this way, when upper component 226 is closed on lower component 224, upper straw 250 and lower straw 232 connect together to provide a fluid path from container 212 to pump 246 and heating element 248. A drip straw 252 is connected to the outlet end of pump 246 and heating element 248 and terminates in a drip nozzle 254 that is positioned above coffee basin 234, such that liquid that passes through pump 246 and heating element 248 is dispensed onto the coffee grinds held within coffee basin 234.

Upper component 226 also includes an On/Off switch 256 that is electrically connected to pump 246 and heating element 248 which selectively provides power to the electrical components of the system 210. On/Off switch 256 is also connected to electrical socket 258. Electrical socket 258 is any form of a device which receives and holds another device, such as cord 260, while forming an electrical connection there with. In the arrangement shown, cord 260 has an adapter 262 which is sized and shaped to engage and mate with electrical socket 258 on one end, and a conventional plug 264 which is sized and shaped to engage a conventional socket on the opposite end. In this way, cord 260 and electrical socket 258 are used to power system 210.

In an alternative arrangement, the system 210 includes an on-board power source, such as a battery, a plurality of batteries, or a battery pack, or the like which is used to power the system. In this wireless battery powered system, electrical socket 258 and cord 260 can still be used to recharge the power source.

Upper component 226 also includes a drinking port 266 that is aligned with passageway 238 when upper component 226 is installed on lower component 224. Drinking port 266 and passageway 238 connect to one another to allow coffee to pass from container 212 through lower component 224 and upper component 226. Because, passageway 238 is intentionally sized to be large enough to allow milk and sugar to easily be added to container without removing lower component 224, whereas drinking port 266 of upper component 226 is smaller so as to only allow the proper amount of coffee to be poured out of container 212, a step 268 protrudes from bottom edge 244 of upper component 226. Step 268 is sized and shaped and aligned to fit within and frictionally engage passageway 238 of lower component 224. In this arrangement, when upper component 226 is closed on lower component 224, step 268 fits within and engages the upper portion of passageway 238 thereby helping to hold the two components together. In one arrangement a flexible seal is positioned around step 268 which helps to seal passageway 238 when upper component 226 is closed onto the lower component 224 thereby preventing any leakage. In another arrangement, a snap-fit feature is present on the step 268 and/or the passageway 238 such that when the upper component 226 is closed on the lower component the snap-fit features engage one another thereby holding the two components together until an appropriate amount of force is applied to separate the two.

In one arrangement, a latch 270 is present on the upper component 226 and a corresponding notch 272 is present on the lower component 224, or vice versa, which serves to hold the upper component 226 and lower component 224 together when upper component 226 is closed on lower component 224. In this arrangement, when upper component 226 is closed, a snap-fit feature, such as a barb 274 or edge, fits within a similarly sized and shaped notch 272.

To facilitate easier drinking, the upper edge of upper component 226 includes a raised lip 276. Lip 276 is formed of any ergonomically design and serves to guide coffee towards a user's mouth when in use, while simultaneously helping to prevent spillage. Also positioned over the upper end of drinking port 266 is a sealing member 277. Sealing member 277 is any device that closes and seals drinking port 266 from spilling when not in use. In one arrangement, sealing member 277 is a slidable piece that slides over the upper end of drinking port 266 when not in use (thereby preventing accidental spillage and also keeping the contents of container 212 sanitary and temperature stable) and slides away from the upper end of drinking port 266 to allow a user to drink the contents of container 212.

The system 210 also includes a sensor 278, a microprocessor 280 and a controller 282. Sensor 278 is any sensor that senses conditions of the system 210. In one arrangement, sensor 278 is a temperature sensor, such as a thermometer or the like, however any other form of a sensor is hereby contemplated for use. Sensor 278 is electrically connected to microprocessor 280. Microprocessor 280 is any device which receives electronic information and processes it according to instructions stored in memory. Microprocessor 280 receives information from sensor 278 and processes this information. Microprocessor 280 is electrically connected to controller 282. Controller 282 is any device which receives information from one electronic component and uses that information to control another electronic device. In one arrangement, microprocessor 280 and controller 282 are combined into a single device. In one arrangement, sensor 278 senses the temperature of heating element 248, or the liquid within container 212, transmits this information to microprocessor 280 which processes this information. This processed information is passed to controller 282 which controls heating element 248 and/or pump 46, so as to properly and precisely control brewing.

In Operation: A user fills container 212 with a desired amount of water. Next, the user screws lid 222 onto the open upper end 218 of container 212 by meshing the threads of connecting features 220 with the connecting member 228 of lower component 224. By doing so, straw 232 is inserted into the water a distance.

Next, the user places the desired amount of coffee grounds within the coffee basin 234 of lower component 224. This can be by actually pouring coffee grounds into coffee basin 234, or by placing a pouch of coffee grounds in the coffee basin 234. At this time, or a later time, the user can pour milk or sugar or other additives into the container through passageway 238.

Next the user closes upper component 226 onto lower component 224. In doing so, the upper straw 250 aligns with the lower straw 232 and the drip nozzle 254 is positioned above the coffee grounds in the coffee basin 234, and the upper edge 240 of lower component 224 engages the flat bottom edge of upper component, and the step 228 fits within the passageway 238 thereby sealing the passageway 238 and the narrower drinking port 266. Also, in the arrangement wherein a latch 270 and notch 272 are present, when closed, the latch 270 engages the notch 272 thereby holding the upper component 226 onto the lower component 224.

When the sealing member 277 closes the drinking port 266, the system is now ready to travel. When the user arrives at their office or wherever they desire a fresh cup of coffee, the user inserts plug 264 of cord 260 into a conventional wall socket, or in another arrangement, a car socket, USB port or any other suitable power source and inserts adapter 262 into the electrical socket 258 of the upper component 226. Next, the user powers on the system 10 by pressing the On/Off button 256 which starts the brewing process.

Brewing occurs by transmitting power to the heating element 248 and pump 246. Heating element 248 warms to an operating temperature and pump 246 sucks water from container 212 through lower straw 232 and upper straw 250 and into heating element 248. The water passes through heating element 248 and out drip straw 252 and through drip nozzle 254 and onto coffee grounds held within coffee basin 234. The heated water passes through coffee grounds and is held within coffee basin 234 until it passes through nozzle 236 and back into container 212. This process is repeated until the user turns off the power to the system, or alternatively until microprocessor 280 and/or controller 282 shuts power off to the system 210. While the system is brewing, the sensor 278 senses the temperature and other variables of the system 210 and feeds this information into microprocessor 280 and/or controller 282 which adjusts the system 210 to provide optimum results.

Once the coffee is brewed, the user simply slides the sealing member 277 away from the drinking port 266 and drinks a fresh brewed cup of coffee.

Figure 8A:
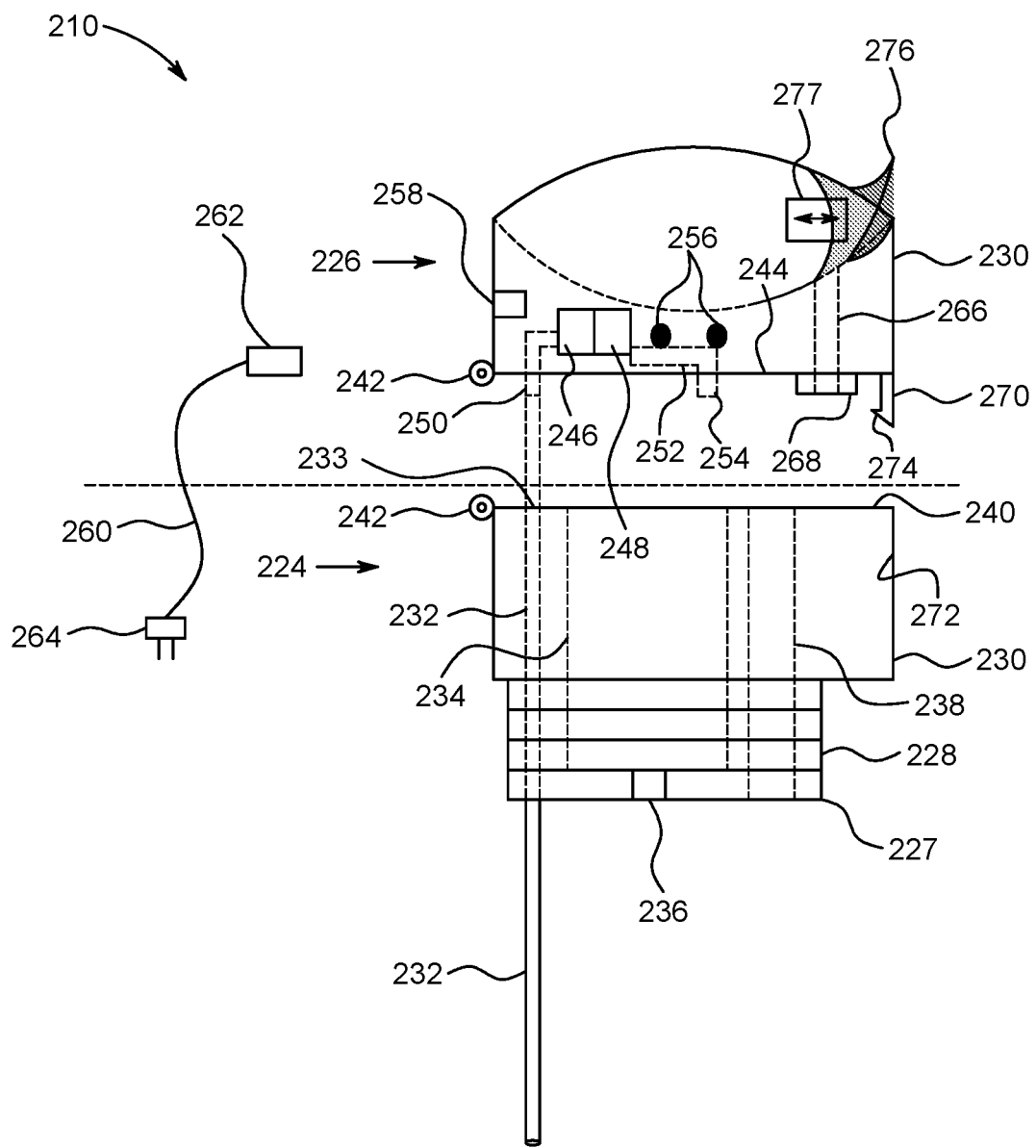
FIG. 8A is a side cut-away elevation exploded view of the lid of the portable coffee brewing system of FIG. 7 having a lower component and an upper component, a pump positioned within the lid and a coffee basin positioned within the lid.
Figure 8B:
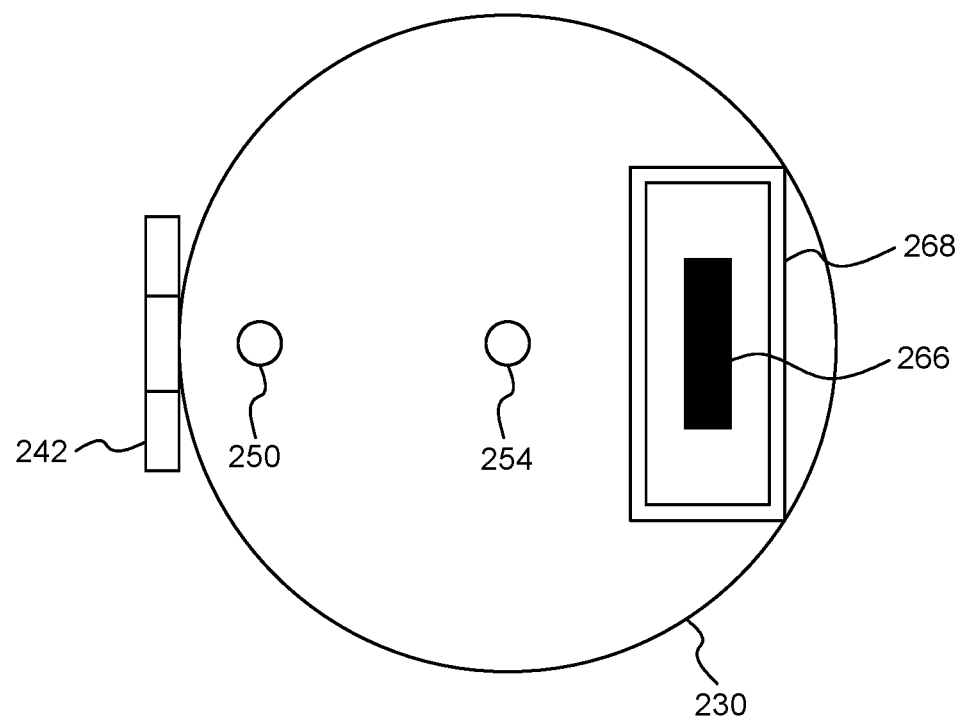
FIG. 8B is a bottom elevation view of the upper component of the lid of FIGS. 7 and 8A.
Figure 8C:
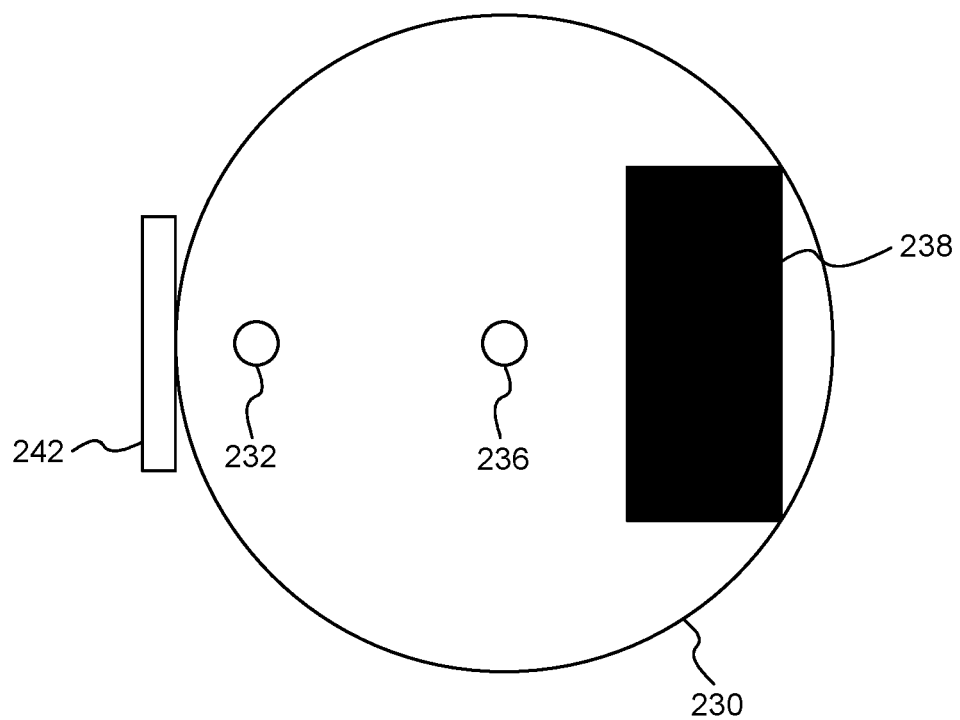
FIG. 8C is a bottom elevation view of the lower component of the lid of FIGS. 7 and 8A
Figure 8D:
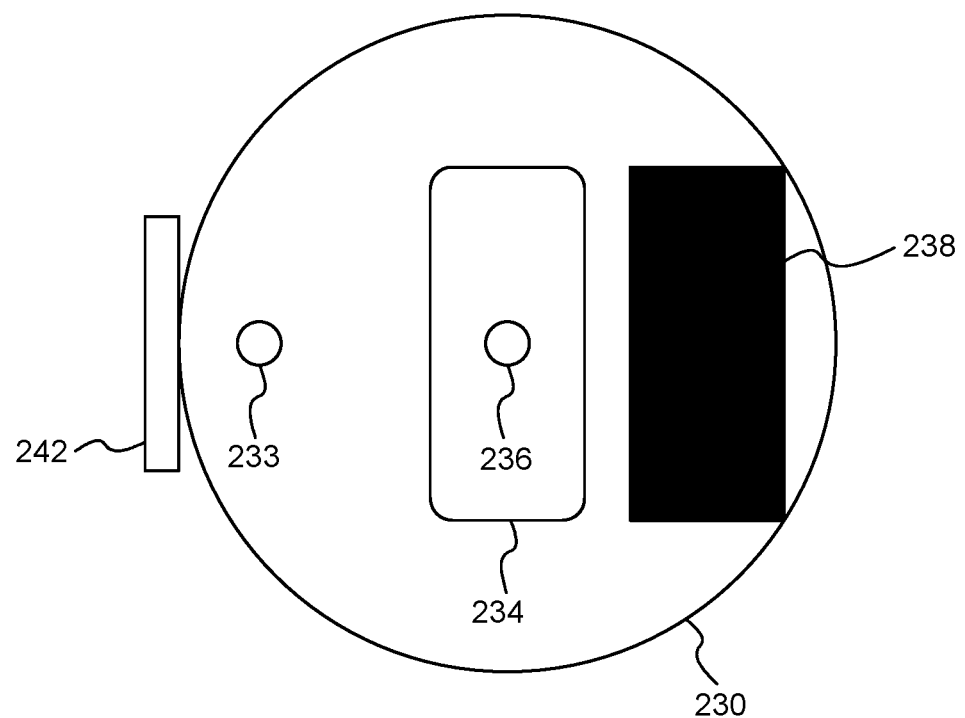
FIG. 8D is a top elevation view of the lower component of the lid of FIGS. 7, 8A and 8C.
Figure 9:
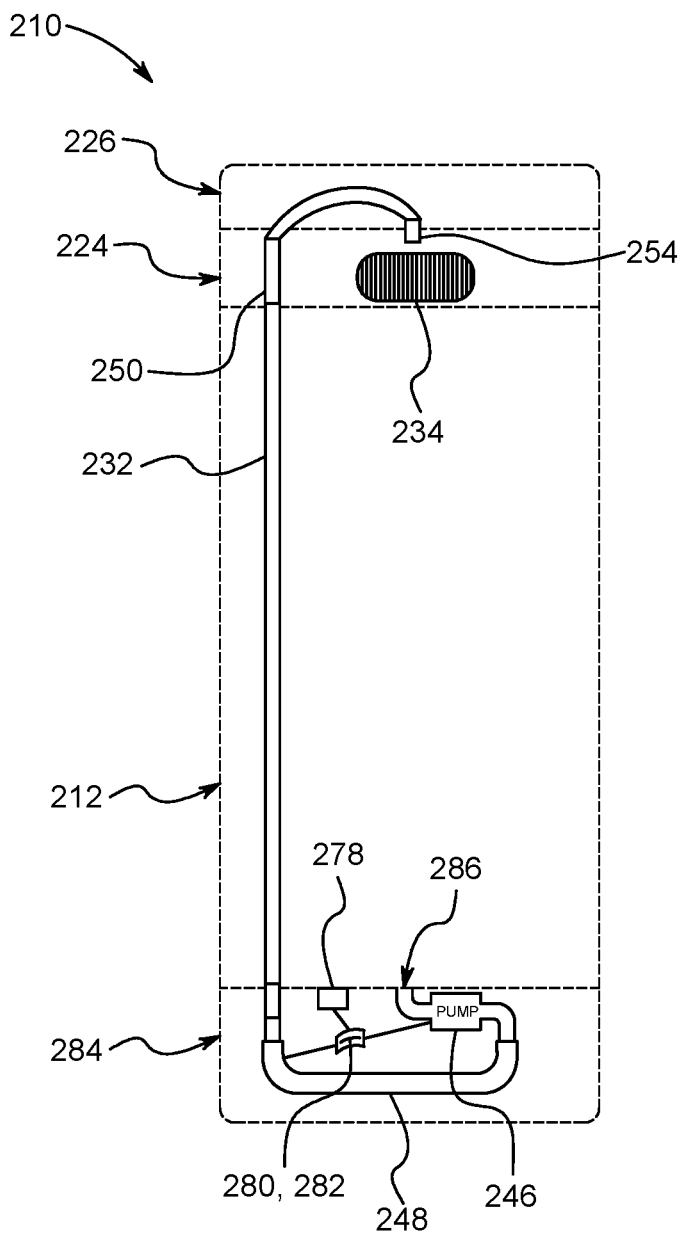
FIG. 9 is a side cut away elevation view of a third embodiment of a portable coffee brewing system having a lid formed of a lower component and an upper component, a pump positioned within a bottom component.
Figure 10:
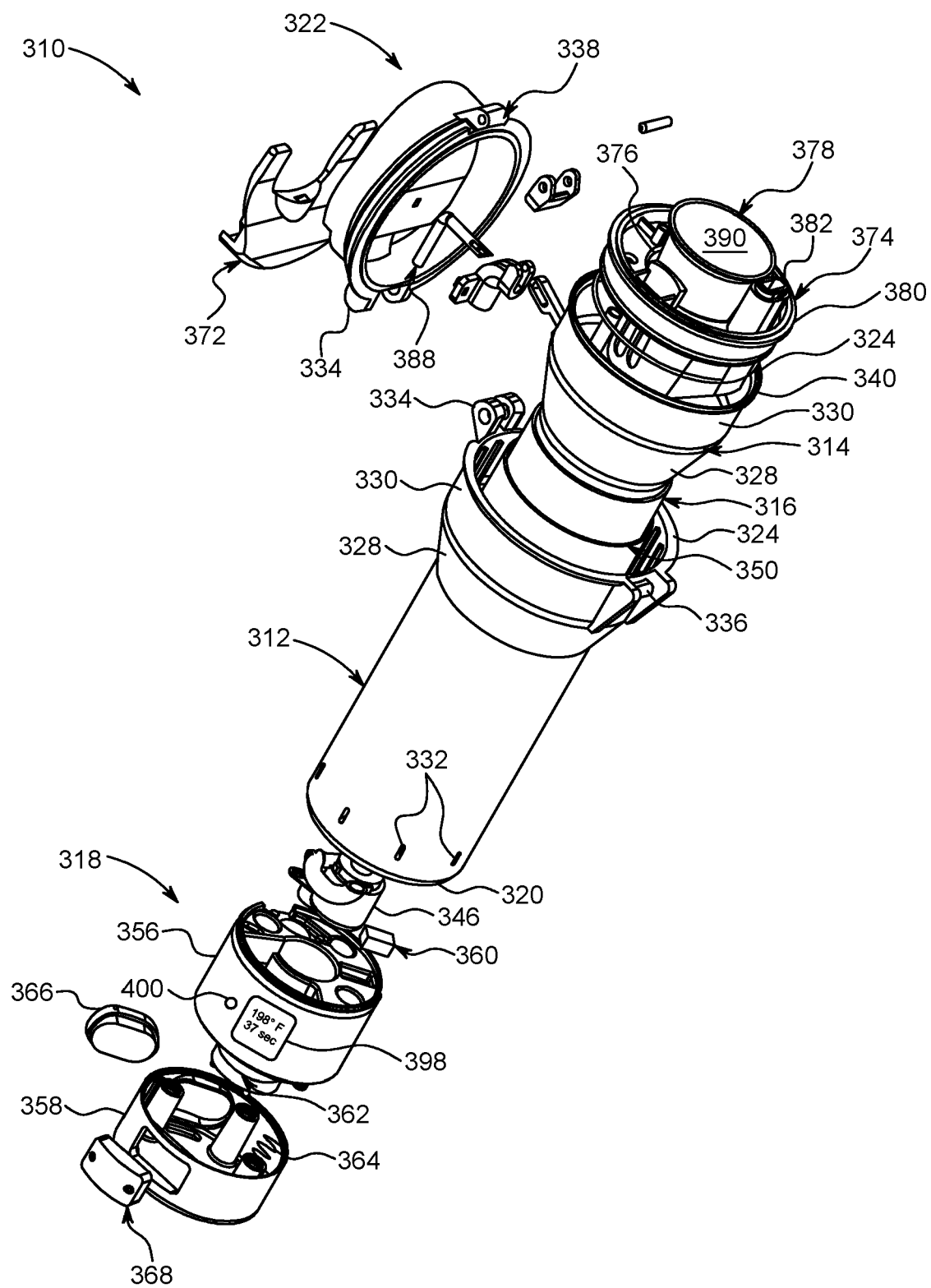
FIG. 10 is a perspective exploded view of a fourth embodiment of a portable coffee brewing system having a container, a sleeve, a lid hingedly connected to the container, a removable basket that is configured to hold a coffee grounds holding device, a heating element wrapped around the sleeve and positioned between the sleeve and the container, an electrical components housing connected to the bottom end of the container housing a pump and other electronic components, a digital display and an alarm positioned in the sidewall of the electrical components housing, the view showing the heating element wrapped around the sleeve and a layer of thermal insulating material wrapped around the heating element.
Figure 11:
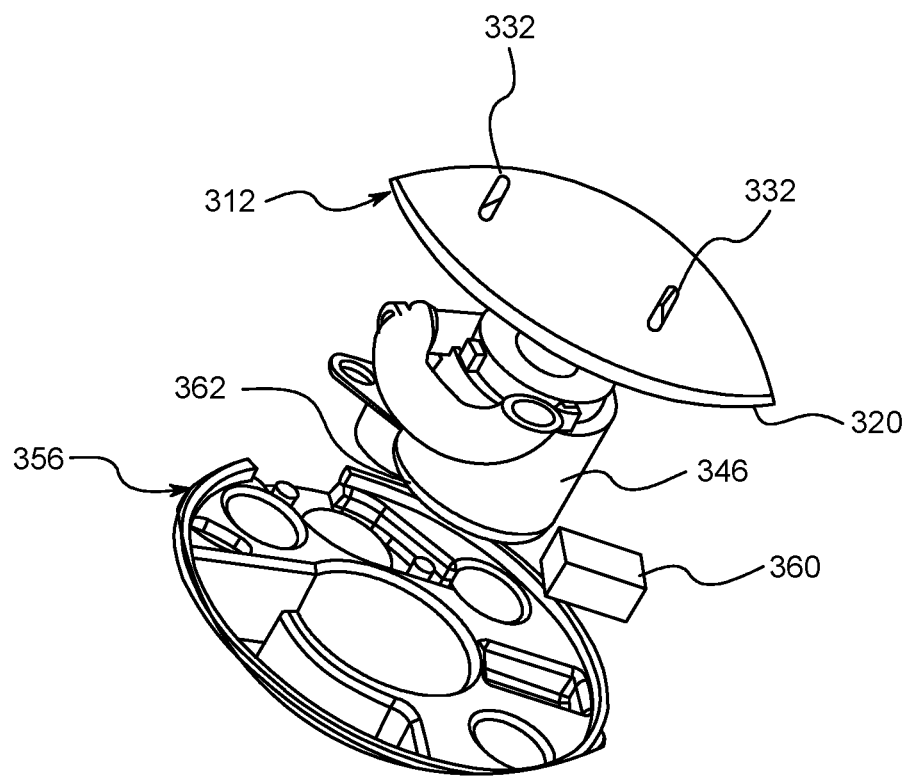
FIG. 11 is a close-up perspective view of the lower end of the container of the portable coffee brewing system shown in FIG. 10, the view showing the pump, sensor and electrical components housing.
Figure 12:
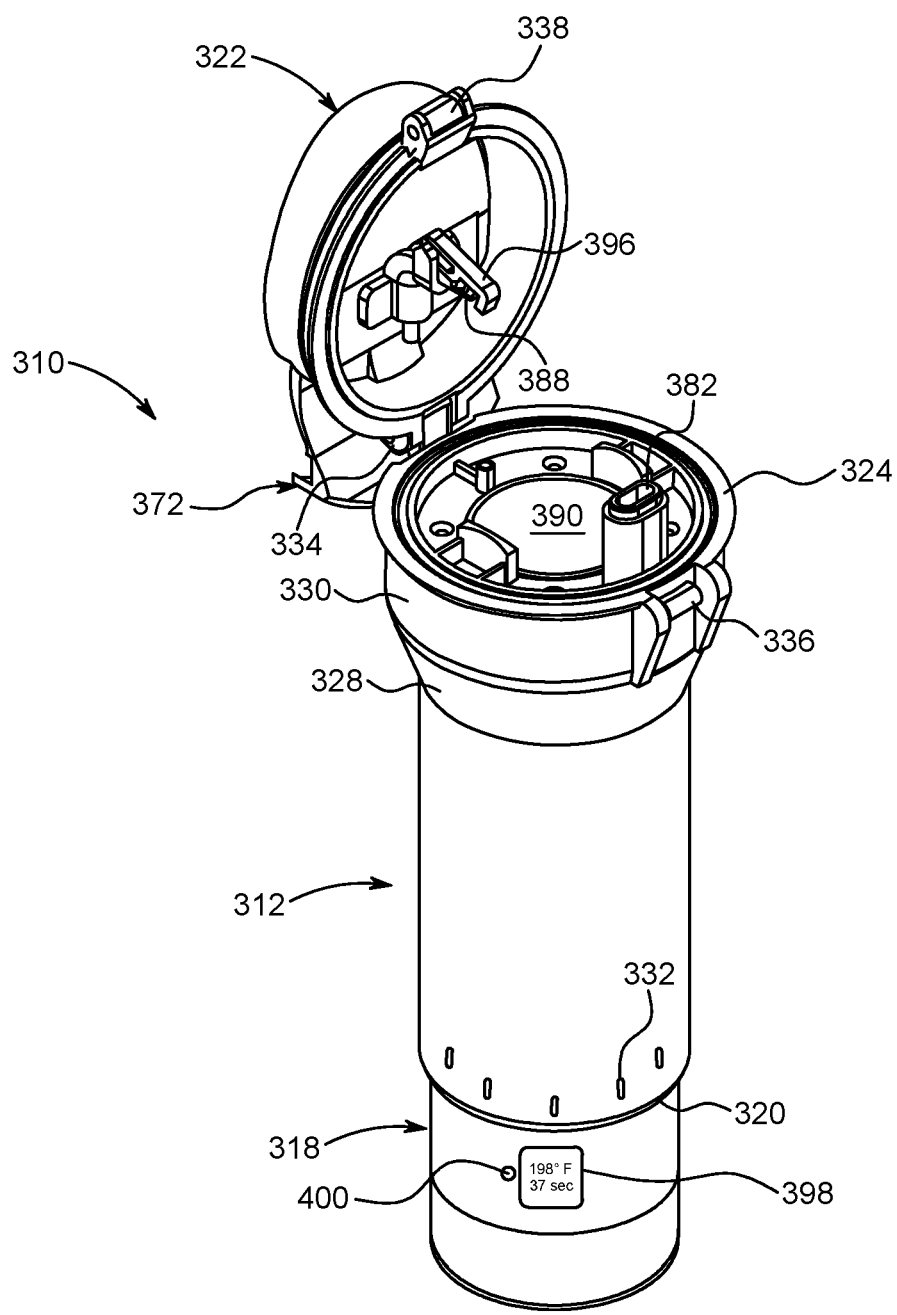
FIG. 12 is a perspective view of the portable coffee brewing system shown in FIGS. 10 and 11, the view showing the lid open.
Figure 13:
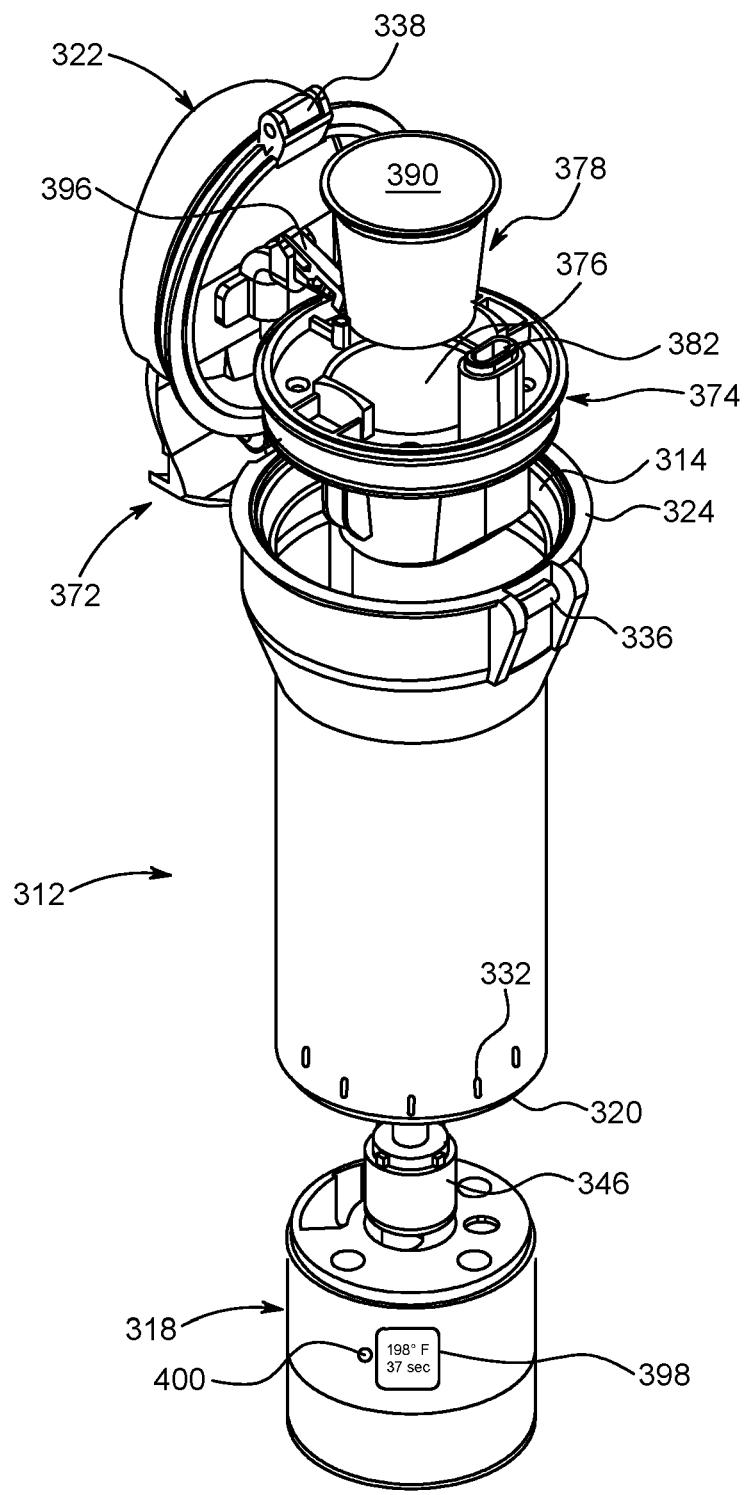
FIG. 13 is an exploded perspective view of the portable coffee brewing system shown in FIGS. 10-12, the view showing the lid open and the basket in a removed position and the view showing the coffee grounds holding container in a removed condition.
Figure 14:
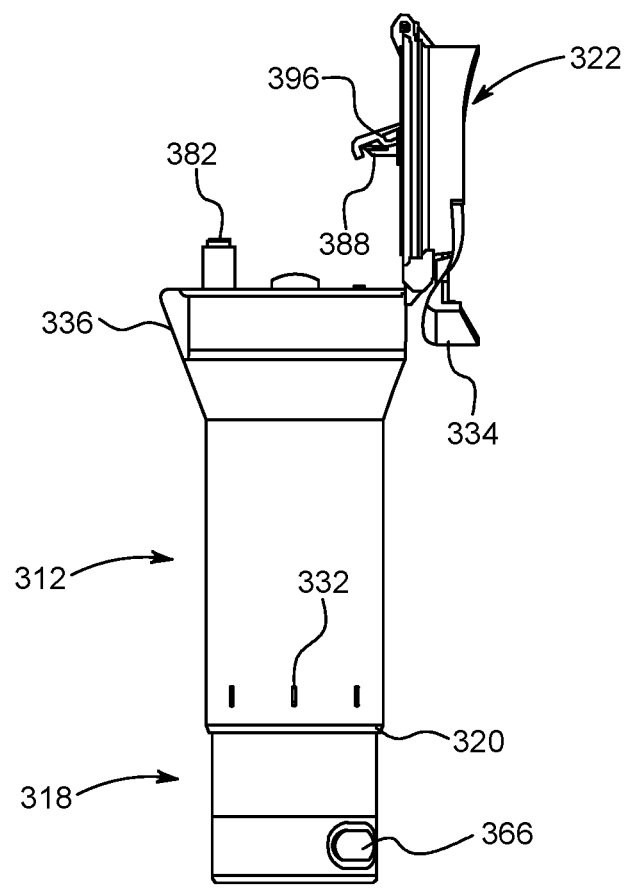
FIG. 14 is a side elevation view of the portable coffee brewing system shown in FIGS. 10-13, the view showing the lid in an open position.
Figure 15:
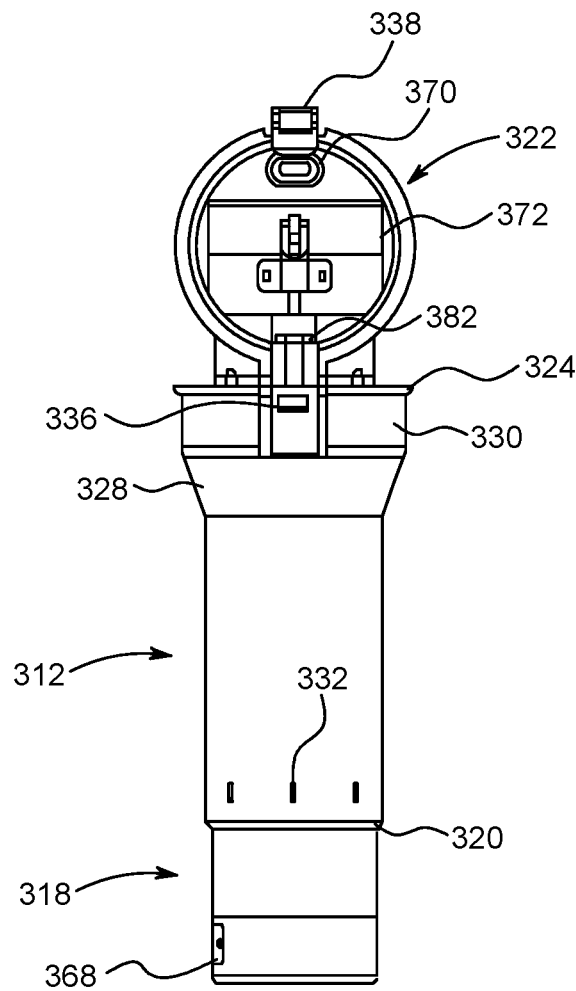
FIG. 15 is a front elevation view of the portable coffee brewing system shown in FIGS. 10-14, the view showing the lid in an open position.
Figure 16:
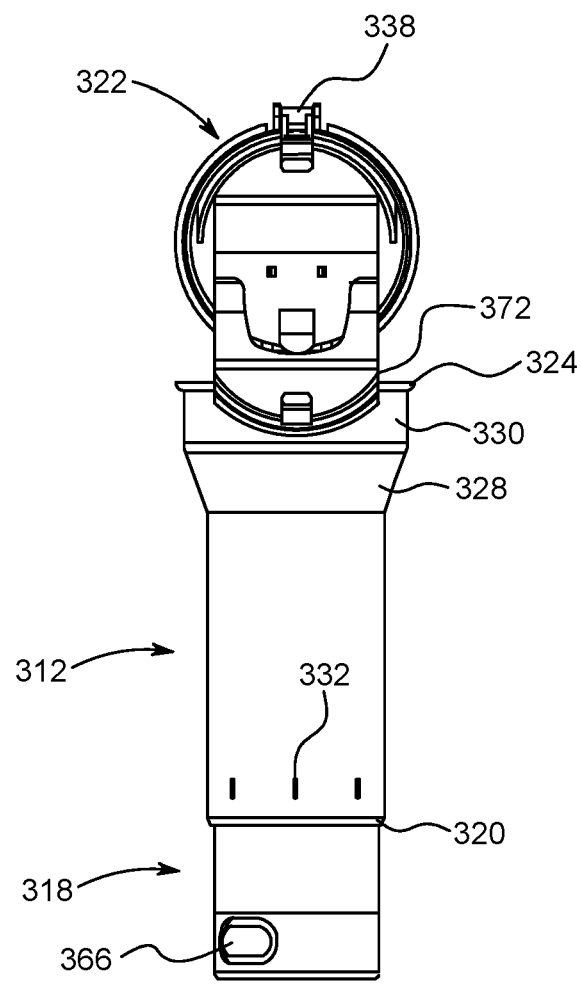
FIG. 16 is a rear elevation view of the portable coffee brewing system shown in FIGS. 10-15, the view showing the lid in an open position.
Figure 17:
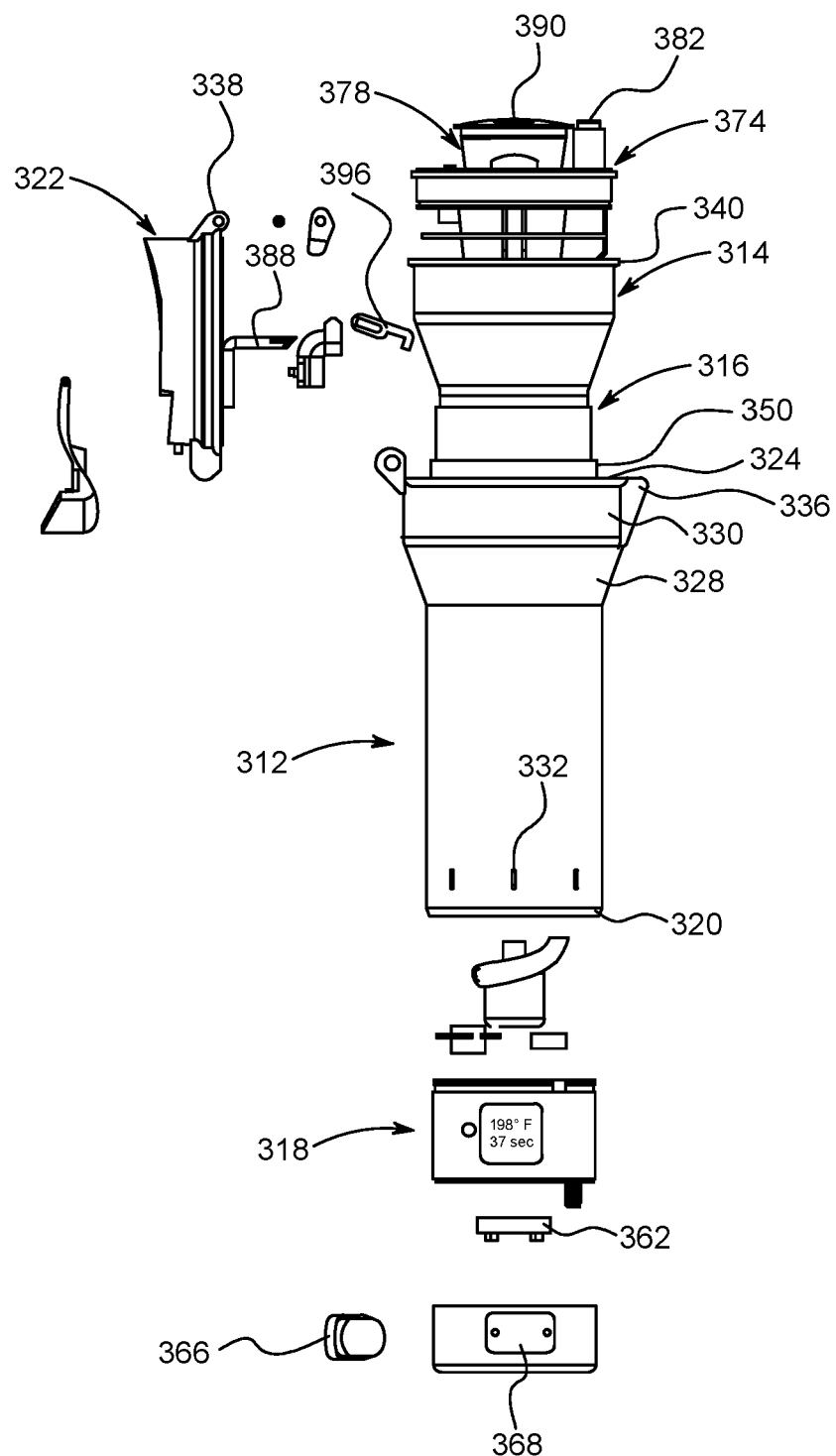
FIG. 17 is a side elevation exploded view of the portable coffee brewing system shown in FIGS. 10-16.
Figure 18:
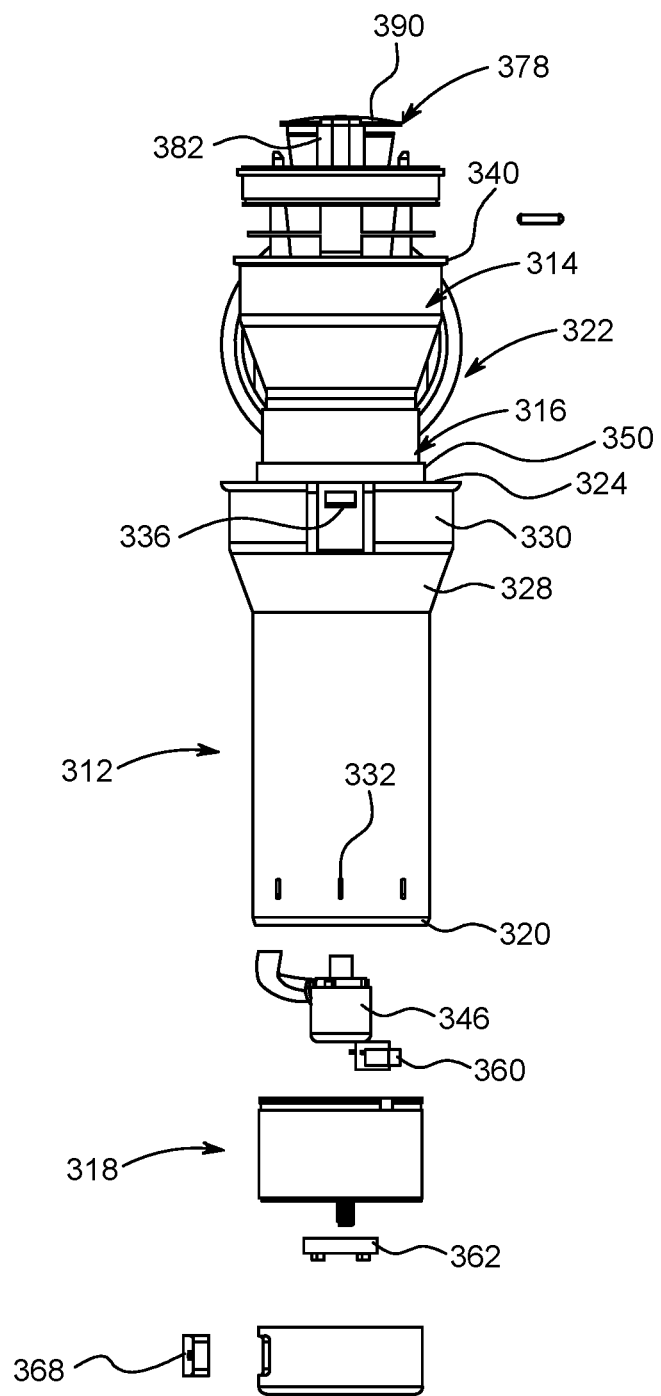
FIG. 18 is a front elevation exploded view of FIG. 17.
Figure 19:
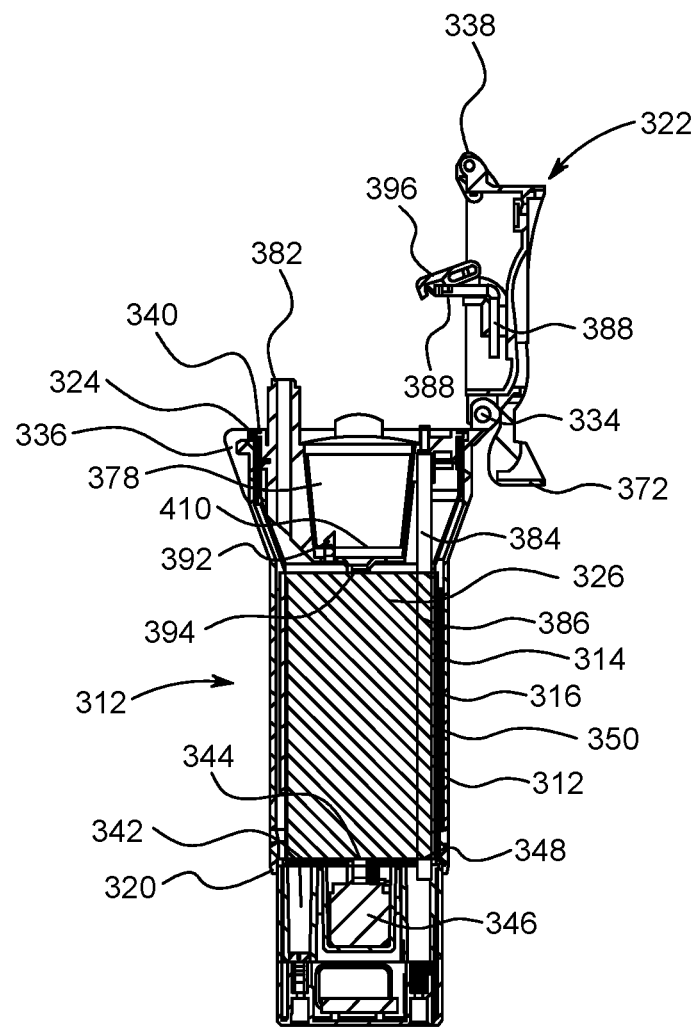
FIG. 19 is a side elevation cut-away view of the portable coffee brewing system shown in FIGS. 10-18, the view showing the lid in an open position.
Figure 20:
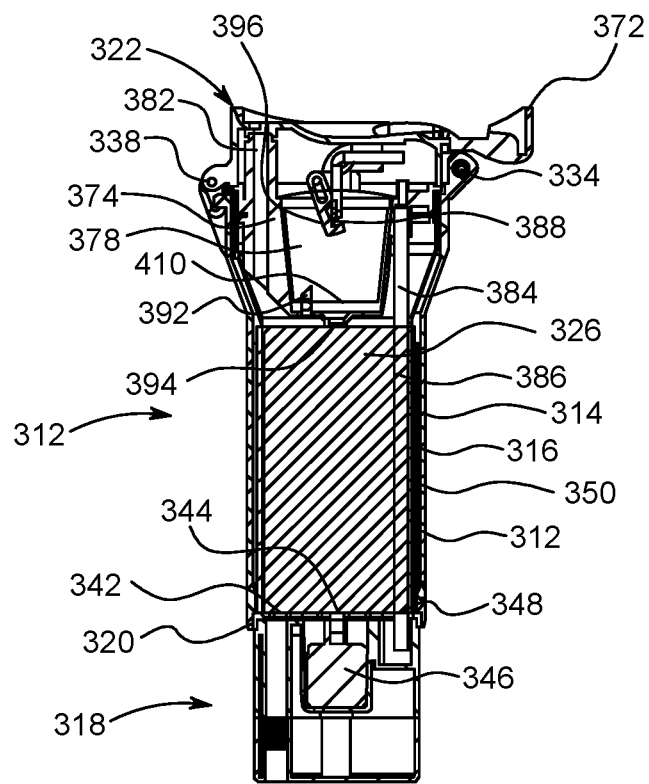
FIG. 20 is a side elevation cut-away view of the portable coffee brewing system shown in FIG. 20, the view showing the lid in a closed position.
Figure 21:
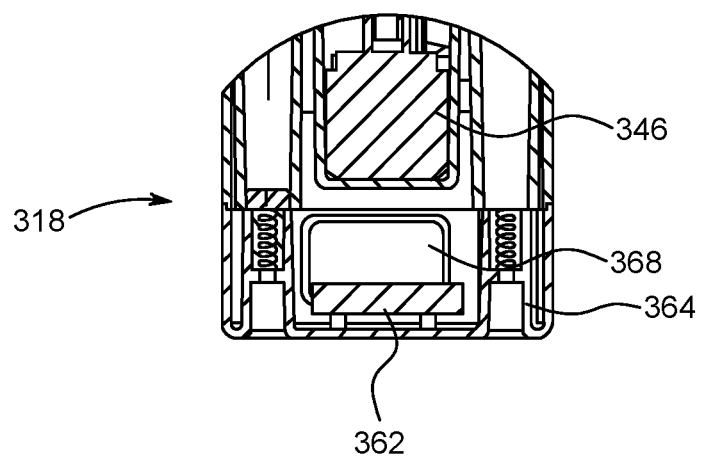
FIG. 21 is a close up side elevation cut-away view of the lower end of the portable coffee brewing system shown in FIG. 19.
Figure 22:
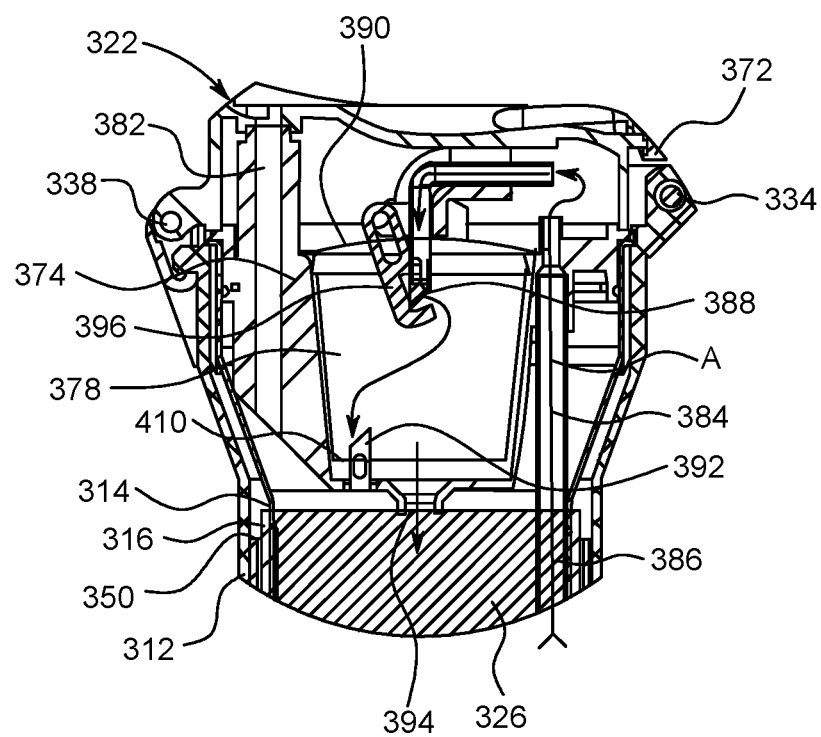
FIG. 22 is a close up side elevation cut-away view of the upper end of the portable coffee brewing system shown in FIG. 20.
Figure 23:
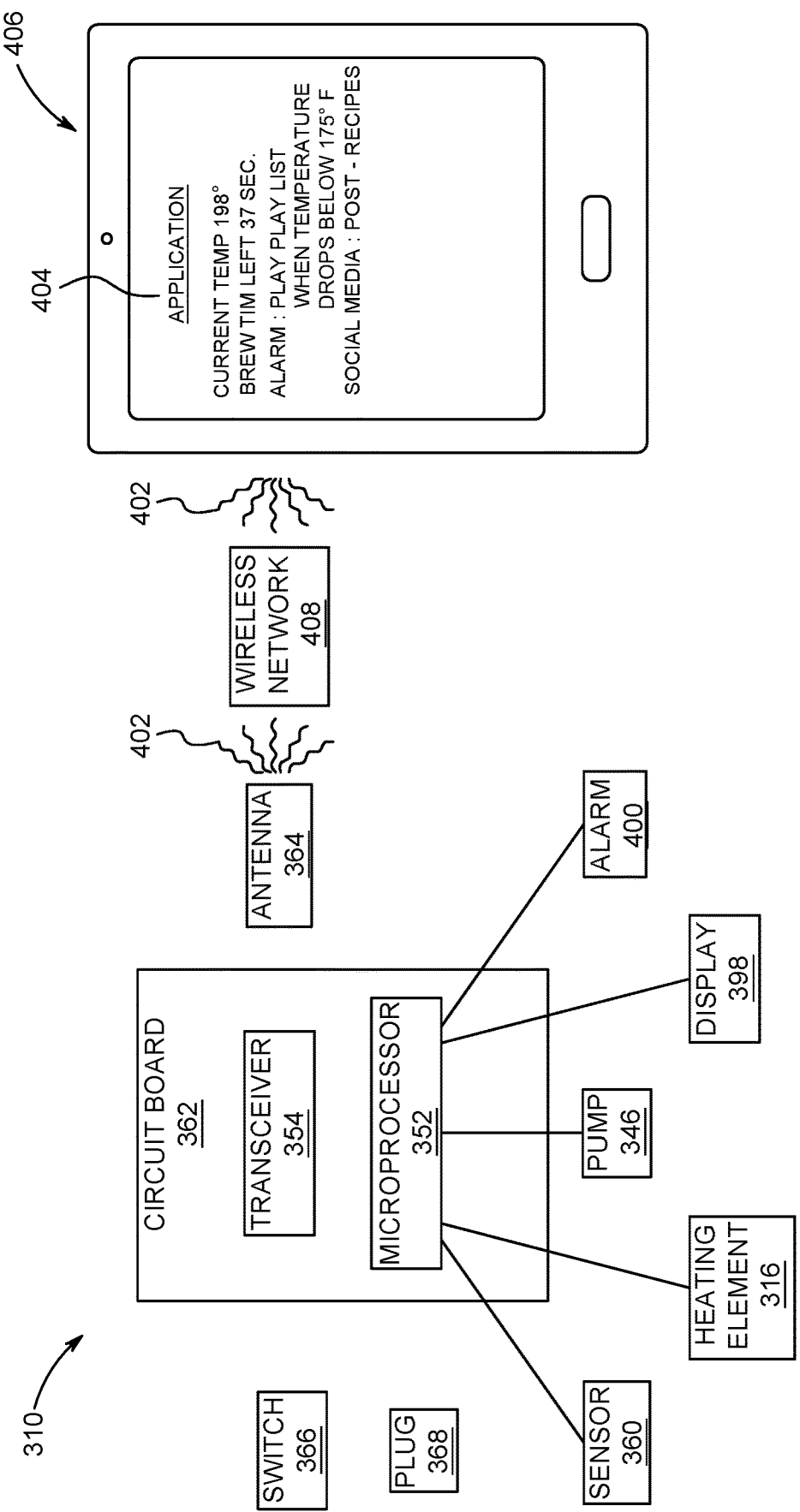
FIG. 23 is a plan view of the electrical components of the system including the circuit board, microprocessor, transceiver, antenna, sensor, heating element, pump, display, alarm, plug and switch, as well as its wireless connection with its related application run on a computing device and controlled through wireless control signals over the air or through an electronic network.
Figure 24:
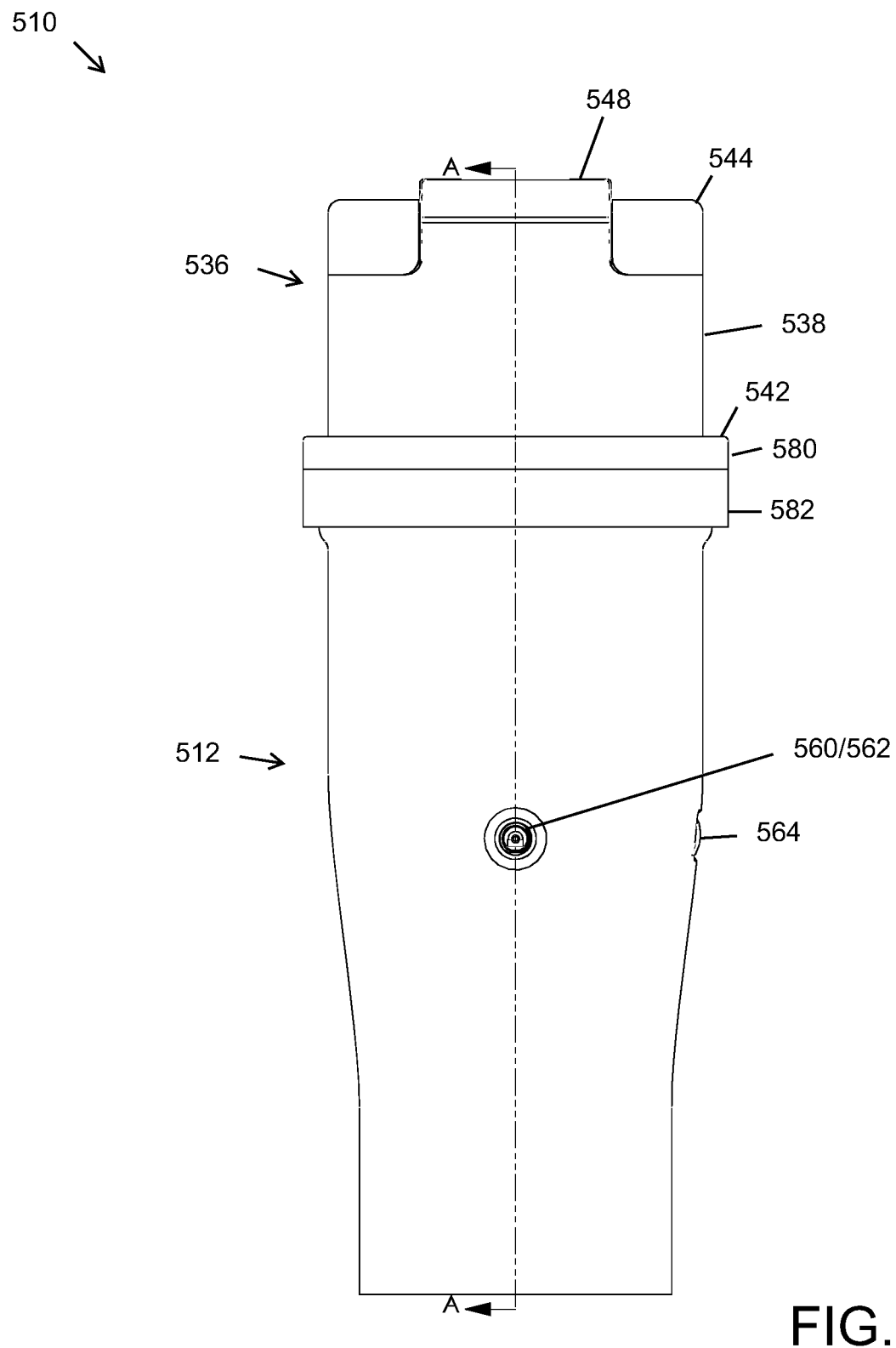
FIG. 24 is an elevation view of a first side of another embodiment of a portable coffee brewing system that has a container, a lid and a first chamber and a second chamber.
Figure 25:
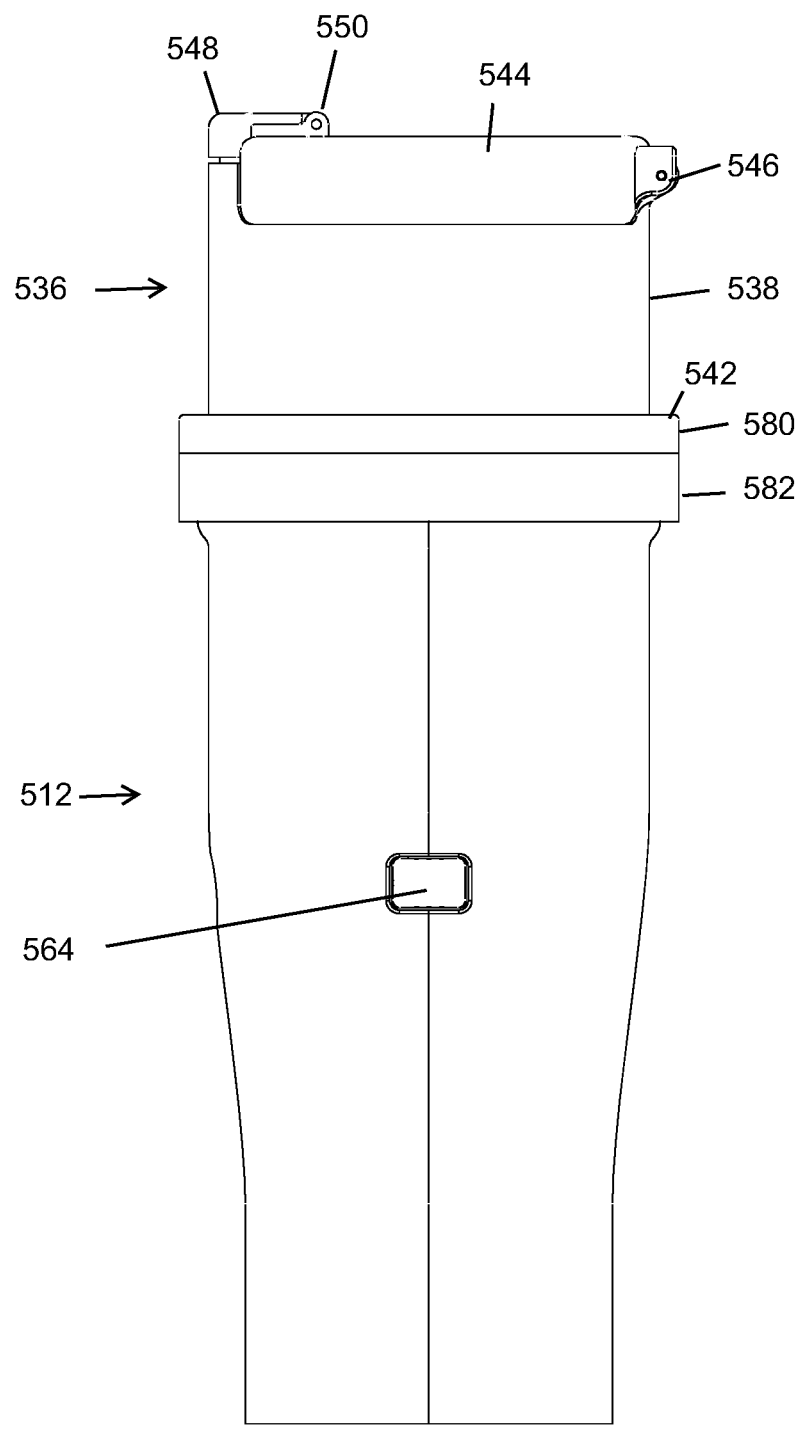
FIG. 25 is an elevation view of a second side of the portable coffee brewing system shown in FIG. 24.
Figure 26:
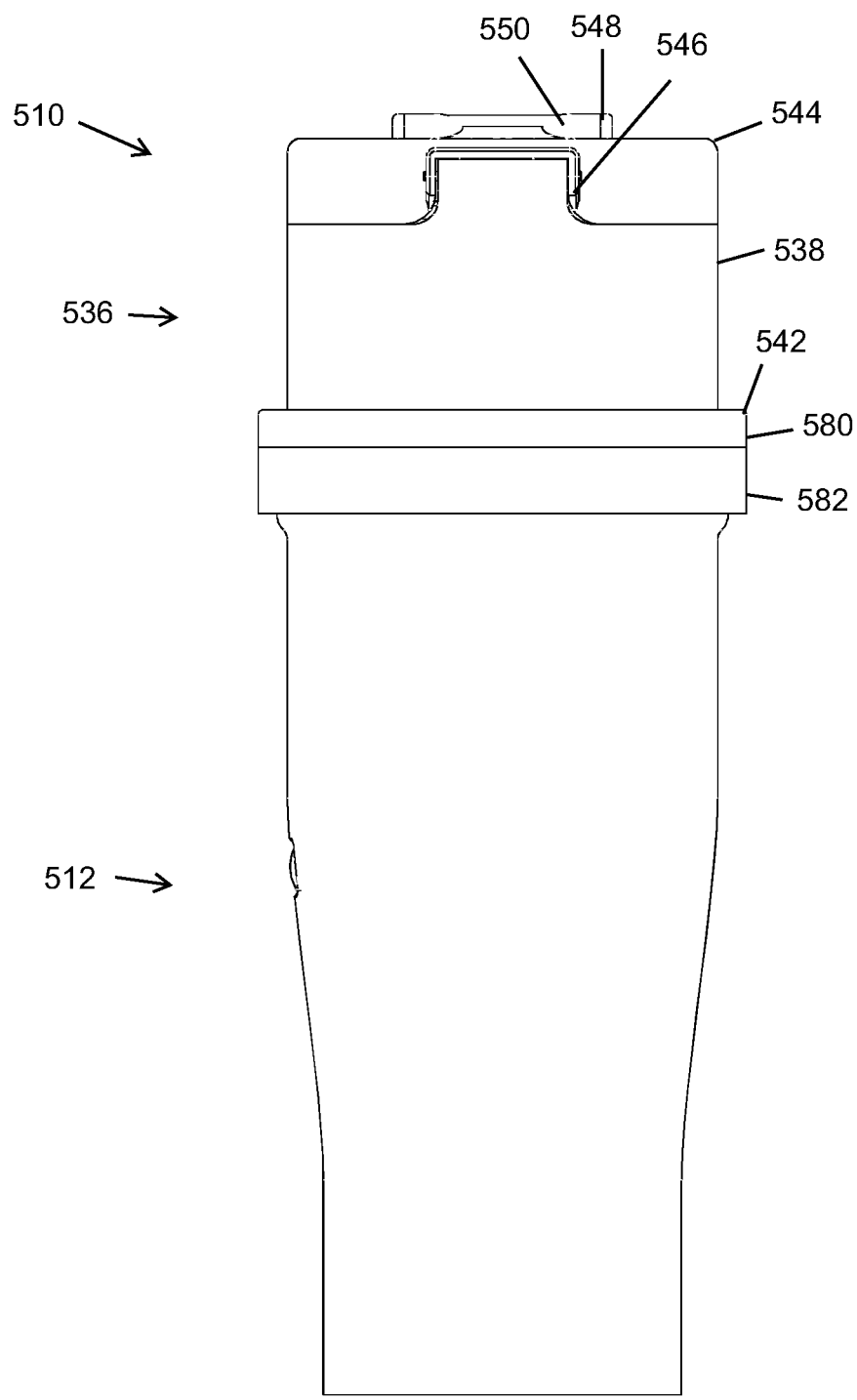
FIG. 26 is an elevation view of a third side of the portable coffee brewing system shown in FIGS. 24-25.
Figure 27:
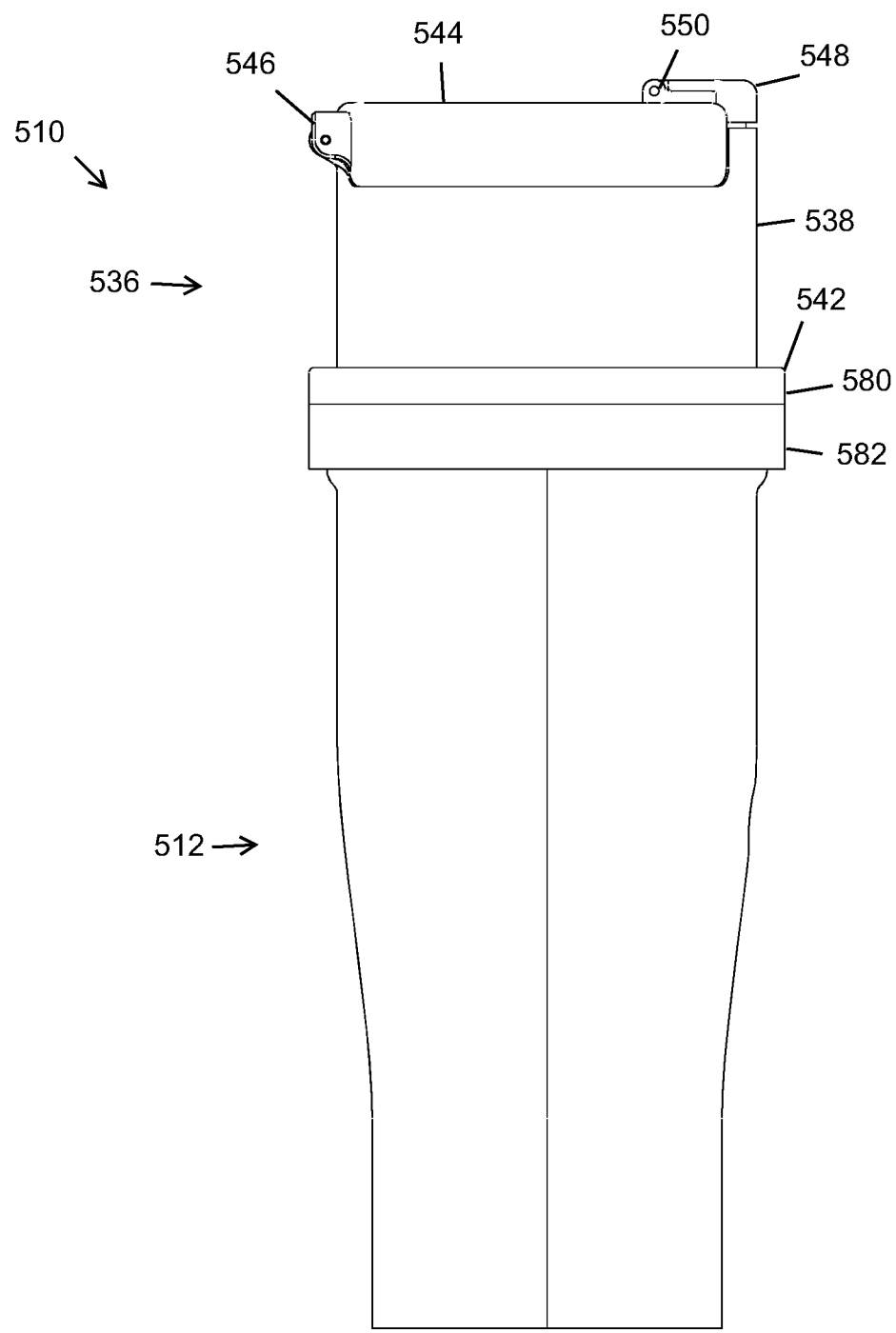
FIG. 27 is an elevation view of a fourth side of the portable coffee brewing system shown in FIGS. 24-26.
Figure 28:
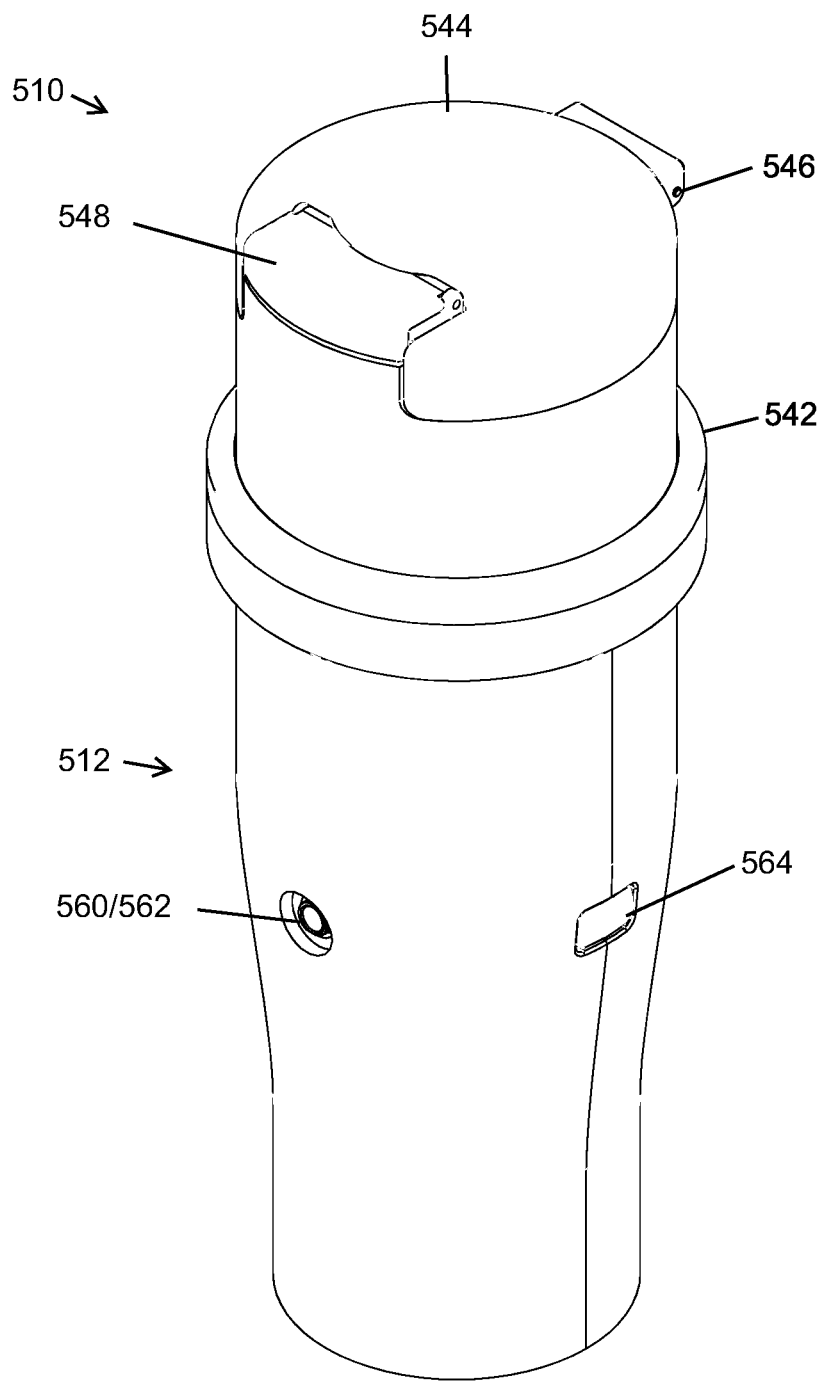
FIG. 28 is a perspective view of the portable coffee brewing system shown in FIGS. 24-27.
Figure 29:
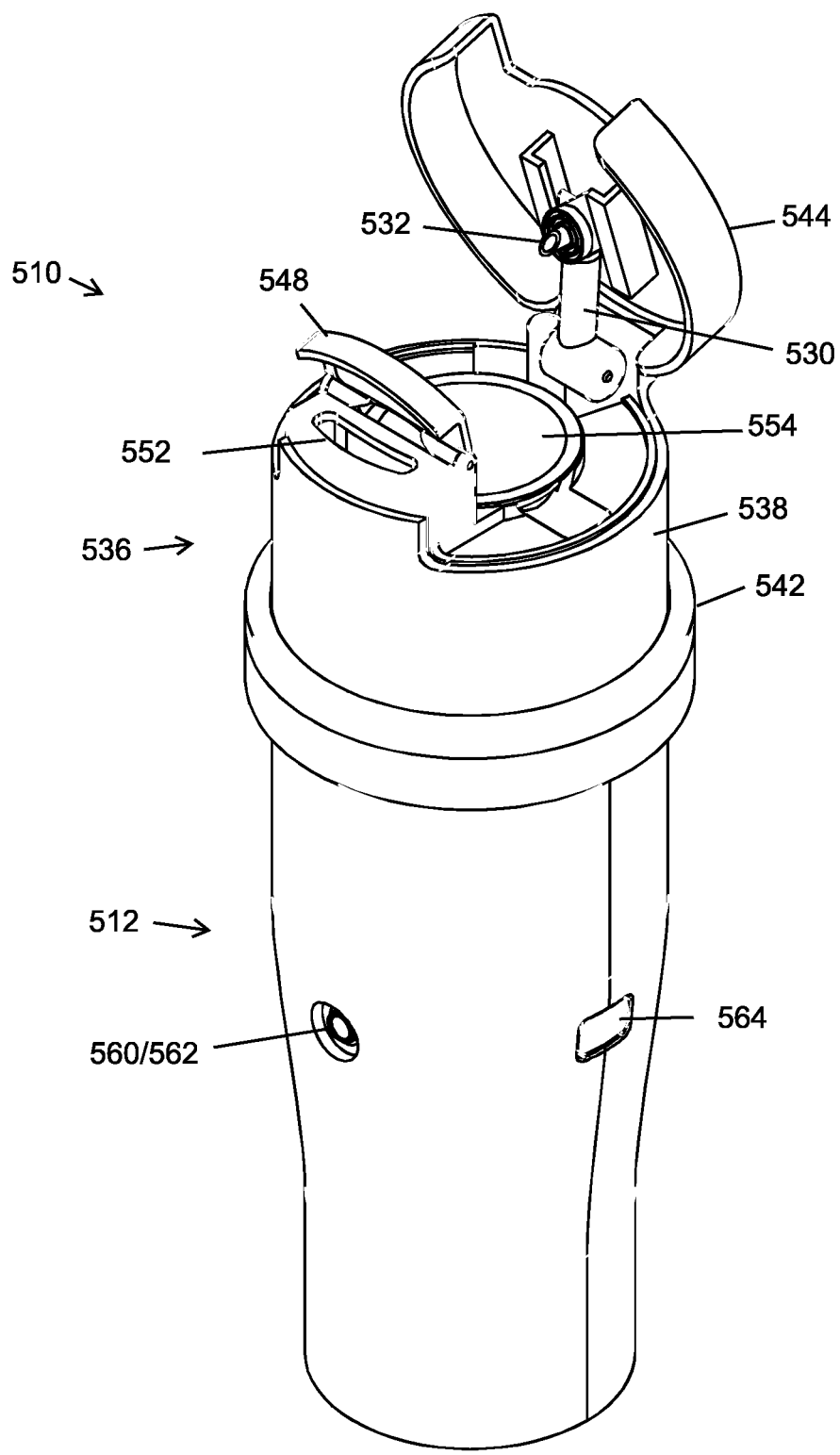
FIG. 29 is a perspective view of the portable coffee brewing system shown in FIGS. 24-28, the view showing the first cover in an open position showing the basket therein, the view also showing the second cover in an open position showing the pour spout.
Figure 30:
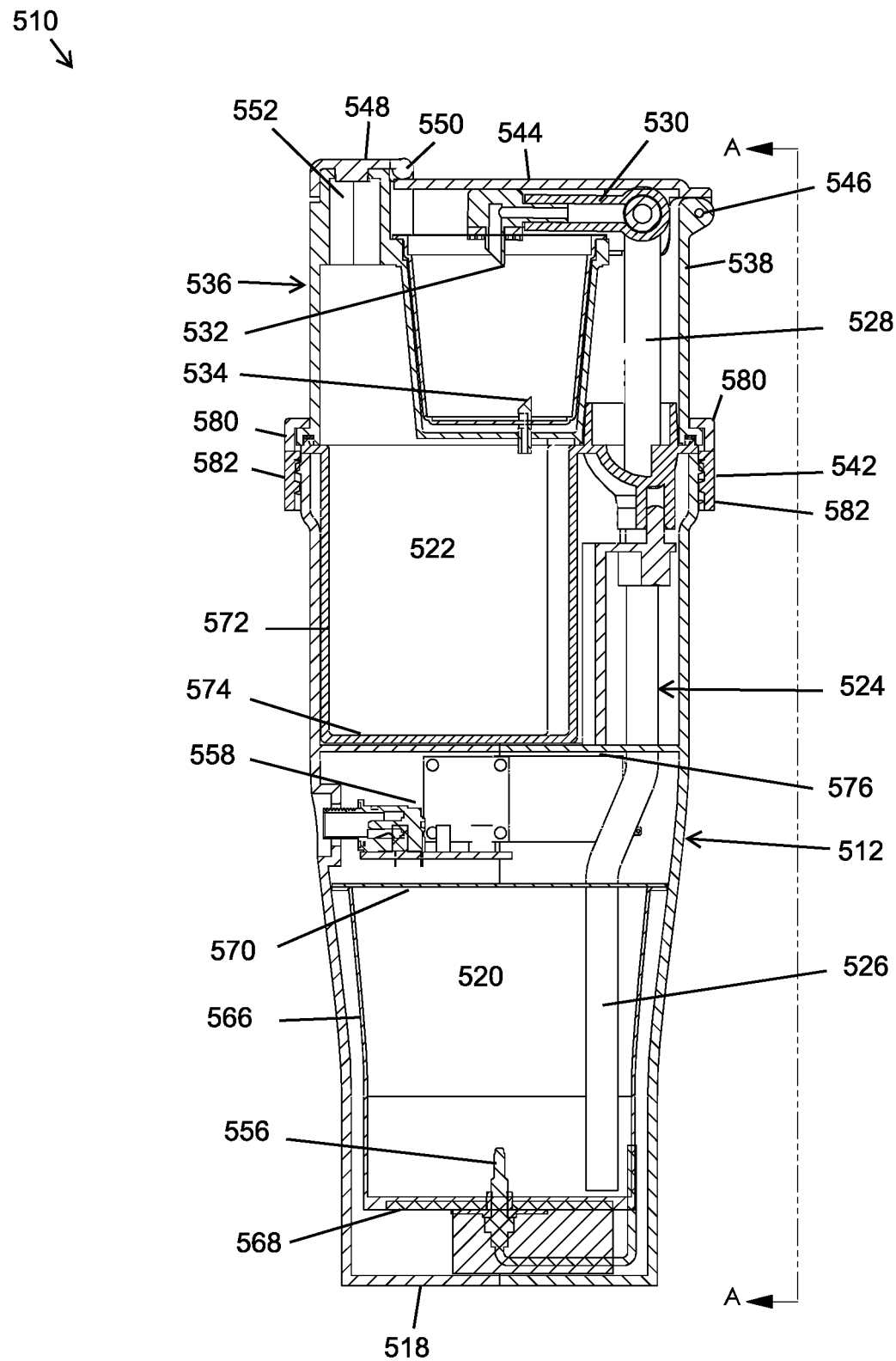
FIG. 30 is an elevation section view of the portable coffee brewing system shown in FIGS. 24-29.
Figure 31:
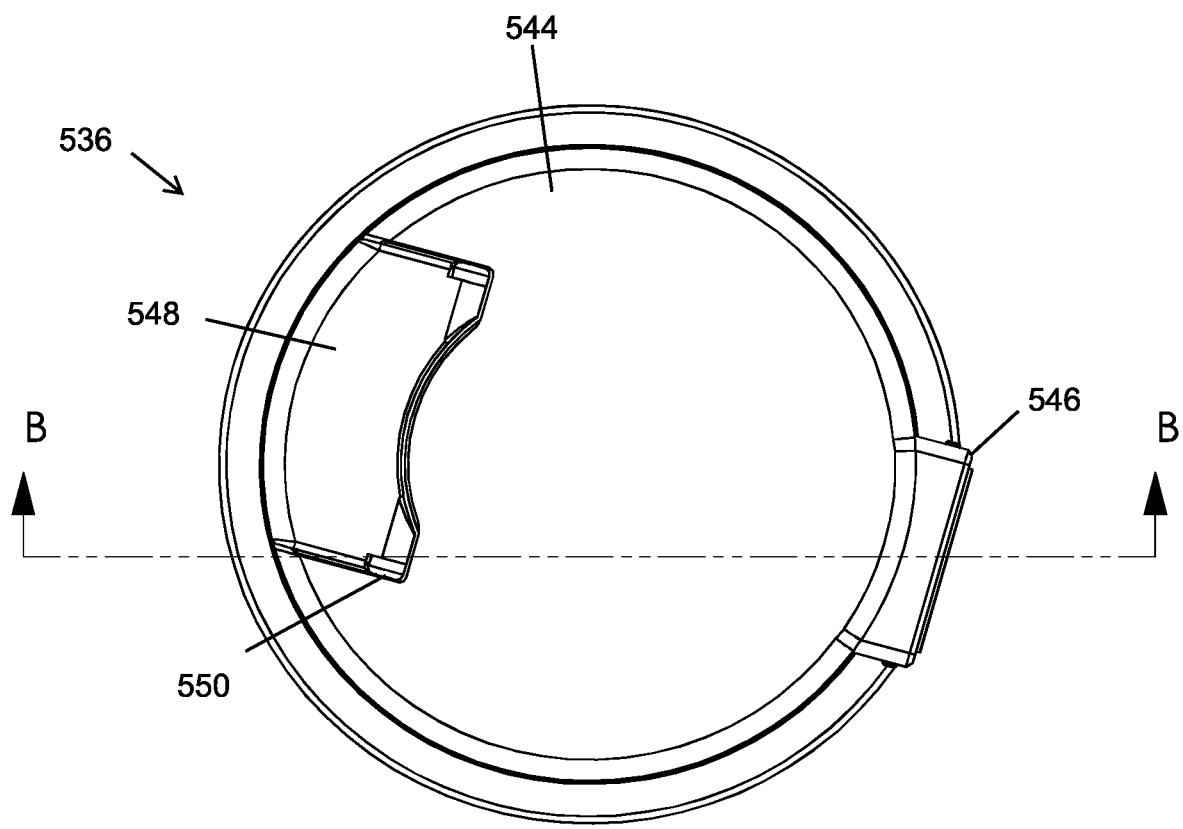
FIG. 31 is an elevation section view of the top side of the portable coffee brewing system shown in FIGS. 24-30.
Figure 32:
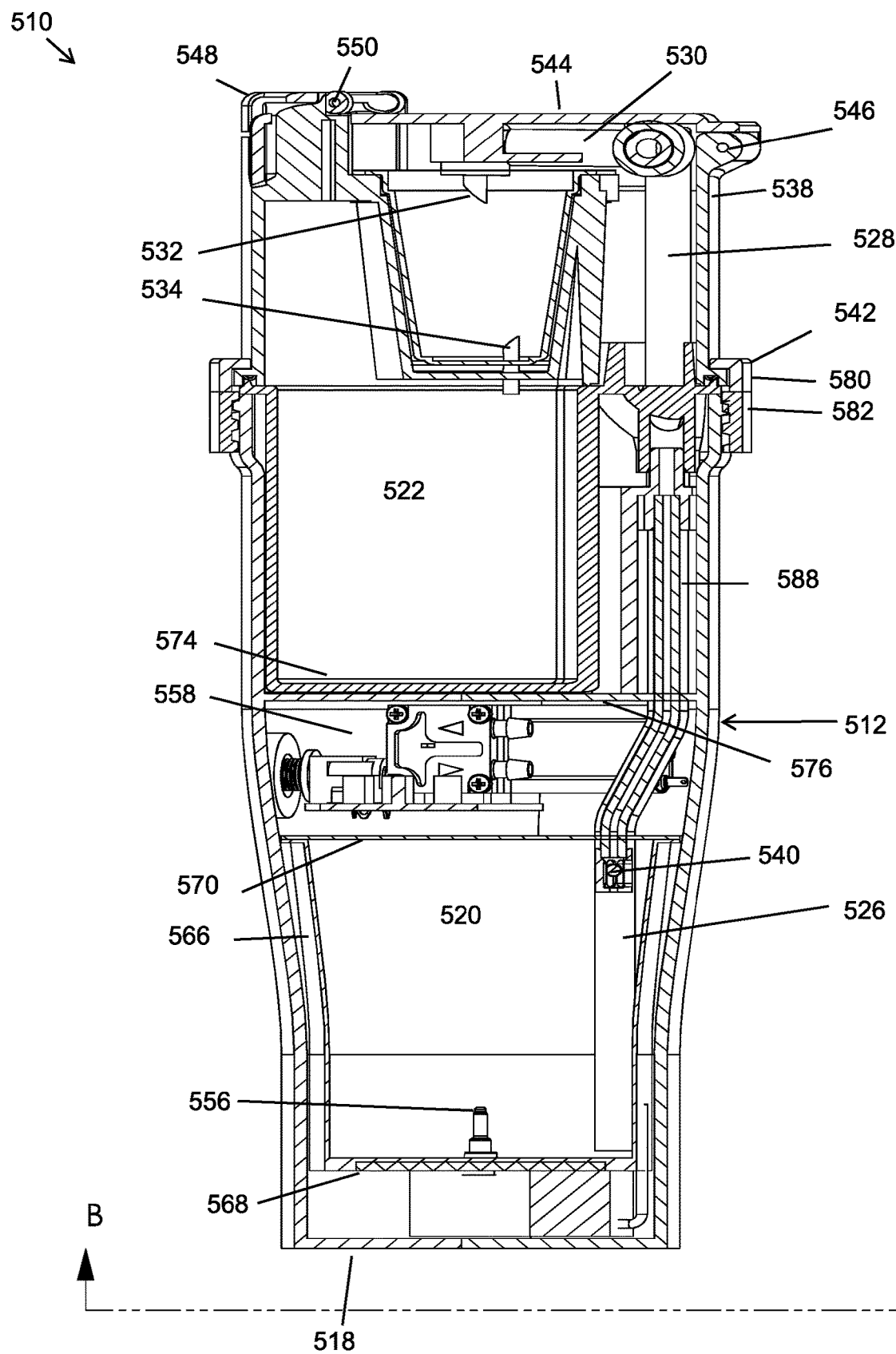
FIG. 32 is an elevation section view of the portable coffee brewing system shown in FIGS. 24-31, the section view along line BB shown in FIG. 31.
Figure 33:
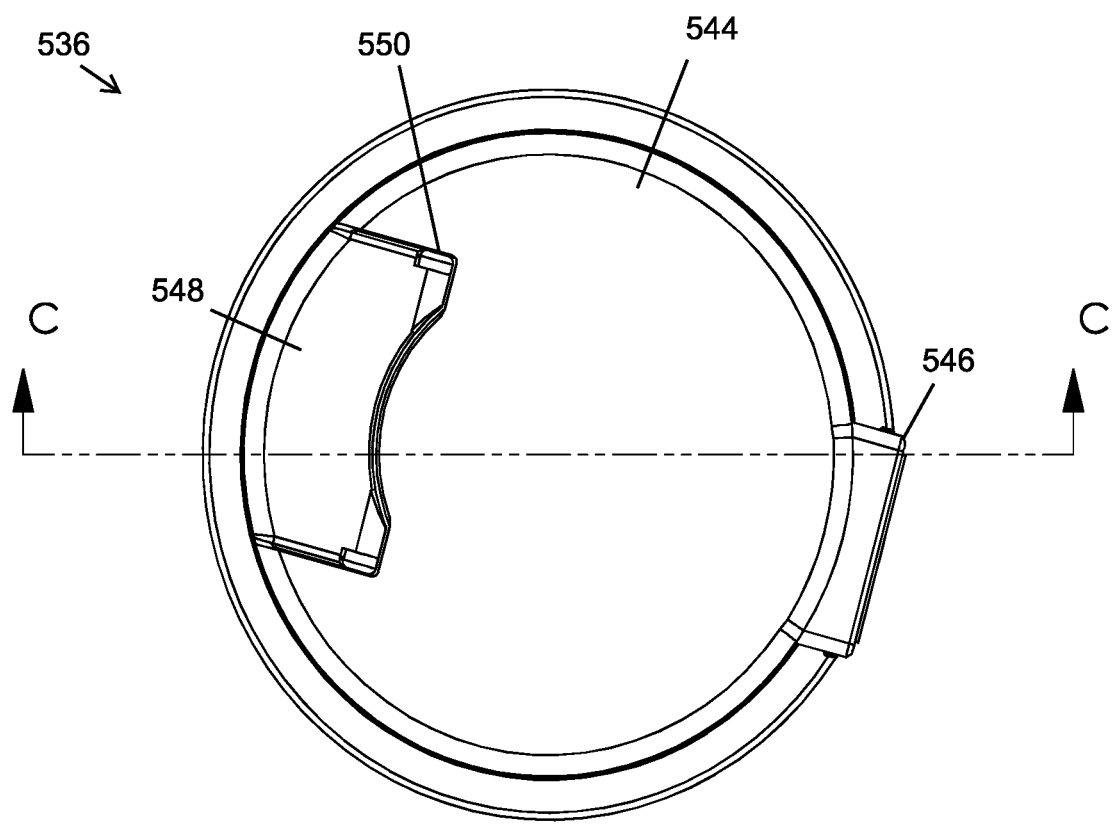
FIG. 33 is an elevation section view of the top side of the portable coffee brewing system shown in FIGS. 24-32.
Figure 34:
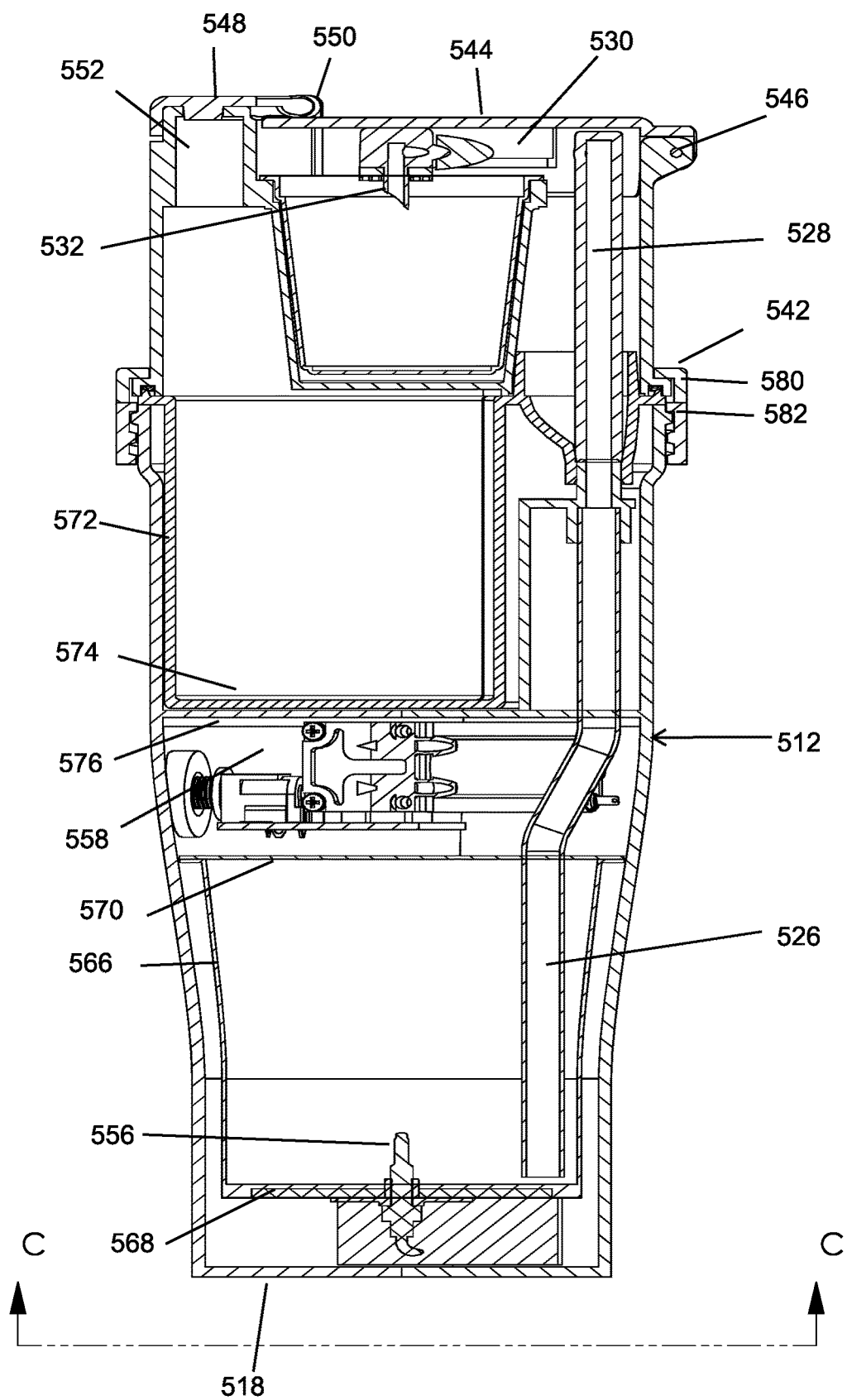
FIG. 34 is an elevation section view of the portable coffee brewing system shown in FIGS. 24-33, the section view along line CC shown in FIG. 33.
Figure 35:
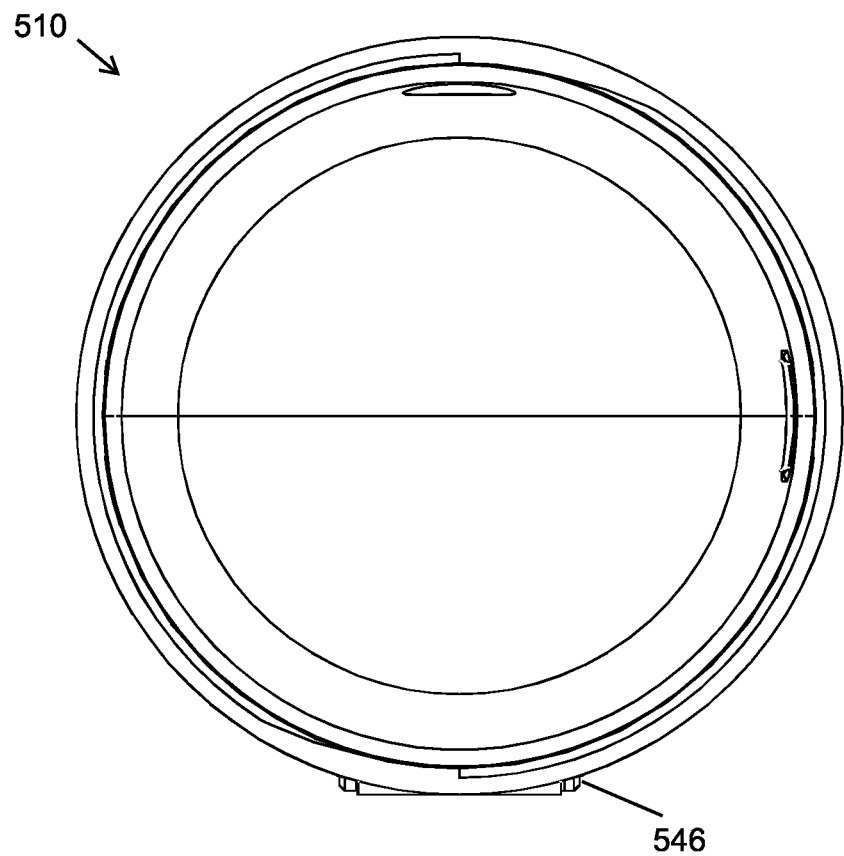
FIG. 35 is an elevation section view of the bottom side of the portable coffee brewing system shown in FIGS. 24-34.
Figure 36:
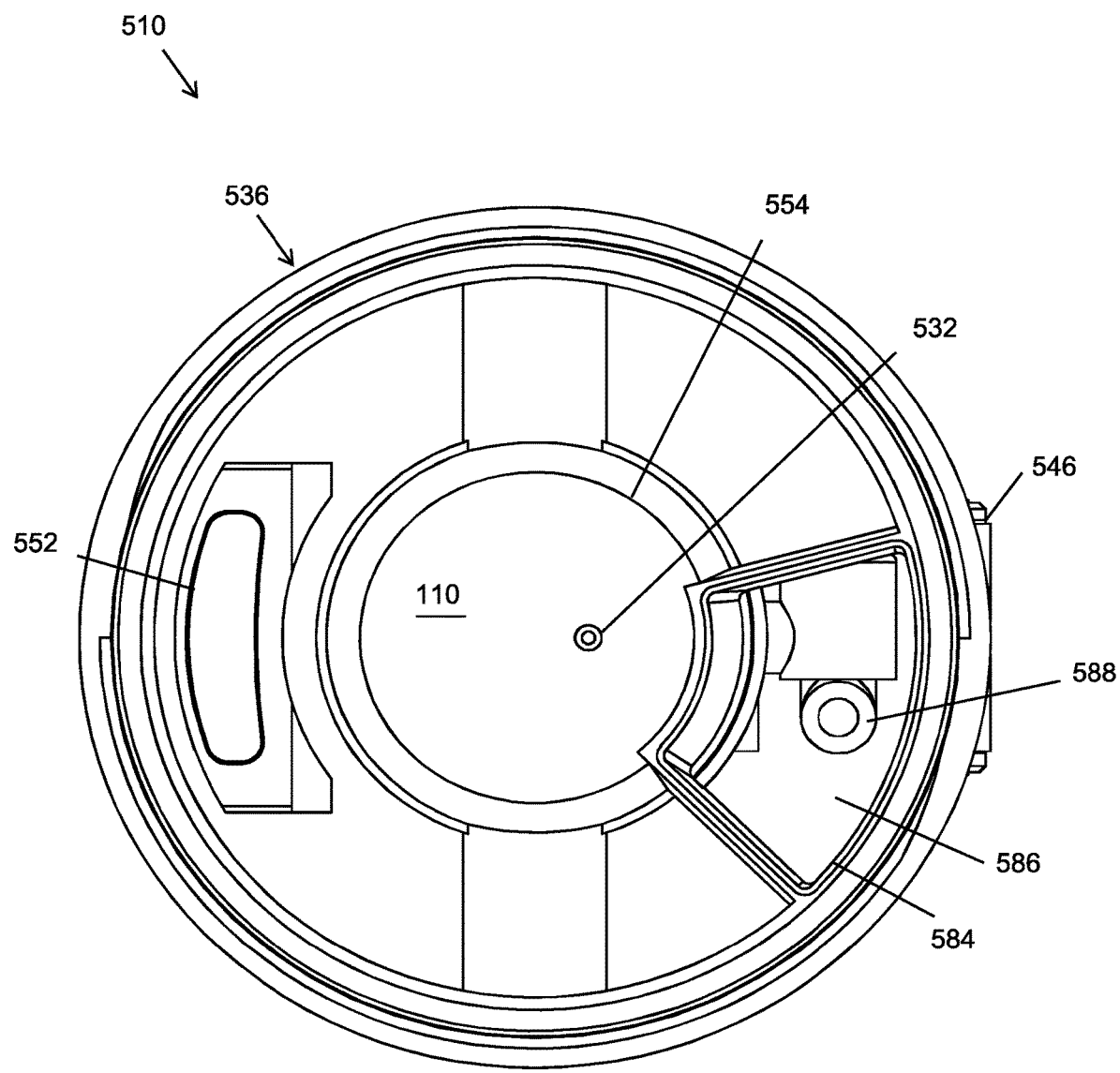
FIG. 36 is an elevation section view of the top side of the portable coffee brewing system shown in FIGS. 24-35, the view showing portions of the lid remove so as to expose the basket and fill opening.
Figure 37:
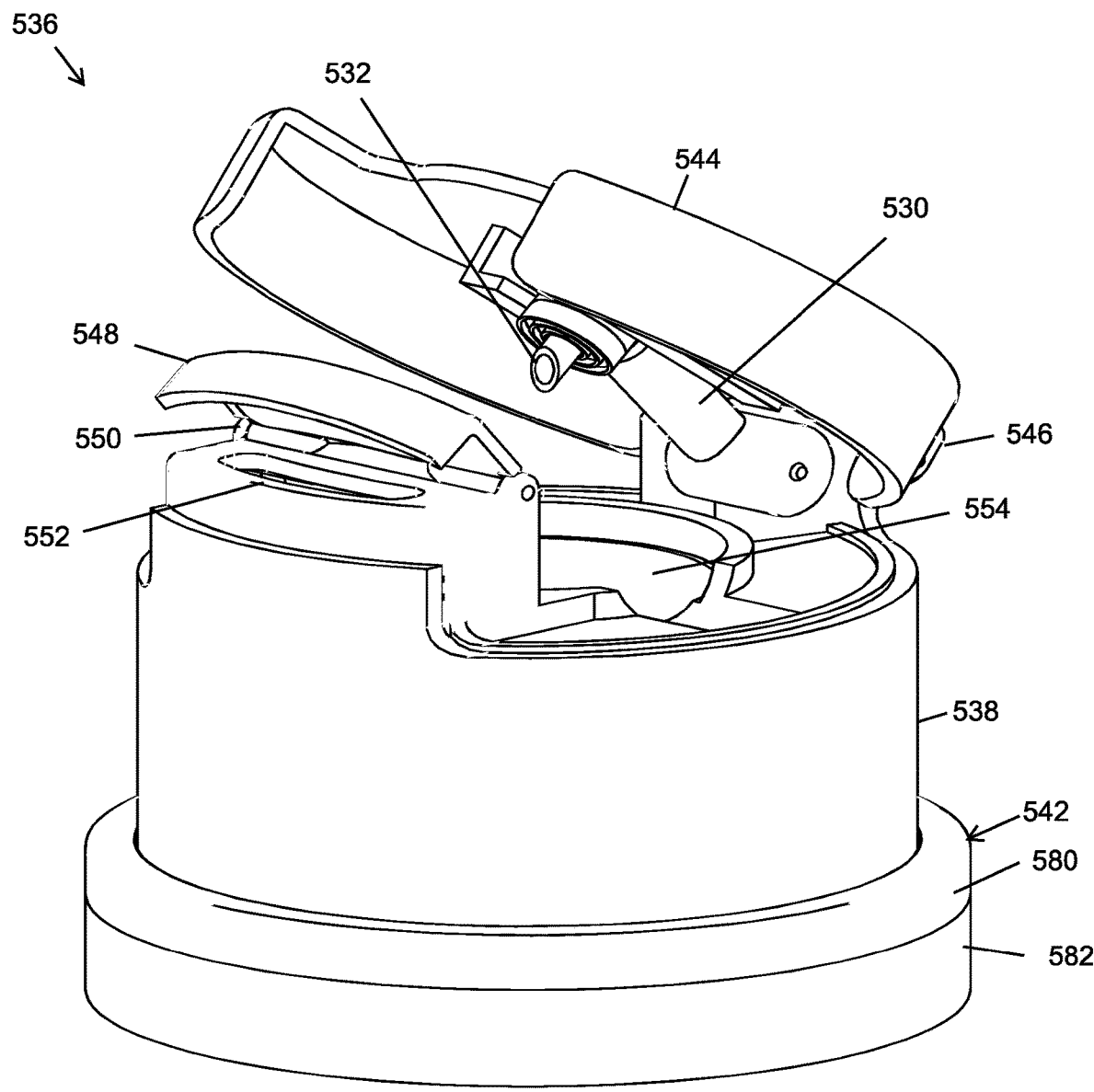
FIG. 37 is a perspective view of the lid of the portable coffee brewing system shown in FIGS. 24-36, the view showing the first cover in an open position showing the basket therein, the view also showing the second cover in an open position showing the pour spout.
Figure 38:
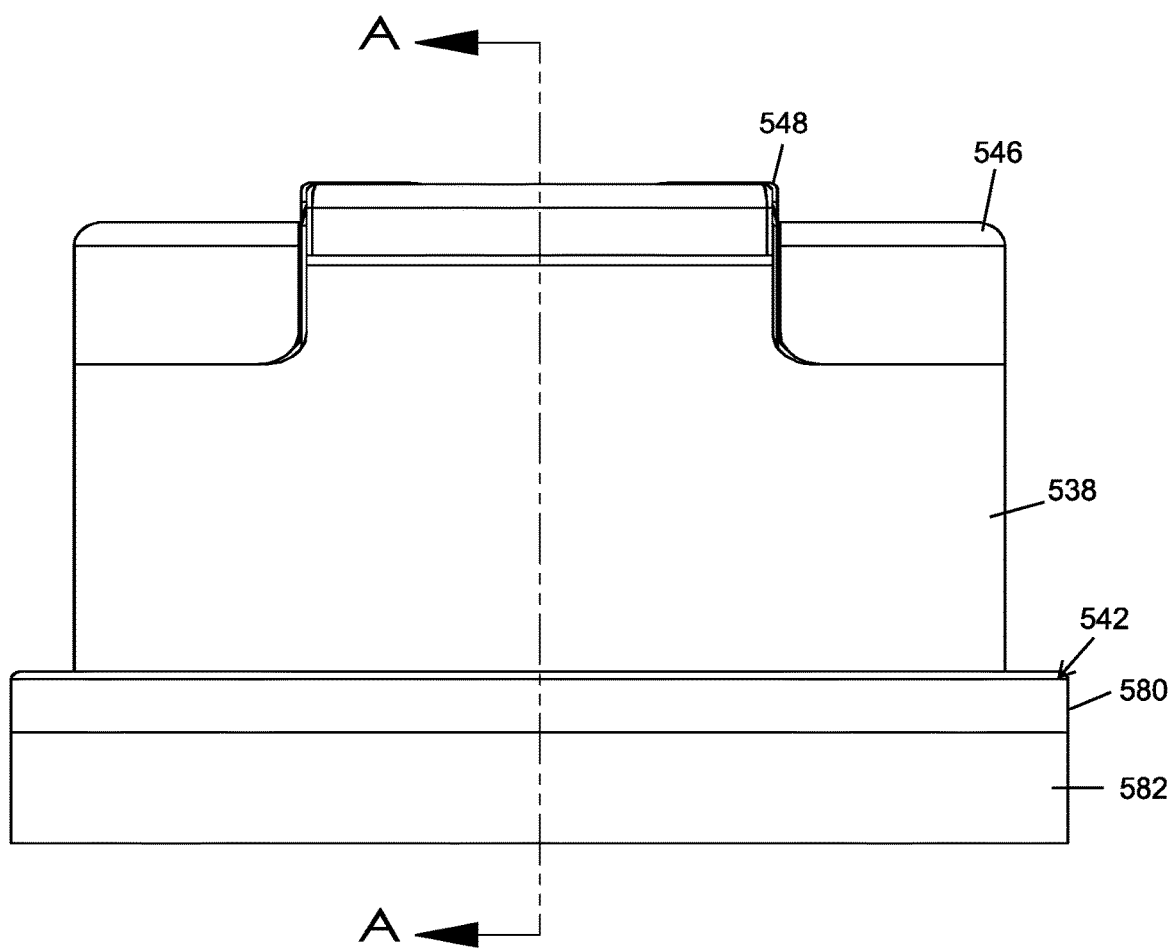
FIG. 38 is an elevation view of the lid of the portable coffee brewing system shown in FIGS. 24-37.
Figure 39:
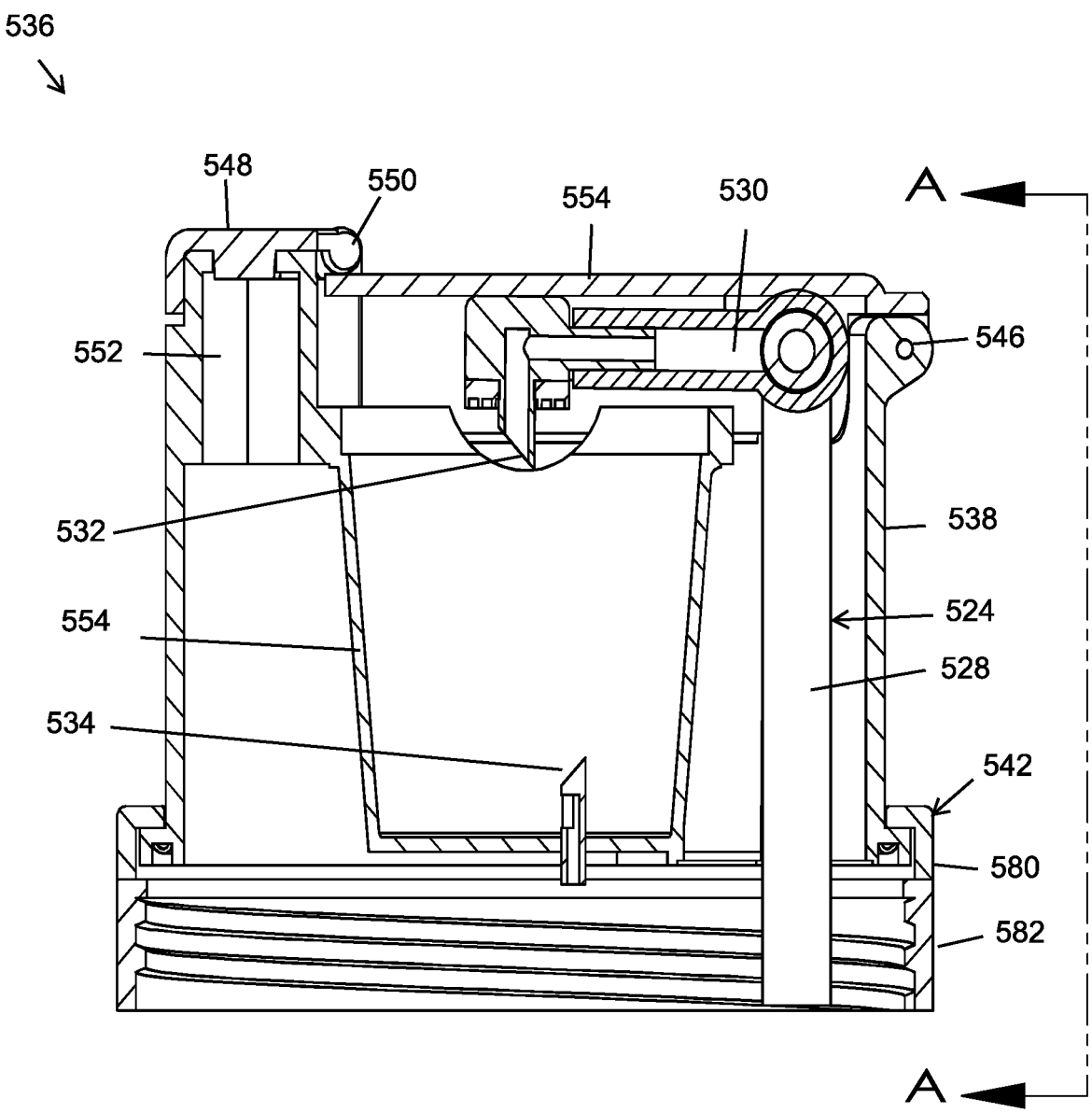
FIG. 39 is an elevation section view of the lid of the portable coffee brewing system shown in FIGS. 24-38, the section view along line AA shown in FIG. 37.
Figure 40:
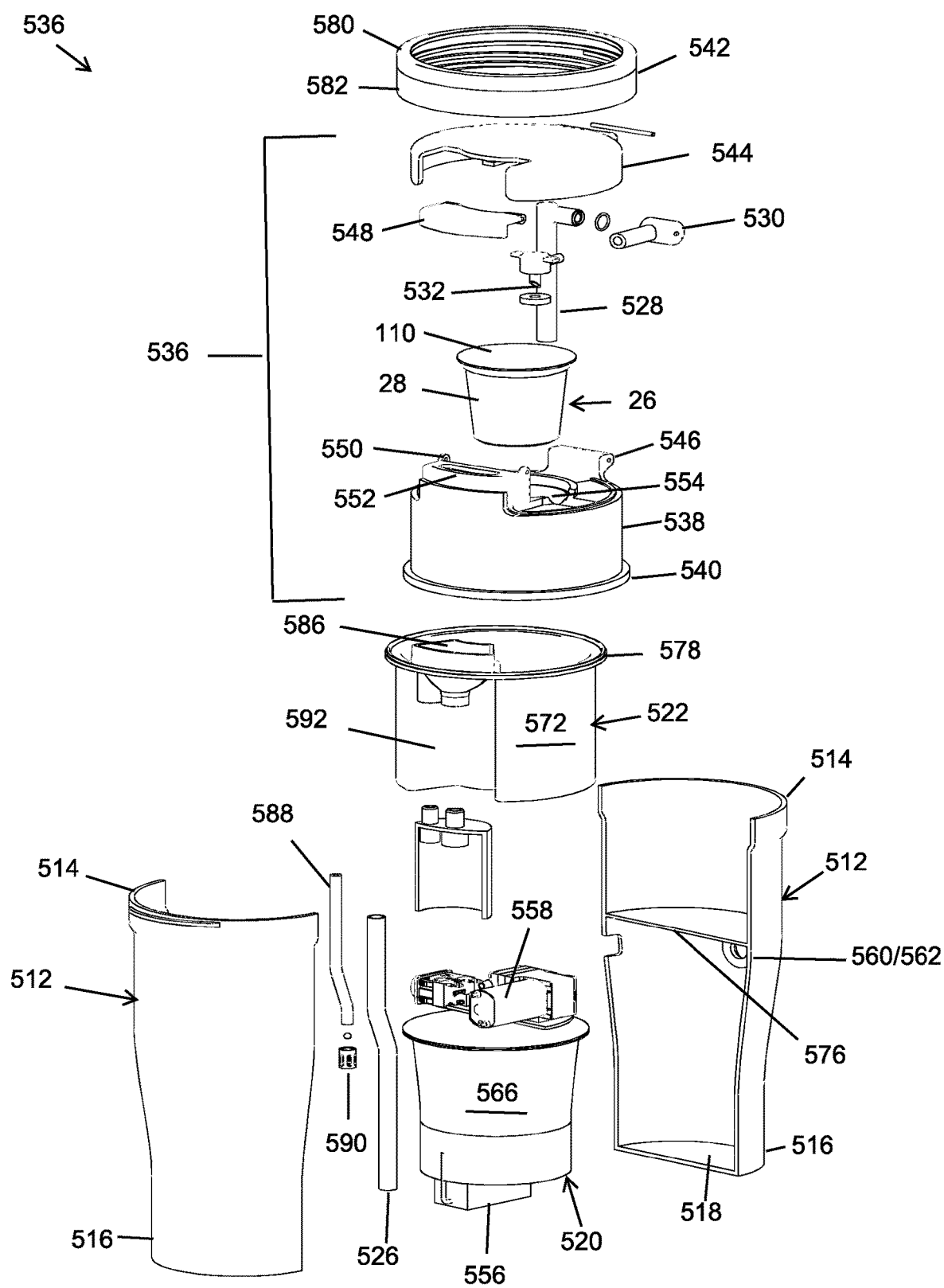
FIG. 40 is a perspective exploded view of the portable coffee brewing system shown in FIGS. 24-39.
Figure 41:
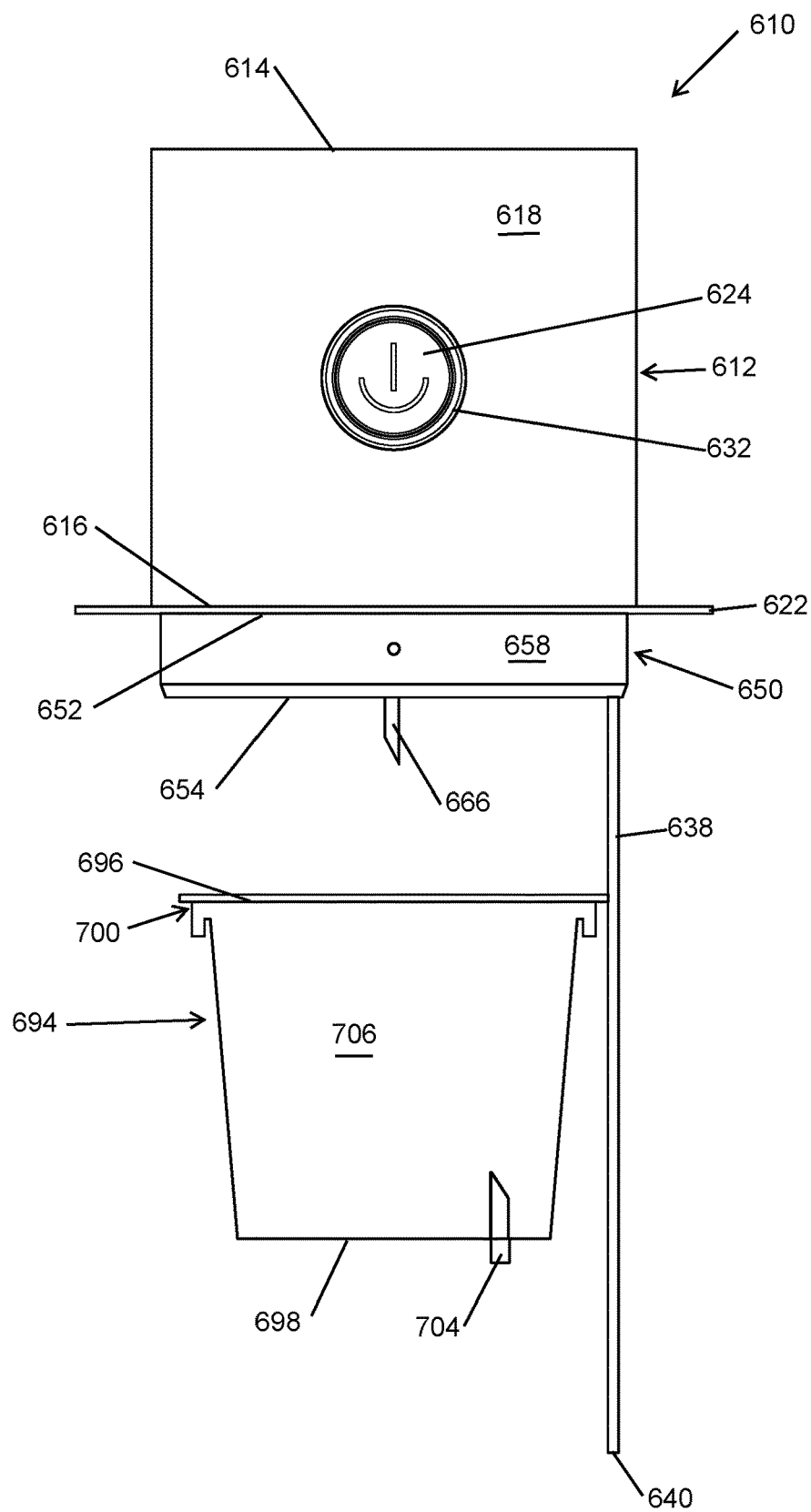
FIG. 41 is an elevation view of the top housing of the portable coffee brewing system shown in FIGS. 41-51, the view showing a top housing with an On/Off button, a basket housing, a basket and a tube.
Figure 42:
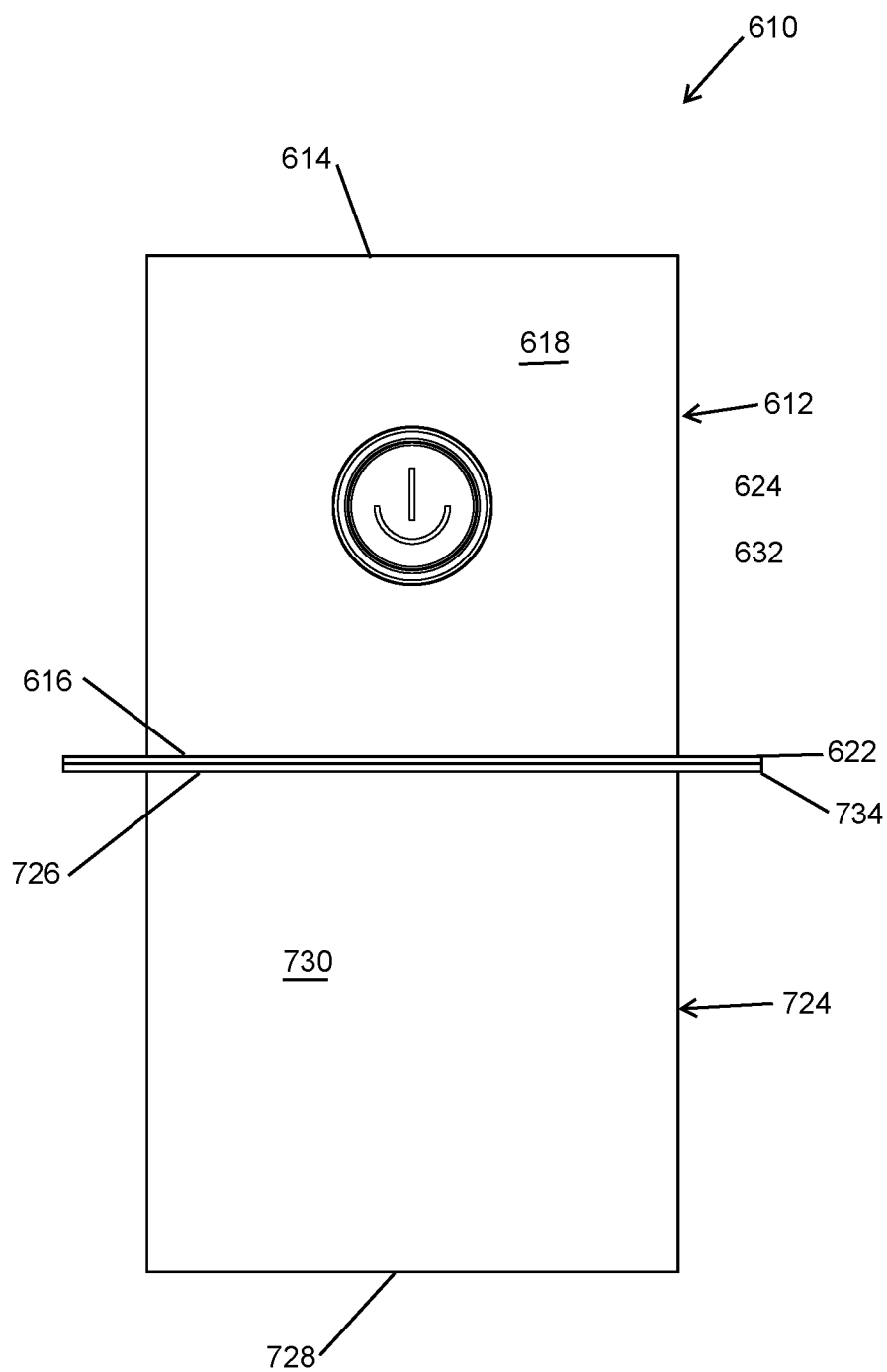
FIG. 42 is an elevation view of the portable coffee brewing system shown in FIGS. 41-51, the view showing the exterior of the connected top housing and bottom housing.
Figure 43:
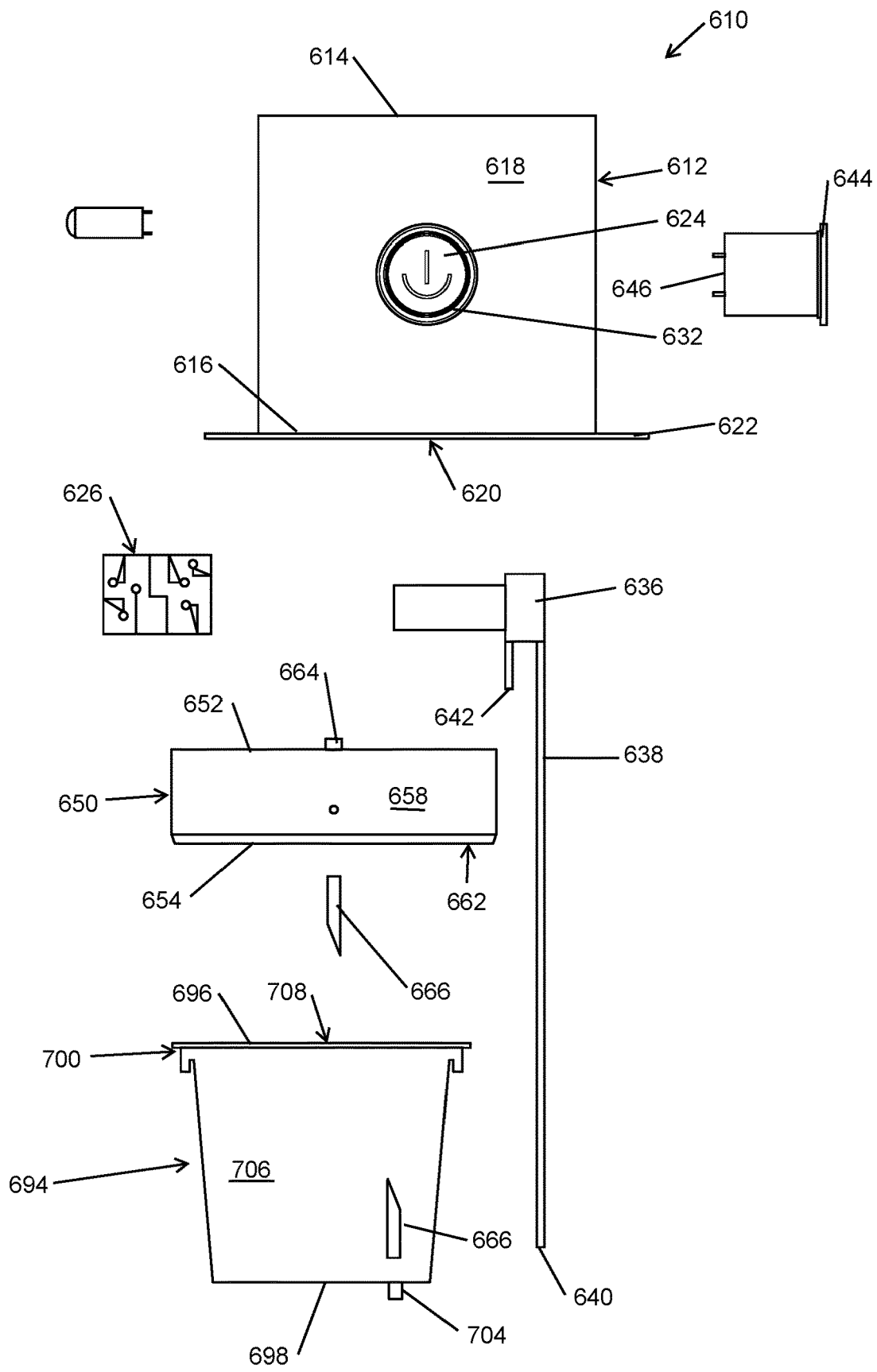
FIG. 43 is a partially exploded elevation view, the view showing the top housing, the pump, the tube, the microprocessor, the socket, the plug, the basket housing with the punch, and the basket.

Alternative Embodiment: With reference to FIG. 9, an alternative arrangement is presented that is slightly modified from the embodiment presented in FIGS. 7-8D. This alternative arrangement has a bottom component 284 which is positioned below the container 212. Bottom component 284 includes a drain 286 which fluidly connects to the bottom of container 212. Drain is fluidly connected to pump 246 which is fluidly connected to heating element 248. Heating element 248 fluidly connects to lower straw 232 which fluidly connect to upper straw 250. Upper straw 250 dispenses fluid onto the coffee grounds within the coffee basin 234. The remaining components of the system 210 are similar, if not identical to the system described herein.

Another Alternative Arrangement: With reference to FIGS. 10-23 an alternative arrangement is presented that is slightly modified from the embodiments presented in FIGS. 1-9. In this arrangement, a portable coffee brewing system 310 is presented that includes a container 312, a sleeve 314 positioned within the container 312, a heating element 316 positioned between the sleeve 314 and the container 312, an electrical components housing 318 connected to a lower end 320 of the container 312, and a lid 322 connected to the upper end 324 of the container 312.

Container: Container 312 is formed of any suitable size, shape and design and is any form of a liquid holding vessel such as a cup, a mug, a travel mug, a thermal mug, or the like. In one arrangement, as is shown, container 312 includes a sidewall 28 that extends in a generally circular manner from upper end 324 to lower end 320 and defines a hollow interior 326 therein.

In the arrangement shown, the upper end 324 of container 312 includes an angled portion 328 that angles outward to an upper portion 330 that has a larger diameter than the diameter of the portion of container 312 below the angled portion 328. The angled portion 328 and larger diameter upper portion 330 provide additional space for the components of lid 322 therein.

Container 312 also includes a plurality of vents 332 positioned at the lower end 320 of container 312. Vents 332 are configured to vent heat out of container 312 during operation of the device 310. Vents 332 also allow for the drainage of water or condensation that gets between container 312 and sleeve 314.

A hinge 334 is connected to the upper end 324 of upper portion 330 of container 312. Hinge 334 serves to pivotally connect lid 322 to container 312. The upper end 324 of container 312 also includes a catch 336 that is configured to receive latch 338 connected to lid 322 when lid 322 is in a closed position.

Sleeve: Sleeve 314 is formed of any suitable size, shape and design and is configured to fit within container 312 and hold liquid/coffee therein. In one arrangement, sleeve 314 is formed of a metallic material such as aluminum, stainless steel or the like, whereas container 312 is formed of a plastic or composite material. In the arrangement shown, sleeve 314 is configured to fit within container 312 and generally follow the contours of container 312 with a space between the exterior surface of sleeve 314 and the interior surface of container 312. More specifically, like container 312, sleeve 314 has a generally cylindrical sidewall that extends from a lower end 320 to an upper end 324 and includes an angled portion 328 that connects to upper portion 330 that has a larger diameter than the portion of sleeve below the angled portion.

A lip 340 is connected to the upper end 324 of sleeve 314 and extends outward therefrom. Lip 340 connects to the upper end 324 of container 312 and in one arrangement seals to container 312. Lip 340 helps to prevent liquid from getting between container 213 and sleeve 314. Lip 340 also helps to index the position of sleeve 314 within container 312. That is, sleeve 314 is fully inserted within container 312 when lip 340 engages the upper end 324 of container 312.

The lower end 320 of sleeve 314 includes a bottom wall 342 that closes the lower end 320 of sleeve 314. Bottom wall 342 includes a drain 344 that is fluidly connected to an inlet side of pump 346. Bottom wall 342 also includes an output opening 348 that is fluidly connected to an output side of pump 346. In this way, when pump 346 is activated, fluid is sucked from the hollow interior 326 of sleeve 314/container 312 through drain 344 and then is pumped out of output opening 348.

In one arrangement, sleeve 314 is removable from container 312 thereby allowing for easy cleaning of sleeve 314, such as by throwing the sleeve 314 in the dishwasher. In another arrangement, sleeve 314 is non-removable from container 312, thereby ensuring a proper and enduring seal is made between sleeve 314 and container 314 thereby preventing any liquid from getting between sleeve 314 and container 312.

Heating Element: Heating element 316 is formed of any suitable size, shape and design. In the arrangement shown, heating element 316 is positioned within the space between the interior surface of container 312 and the exterior surface of sleeve 314. In the arrangement shown, heating element 316 is formed of a flexible pad that includes a heating element therein. In one arrangement, the pad material is formed of silicone, or a flexible silicone composite, or alternatively the pad material is formed of plastic or any other composite material.

In the arrangement shown, heating element 316 is wrapped around the exterior cylindrical surface of sleeve 314 between the lower edge of angled portion 328 and the bottom wall 342. In one arrangement, to maximize heat transfer to the sleeve 314 and the liquid contained within sleeve 314, heating element 316 is adhered directly to the exterior surface of sleeve 314 using an adhesive. In an alternative arrangement, to maximize heat transfer to the sleeve 314 and the liquid contained within sleeve 314, the interior surface of heating element 316 is bonded to the exterior surface of sleeve 314 using a heat transfer compound, a heat transfer paste, a heat sink compound, a heat sink paste or any other material that bonds and/or helps to transfer heat from one object to another.

In one arrangement, after the heating element 316 is wrapped around the sleeve 314, thermal insulating material 350 is wrapped around the exterior surface of heating element 316. Thermal insulating material 350 is formed of any material or device that helps to insulate the exterior surface of heating element 316, and thereby help to direct or focus the heat produced by heating element 316 toward sleeve 314 and away from container 312. In one arrangement, thermal insulating material 350 is a thermally insulating tape, such as an aluminum tape, a metallic tape, fiberglass tape, a ceramic tape or any other type of tape that helps to direct and focus the heat produced by heating element 316 inward. In one arrangement, thermal insulating material 350 adheres to the exterior surface of heating element 316 and thereby helps to hold heating element 314 firmly onto sleeve 314 thereby improving and maximizing the heat transfer into sleeve 314. By wrapping heating element 316 with tape, this also helps to maintain the dimensional size, shape and accuracy of the sleeve 314 with the heating element 316 positioned there around, which eases assembly of sleeve 314 into container 312.

Heating element 316 electrically connects to microprocessor 352 which, in operation, controls operation of heating element 316 which serves to heat the liquid within sleeve 314.

While in the arrangement shown in FIGS. 10-23 the heating element 316 wraps around the sleeve 314, in an alternative arrangement the heating element 316 is positioned adjacent the bottom of sleeve 314.

In an alternative arrangement, heating element 316 is formed of what is known as a thick film heating element also known as thick film conduction heater. Thick film heating elements are formed of a thick film that includes a heating element therein that is connected to or adhered with a substrate film. The thick film heating element can be adhered or bonded directly to the exterior surface of sleeve 314, or alternatively the thick film heating element is printed directly onto the exterior surface of sleeve 314. Thick film heating elements are known for fast response and uniform heating as well as maximum heat transfer, thermal efficiency and temperature uniformity all while in a thin package that provide maximum room for other components. They provide maximum temperature response in a low profile package. They provide ultra-fast temperature ramp and allows for quick cool down. They allow for uniform temperatures to be provided across the heater's surface area in addition they can be precisely controlled. The use of a thick film heating element allows the space between the sleeve 314 and container 312 to be a minimum. Also, the use of a thick film heating element allows the use of additional or thicker insulation around the thick film heating element and sleeve 314 thereby additionally improving thermal efficiency. One manufacturer of these thick film heating elements is Watlow Electric Manufacturing Company having an address of 12001 Lackland Road St. Louis Missouri 63146.

Electrical Components Housing: Electrical components housing 318 is connected to the lower end 320 of container 312 and houses microprocessor 352, pump 346, and transceiver 354. Electrical components housing 318 is formed of any suitable size, shape and design. In the arrangement shown, electrical components housing 318 is formed of a generally cylindrical member having an upper portion 356 and a lower portion 358.

In the arrangement shown, pump 346 is held within upper portion 356 of electrical components housing 318. In addition, sensor 360 is held within the upper portion 356. Sensor 360 is any form of a device which senses operational characteristics of the system 310, such as temperature, or the like. Sensor 360 transmits the sensed information, such as temperature, to microprocessor 352, from this information microprocessor 352 controls operation of the system 310.

A circuit board 362 is also held with electrical components housing 318. In the arrangement shown, circuit board 362 is held between the upper portion 356 and the lower portion 358. By spacing the circuit board 362 a distance away from the heating element 316, this spacing tends to attenuate or reduce the heat received by the sensitive electrical components of circuit board 362. In one arrangement, circuit board 362 includes or is electrically connected to all of the electrical components that control operation of system 310 including microprocessor 352 and transceiver 354.

Microprocessor 352 is any device which receives information or signals, processes the information or signals and executes instructions stored in memory. In this way, microprocessor 352 controls operation of the system 310. Transceiver 354 is electrically connected to microprocessor 352. Transceiver 354 is any device that transmits and/or receives signals through an antenna 364. Antenna 364 is any device which converts electric power into radio waves, and vice versa. In this way, the connection of transceiver 354 and antenna 364 allow for wireless control of system 310, as is further described herein, by sending and receiving wireless control signals through transceiver 354 and antenna 364.

Electrical components housing 318 also includes a switch 366 therein. Switch 366 is any device which turns the power on or off to the electrical components of system 310. Electrical components housing 318 also includes a socket that is configured to receive an electrical connection to an external power source, such as by plugging the system 10 into a USB port or a conventional wall plug.

Lid & Basket: Lid 322 is connected to the upper end 324 of container 312 and sleeve 314. Lid 322 is formed of any suitable size shape and design and serves to close the upper end 324 of container 312 and sleeve 314. In the arrangement shown, lid 322 is hingedly connected to container 312 by hinge 334 which allows lid 322 to rotate between an open position and a closed position. In a closed position, engagement between latch 338 of lid 322 and catch 336 of container 312 hold lid 322 in a closed position.

Lid 322 includes a pour spout 370 therein that provides a fluid passageway to the fluid held within sleeve 314. Lid 322 also includes a cover 372 that is movable between an open position where access is provided to pour spout 370 and a closed position where cover 372 closes pour spout 370.

A basket 374 is positioned between lid 322 and container 312, and/or is held between lid 322 and container 312. Basket 374 is formed of any suitable size, shape and design and is configured to hold coffee grounds therein during the brewing process. In one arrangement, as is shown, basket 374 includes an opening 376 that is sized and shaped to receive a coffee grounds holding device 378. Coffee grounds holding device 378 is formed of any suitable size, shape and design, and is in one arrangement is a K-Cup made commercially popular by Keurig Green Mountain, which is headquartered in Waterbury, Vermont, however any other form of a coffee grounds holding device is hereby contemplated for use with the system 310.

Basket 374 includes a lip 380 positioned at its upper end that engages or indexes to lip 340 of sleeve 314 such that when lip 380 of basket is in engagement with lip 340 of sleeve 314, basket 374 is fully inserted within container 312/sleeve 314. In this position, basket 374 is held in place between the container 312 and sleeve 314 on its lower side and lid 322 on its upper side when lid 322 is in a closed position over basket 374.

Basket 374 includes a pour spout 382 therein that fluidly connects with the hollow interior 326 of sleeve 314 and pour spout 370 of lid 322. Basket 374 also includes an upper tube 384 that fluidly connects to a lower tube 386. Lower tube 386 removably connects at its lower end to output opening 348 in sleeve 314 and at its upper end to the lower end of upper tube 384 of basket 374. The upper end of upper tube 384 fluidly connects to upper punch 388 in lid 322. Upper punch 388 serves to fluidly connect to the upper end of upper tube 384 and also serves to punch a hole in the cover 390 of coffee grounds holding device 378 when lid 322 is closed on basket 374 with coffee grounds holding device 378 therein thereby providing a point of access for water to infiltrate into the coffee grounds holding device 378.

Basket 374 also includes a lower punch 392 positioned adjacent the bottom end of opening 376 that serves to punch a hole in the lower end of coffee grounds holding device 378 when lid 322 is closed on basket 374 with coffee grounds holding device 378 therein thereby providing a passageway for water to exit the coffee grounds holding device 378 through drain 394 in the lower end of basket 374.

When lid 322 is open, the sharp point of upper punch 388 is exposed. To provide an additional layer of safety, lid 322 includes a rotatable punch cover 396. When lid 322 is in an open position, punch cover 396 rotates into place thereby covering the sharp end of upper punch 388. When lid 322 is closed, punch cover 396 rotates thereby exposing upper punch 388 thereby allowing the sharp point of upper punch 388 to penetrate the cover 390 of coffee grounds holding device 378.

Basket 374 is removable from sleeve 314 and container 312 thereby facilitating easy cleaning of basket 374. Removing basket 374 also allows for easy removal of lower tube 386 for cleaning purpose. Removing basket 374 also allows for easy cleaning of the interior surface of sleeve 314.

Figure 3:
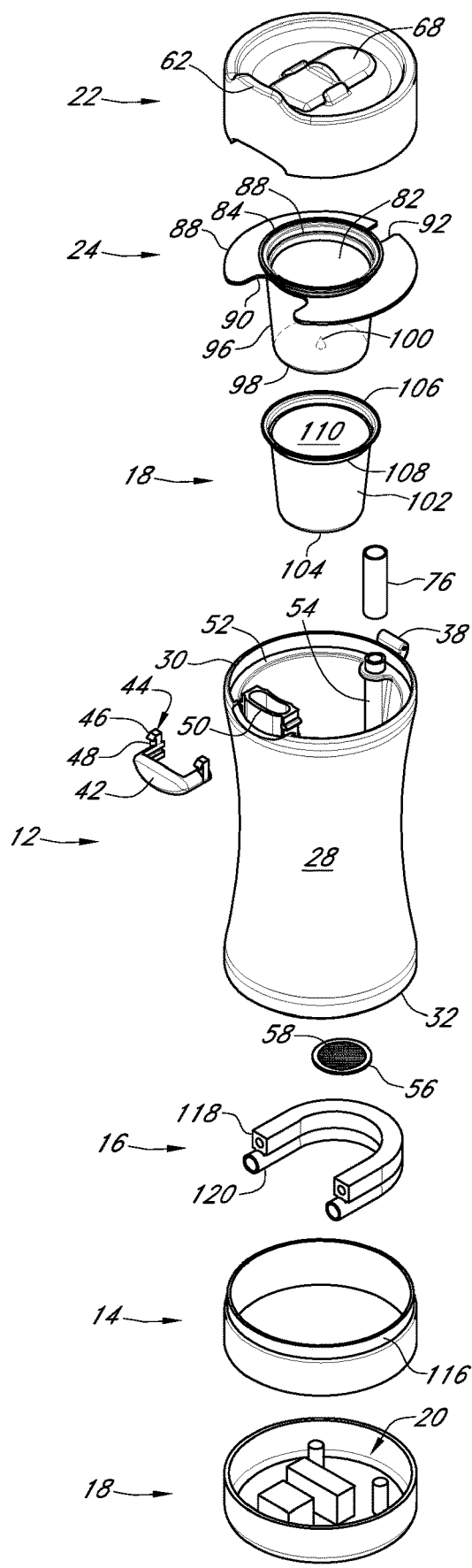
FIG. 3 is a perspective exploded view of a portable coffee brewing system showing the components thereof.
Figure 4:
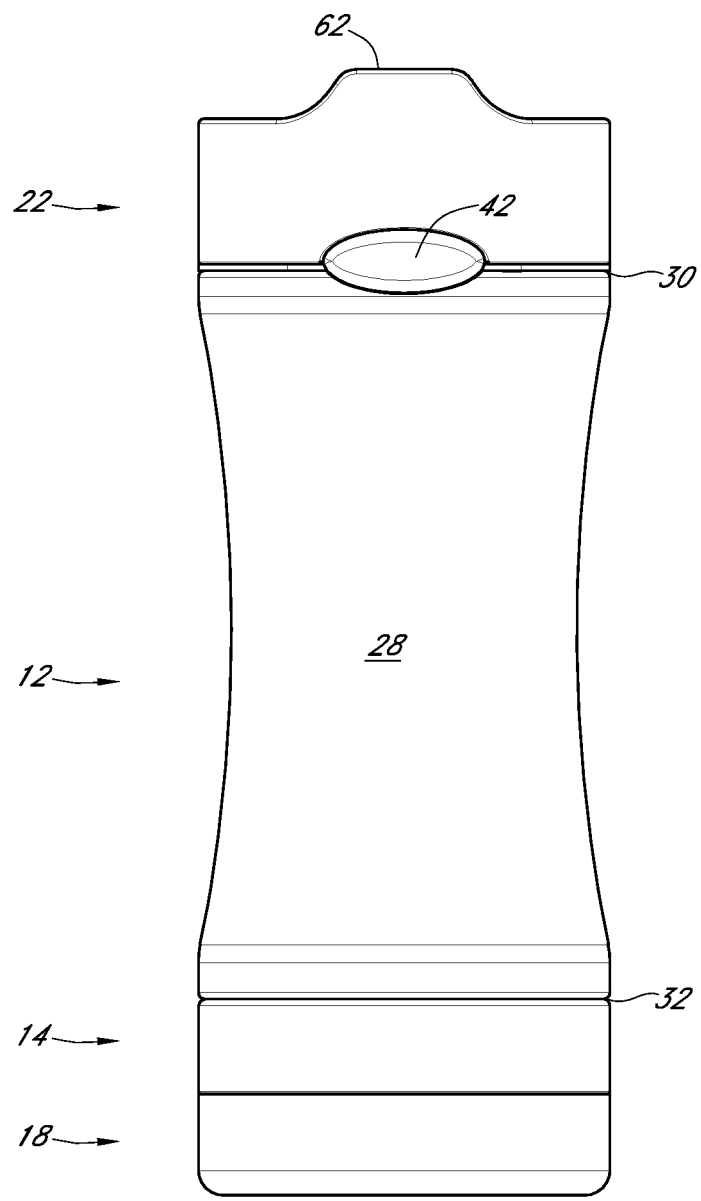
FIG. 4 is a front elevation view of a portable coffee brewing system.
Figure 5:
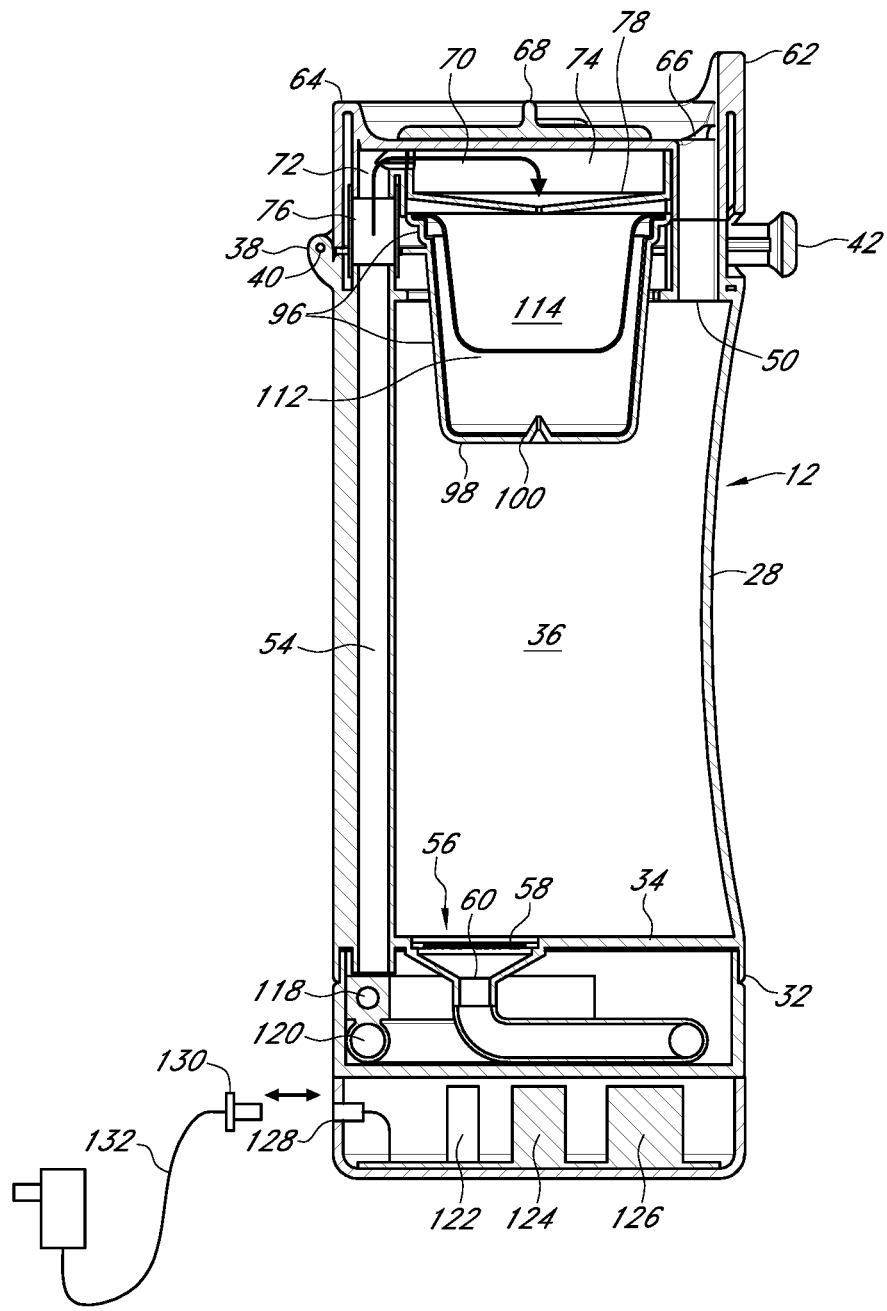
FIG. 5 is a side cut-away elevation view of a portable coffee brewing system.
Figure 6:
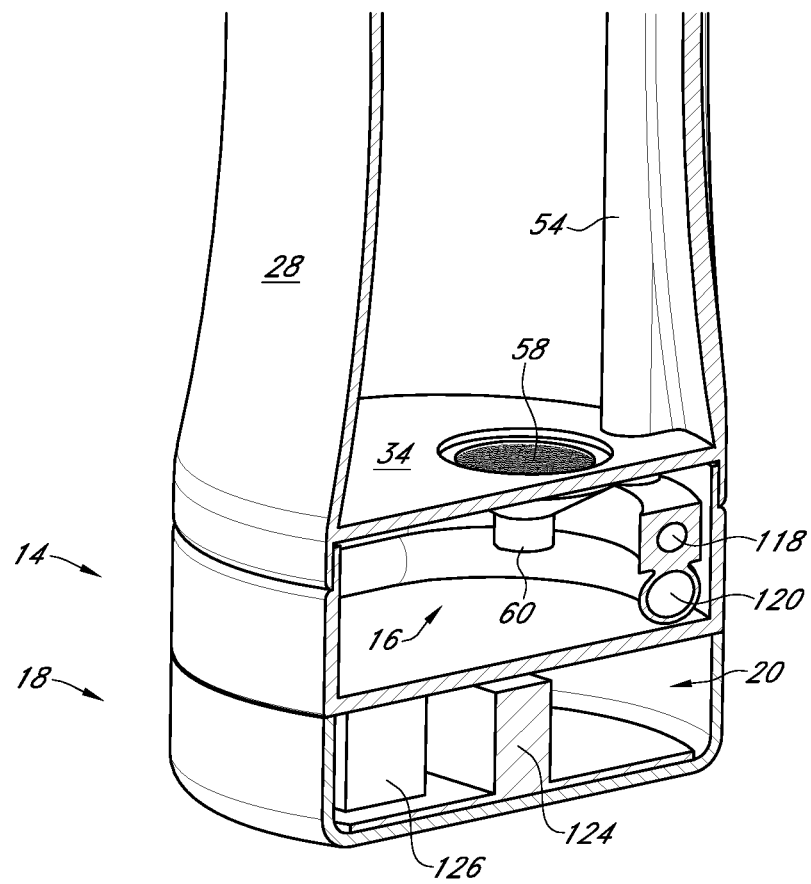
FIG. 6 is a side cut-away close-up perspective view of the bottom of a portable coffee brewing system.
Figure 7:
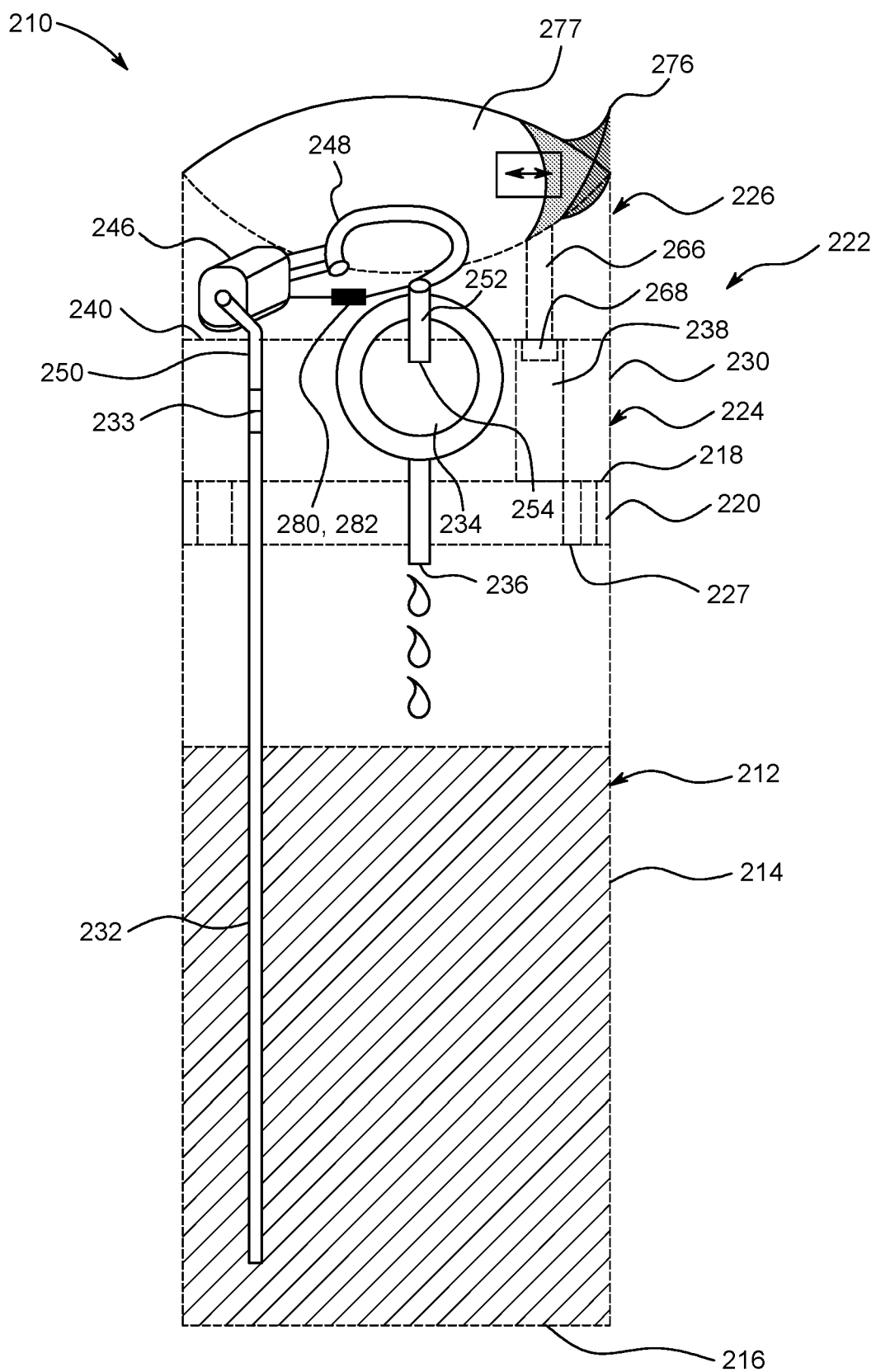
FIG. 7 is a side cut-away elevation view of a second embodiment of a portable coffee brewing system having a lid formed of a lower component and an upper component, a pump positioned within the lid and a coffee basin positioned within the lid.

While the term "basket" is used herein, this is term and the device it is used to describe is similar to the holder or insert 24 presented in FIGS. 3 and 5, as well as being similar in function to the lower component 224 of lid 22 presented in FIGS. 7-9 and the use of differing terminology should not distract from the similarities in function, purpose and design.

Display: In one arrangement, system 310 includes a display 398 which is electrically connected with microprocessor 352. Display 398 is formed of any suitable size, shape and design and is configured to display information related to the system 10. In one arrangement, display is positioned in the sidewall of electrical components housing 318, however it is hereby contemplated that display 398 may be positioned in any portion of the system 10.

In one arrangement, as is shown, display 398 is a digital display that is displays the status of the system, the temperature of the fluid within container 312, the amount of time the system 310 is set to brew for, the temperature the system 310 is set to brew at, the amount of brewing time left, the time, the time at which brewing will start, the amount of time that must pass before brewing will start, or any other information relevant to the system.

In one arrangement, microprocessor 352 and/or display 398 are electrically connected to an alarm 400. Alarm 400 is any device which indicates the state of system 310, such as when brewing is done, when a desired brewing temperature has been reached, when a desired drinking temperature has been reached, or any other information. Alarm 400 may be a speaker or other device that transmits a tone, noise or even spoken words, or a visual device such as a light or LED. In one arrangement, when alarm 400 is a color-changing LED alarm 400 is, for example, blue when in a powered ready state, red when brewing and green when ready.

In one arrangement, the display 398 is an interactive display that displays information about the system 310 as well as allows the user to set parameters such as:
The temperature at which brewing will start;
The amount of time that brewing will occur;
The time when brewing will occur;
Whether an alarm will issue when brewing is complete;
Whether an alarm will issue when the optimal consumption temperature is reached;
What the alarm settings are;
Any other setting.

Application: In one arrangement, system 310 is controllable through wireless control signals 402 sent and received between transceiver 354 through antenna 364 and application 404 running on a handheld device, such as a cell phone, tablet, laptop or other computing device 406.

Application 404 is any computer program designed to control system 310, display information related to system 310 and help the user enjoy use of system 310 through interaction with their cell phone or other computing device 406. In one arrangement, application 310 allows a user to wirelessly interact with their system 310 either directly, with wireless control signals 402 being exchanged directly between computing device 406 and transceiver 354/antenna 364, or through a wireless network, such as the internet. In doing so, the user may set the operating parameter of the system 310 such as:
The temperature at which brewing will start;
The amount of time that brewing will occur;

The time when brewing will occur;
Whether an alarm will issue when brewing is complete;
Whether an alarm will issue when the optimal consumption temperature is reached;
What the alarm settings are;
Whether music will play either through the computing device 406 or the alarm 400 when brewing is complete, and if so what music;
Whether music will play either through the computing device 406 or the alarm 400 when the optimal consumption temperature is reached, and if so what music;
Any other setting.

Application 404 allows the user to control brewing of their coffee in never before provided ways, such as by precise temperature setting, brew time setting and the like. In addition, application 404 allows the user to post to social media about their brewing experience. Application 404 also allows the user to order supplies, like replacement parts, more K-cups, coffee, or any other supply. Application 404 also allows for direct marketing to the user through application 404.

As computing device 406 is connected to the internet, any amount of information can be retrieved through the internet for use in the application. In addition, application 404 has access to the onboard memory of computing device 406. As such, application 404 can retrieve music to play through the computing device 406 and/or the audible alarm (speaker) 400 on the portable coffee brewing system 310 from the onboard memory of the computing device or from the internet.

Portable coffee brewing system 310 and application 404/computing device 406 communicate with one another using any form of a wireless communication protocol or language. Examples include the use of Bluetooth, Wi-Fi, Zigbee, Z-Wave or any other open source or proprietary language.

In Operation: A user using the system 310 opens the lid 322 which pivots upon hinge 334 thereby providing access to the basket 374. Next, the user removes the basket 743 and lower tube 386. Next the user fills the hollow interior 326 with the desired amount of water. The user then inserts the lower end of lower tube 386 into the output opening 348 in the bottom wall 342 of sleeve 314. Next, the user replaces the basket 374 in the upper end of the sleeve 314 and container 312. When inserting the basket 374 into container 312/sleeve 314, care is taken to ensure that the basket 374 is properly aligned with the upper end of lower tube 386 in alignment with and fluid communication with the lower end of upper tube 384. Once in the position, with the lip 380 of basket 374 in engagement with the lip 340 of sleeve 314/container 312 and upper tube 384 in alignment with and communication with lower tube 386, basket 374 is fully inserted within container 312.

Once basket 374 is inserted into container 312, coffee grounds holding device 378 (such as a K-Cup) is inserted within the opening 376 in basket 374. Next, the lid 322 is closed by pressing down on the forward end of the lid 322 thereby causing the lid 322 to rotate upon hinge 334 until the lower edge 408 of lid 322 seals with the upper edge of container 312/sleeve 314 and the latch 338 and catch 336 are in holding engagement with one another. Upon closing of lid 322, the lower punch 392 penetrates the bottom wall 410 of coffee grounds holding device 378 while the upper punch 388 penetrates the cover 372 of the coffee grounds holding device 378 thereby providing an entry point and exit point for water into and out of the coffee grounds holding device 378.

Now the system 310 is fully assembled and ready for transport and/or use. Once the user is ready to brew coffee, the user plugs the system 310 into a power source through plug 368 and then the user turns the brewing function on by use of switch 366. In doing so, unless modified by the user, as is further described herein, the system 310 will operate according to the factory settings.

That is, once activated, microprocessor 352 activates heating element 316. This cause energy to course through the filament embedded within the flexible silicone pad thereby heating the sleeve 314 and the water within sleeve 314. As this is occurring the sensor 360 senses the water temperature and transmits this information to microprocessor 352. Once microprocessor 352 detects that the pre-set brewing temperature has been reached (such as for example between 198° F. and 200° F.) microprocessor 352 activates pump 346.

When pump 346 is activated, pump 346 sucks water out of the hollow interior 326 of through drain 344 and then pumps the water out output opening 348, up lower tube 386, up upper tube 384, through upper punch 388, or alternatively through other piping within lid 322, through the coffee grounds held within coffee grounds holding device 378, and out the opening in the bottom of coffee grounds holding device 378 which is formed by lower punch 392 and out drain 394. This liquid then drains back into the hollow interior 326 and the process is repeated until pump 346 is deactivated. The flow of liquid/coffee follows Arrow A shown in FIG. 22.

In one arrangement, that includes an alarm 400 that is a light or LED, during the brewing process, the alarm 400 indicates that brewing is in-process, such as illuminating a first color such as red, yellow, or blue, and when the brewing process is complete the alarm 400 illuminates a second color, such as green or purple. In the arrangement wherein a consumption temperature is also set, the alarm 400 indicates that the preferred consumption temperature has been reach by illuminating a third color, such as white, when the temperature of the liquid drops below a predetermined consumption temperature informing the user that the coffee is ready to drink. In this way, the user is visually made aware of the status of the system 10.

Similarly, In one arrangement, that includes an alarm 400 that is a speaker, when the brewing process begins an alarm 400 is issued that indicates that brewing started, such as a first tone or noise, and when the brewing process is complete the alarm 400 issues a second tone or noise. In the arrangement wherein a consumption temperature is also set, the alarm 400 indicates that the preferred consumption temperature has been reach by issuing a third tone or noise when the temperature of the liquid drops below a predetermined consumption temperature informing the user that the coffee is ready to drink. In this way, the user is audibly made aware of the status of the system 10.

Similarly, the information about the system 310 is displayed on display 398, such as the current status of the system 310, such as brewing, waiting, ready, etc. In addition, other information is also visible on display 398, such as current liquid temperature, time, time until brewing begins, time until brewing completes, etc.

After the coffee is brewed, the user slides the cover 372 rearward thereby exposing the pour spout 370 and the user drinks the coffee from hollow interior 326.

Once empty, the user cleans the system by opening lid 322 by pivoting it on hinge 334 thereby exposing the basket 374 and coffee grounds holding device 378 which are both removed. In addition, the lower tube 386 is also removed, and in the arrangement with a removable sleeve 314, the sleeve 314 is removed as well. The coffee grounds holding device 378 is discarded. The lower tube 386 and sleeve 314 and the basket 374 can be washed, such as by placing them in a dishwasher. Once clean, the sleeve 314, lower tube 386, and basket 374 are reinserted into the container 312 and the system 310 is ready to be used again.

When an interactive display 398 is present, the user may modify any setting using the display 398, such as the brewing temperature, the preferred consumption temperature, when the brewing is to begin (such as at a certain time), how long brewing should last, among any other setting.

Similarly, when using application 404, the user may modify any setting using the application 404, such as the brewing temperature, the preferred consumption temperature, when the brewing is to begin (such as at a certain time), how long brewing should last, among any other setting. In addition, the user may post information to social media regarding their brewing experience through application 404, in addition they may order replacement parts or supplies, such as additional coffee or replacement coffee ground holding devices 378 (such as K-cups). When the user modifies a setting using application 404, a wireless control signal 402 is transmitted either over the air and directly to antenna 364, or through electronic network, such as the internet or a local network. Control signal 402 is received by antenna 364 which transmits the control single 402 to transceiver 354. Transceiver 354 receives the control signal 402, interprets it, and transmits it to microprocessor 352. Microprocessor 352 acts on the instructions received through control signal 402 to modify its operation accordingly.

Note: The use of the term K-Cup is only by way of example, and any form of a coffee grounds holding device manufactured by any maker is hereby contemplated for use with the system 310 and can be used by modifying the shape of basket 374 accordingly.

Batteries: While it is described herein to attach system 310 to an external battery source such as line power through a USB plug or conventional wall outlet, it is hereby contemplated to include an on-board power source, such as a battery or plurality of batteries, or battery pack within container 312 and/or electrical components housing 318. This battery or batteries provide the power for operation of the system as is described herein. This battery or batteries are charged by plugging into an external power source through plug 368.

Separator: In one arrangement, system 10 includes a separator 420. Separator 420 is formed of any suitable size, shape and design and is configured to separate the brewed coffee from the un-brewed water. In one arrangement, separator 420 is formed of a rigid or flexible membrane that is inserted within the hollow interior 36 of container 12 after the hollow interior 36 is filled with water. In this way, separator 420 floats on top of the water. When the system 10 is activated, and brewing is initiated, water is sucked out of the hollow interior 36 below the separator 420 and brewed coffee is injected or poured back into the hollow interior 36 on top of separator 420. In doing so, the separator 420 moves vertically within the hollow interior 36 of container 12 and floats on the diminishing level of un-brewed water below the separator 420 as brewed coffee is poured on top of the separator 420.

The brewing process is complete when the separator 420 reaches or engages the bottom wall 34 of hollow interior 36. In this position, all of the un-brewed water has been sucked out of the hollow interior 36 of the container 12 below separator 420 and has been replaced as coffee on top of the separator 420.

To ensure a proper seal between sidewall 28 of container 12 and the separator 420, and to ensure the water and brewed coffee are sufficiently separated, separator 420 has approximately the same size and shape as the hollow interior 36 and fits within hollow interior 36 with close and tight tolerances thereby separating the coffee and water while still allowing for vertical movement of separator 420 within hollow interior 36. Care is taken to ensure the dimensions and configuration properly separates the water from the coffee while allowing for proper and free vertical movement of separator 420—although some leakage is inevitable. In the arrangement shown, as one example, separator 420 includes a bottom wall 422 that extends across the hollow interior 36 and connects to a sidewall 424 that engages and seals with sidewall 28 of container 12. In one arrangement, sidewall 424 of separator 420 includes one or more seals, such as rubber gaskets, O-rings or the like, that engage sidewall 28 and improve sealing.

Separator 420 is easily removed from hollow interior 36 for cleaning purposes. The use of separator 420 helps to keep the internal components of system 10 clean by only running clean water through these components of the system 10.

Alternative Arrangement: In an alternative arrangement, with reference to FIGS. 24-40 a portable coffee brewing system 510 is presented. This portable coffee brewing system 510 is similar to the other embodiments presented herein and therefore the teaching presented herein with reference to other embodiments applies to the embodiment of FIGS. 24-40 unless specifically specified otherwise (including the teaching related to all of the electrical components and functionality described herein, including microprocessor 352, transceiver 354, sensor 360, circuit board 362, antenna 364, switch 366, plug 368, display 398, alarm 400, wireless control 402, application 404, computing device 406, and the like components and functionality). In the arrangement shown, as one example, portable coffee brewing system 510 includes the components or features of: a container 512 having an upper end 514, a lower end 516 and a bottom wall 518, a first chamber 520, a second chamber 522, a hot water tube assembly 524 having a lower section 526, an upper section 528 and a pivot section 530, a first nipple 532, a second nipple 534, a lid 536 having main body 538, a lip 540, a collar 542, a first cover 544 connected by a first hinge 546 and a second cover 548 connected by a second hinge 550, a pour spout 552, and a basket 554, a heating element 556, a pump 558, an electrical socket 560, a vent 562 and a button 564, a coffee grounds holding device 26 having a sidewall 28 and a covering 110 that holds an amount of coffee grounds 114, among other components and features as is described herein.

Container: Portable coffee brewing system 510 includes a container 512. Container 512 is formed of any suitable size, shape and design and is configured to house and hold the other components of the system 510. In the arrangement shown, as one example, container 512 has an exterior surface that forms a generally cylindrical sidewall that extends from an upper end 514 to a lower end 516. Lower end 516 connects to a bottom wall 518 that encloses the lower end 516 of container 512. In this way, container 512 forms a hollow interior with an open upper end 514 that is configured to receive and hold the components of the system 510. In the arrangement shown, as one example, container 512 is formed of two parts that connect together along a seam in a clamshell-type arrangement. However, it is hereby contemplated that container 512 may be formed of any number of parts such as a single unitary part, two, three, four or more.

First Chamber: Portable coffee brewing system 510 includes a first chamber 520. First chamber 520 is formed of any suitable size, shape and design and is configured to receive and hold water to be used in the brewing process. In the arrangement shown, as one example, first chamber 520 has a generally cylindrical sidewall 566 that connects to a bottom wall 568 positioned at its lower end and is enclosed by an upper wall 570 at its upper end. In this way, first chamber 520 forms a hollow, enclosed, interior that holds water prior to brewing. First chamber 520 is positioned at or near the lower end of container 512 just above bottom wall 518.

Second Chamber: Portable coffee brewing system 510 includes a second chamber 522. Second chamber 522 is formed of any suitable size, shape and design and is configured to receive and hold water, or more specifically brewed coffee, tea or other beverage, after the brewing process. In the arrangement shown, as one example, second chamber 522 has a generally cylindrical sidewall 572 that connects to a bottom wall 574 positioned at its lower end. In the arrangement shown, as one example, the upper end of second chamber 522 is open and uncovered, however in other arrangements second chamber 522 may include a cover. Second chamber 522 is positioned above first chamber 520 and below lid 536.

In the arrangement shown, as one example, heating element 556 is operably connected to first chamber 520. Heating element 556 is formed of any electrically powered element that is capable of heating water for the brewing process, as is described herein. In the arrangement shown, as one example, heating element 556 is positioned below the bottom wall 568 of first chamber 520 and includes a coil member that extends upward and into the hollow interior of first chamber 520, however any other arrangement is hereby contemplated for use.

Also, in the arrangement shown, as one example, pump 558 is operably connected to first chamber 520 and is configured to facilitate movement of water from first chamber 520 into second chamber 522 during a brewing process. In one arrangement, pump 558 is an air pump that is configured to pressurize first chamber 520 so as to facilitate movement of water from first chamber 520 to second chamber 522. However, any other form of a pump is hereby contemplated for use, such as a water pump or the like.

In the arrangement wherein pump 558 is an air pump, pump 558 is connected to vent 562 so as to facilitate inflow of air into pump 558 so as to pressurize first chamber 520. In the arrangement shown, as one example, vent 562 is an opening in the sidewall of container 512. In alternative arrangements, pump 558 is vented in any other manner so as to provide airflow into pump 558. In the arrangement shown, as one example, pump 558 is positioned above first chamber 520, above upper wall 570, and facilitates airflow into first chamber 520 through an opening connected to the output of pump 558. Care is taken to facilitate pressurization and proper flow of water into and out of first chamber 520 by properly sealing first chamber 520 as well as using proper ventilation as well as directional valves, as is further described herein so as to facilitate the filling of first chamber 520 as well as the transfer of water from first chamber 520 to second chamber 522 through hot water tube assembly 524.

Hot Water Tube Assembly: Portable coffee brewing system 510 includes a hot water tube assembly 524. Hot water tube assembly 524 is formed of any suitable size, shape and design and is configured to facilitate the transfer of water from the first chamber 520 to the second chamber 522 during the brewing process. In the arrangement shown, as one example, hot water tube assembly 524 is formed of a hollow tube that is formed of a plurality of parts, including a lower section 526, an upper section 528 and a pivot section 520.

In the arrangement shown, as one example, lower section 526 extends into first chamber 520 and extends from a lower end, which is positioned just above the upper interior surface of bottom wall 568 of first chamber 520, upward through upper wall 570, past pump 558 and connects at its upper end to the lower end of upper section 528. Upper section 528 connects at its lower end to the upper end of lower section 526 and connects at its upper end to pivot section 530. The connection of upper section 528 to pivot section 530 includes a hinge that facilitates hinged movement of pivot section 530 as the first cover 544 is opened and closed, as is described herein. The end of pivot section 530, opposite upper section 528, is fluidly connected to first nipple 532. In this arrangement, when coffee grounds holding device 26 is in place within basket 554 of lid 536 and the first cover 544 is closed, first nipple 532 penetrates the covering 110 of coffee grounds holding device 26 thereby forming a fluid passageway into coffee grounds holding device 26. Similarly, when coffee grounds holding device 26 is in place within basket 554 of lid 536 and the first cover 544 is closed, second nipple 534 penetrates the bottom wall of coffee grounds holding device 26 thereby forming a fluid passageway out of coffee grounds holding device 26.

That is, during use, when first chamber 520 is filled with water and the brewing process is initiated, heating element 556 is powered thereby heating the water held within first chamber 520 to a desired temperature. Once the desired temperature is achieved, as is sensed by a sensor, as is described herein, pump 558 is activated. Once activated, pump 558 pulls air through vent 562 and pushes the air into first chamber 520. As first chamber 520 is sealed, air inflow into first chamber 520 pressurizes the first chamber 520. This pressurization causes water held within the first chamber 520 up the lower section 526 of hot water tube assembly 524, through the upper section 528 of hot water tube assembly 524, through the joint connecting upper section 528 and pivot section 530, through the pivot section 530, through first nipple and into the coffee grounds holding device 26. This heated water passes through the coffee grounds holding device 26 and drains through the second nipple 534 and drains into the second chamber 522 where it is held for drinking.

The formation of hot water tube assembly 524 out of a number of parts, which in the example shown, is formed of three components, lower section 526, upper section 528 and pivot section 530, allows for portions of the hot water tube assembly 524 to be non-removable in nature, or permanently affixed, whereas other portions are removable in nature, such as for cleaning and replacement purposes. In one arrangement, lower section 526 is non-removable or permanently affixed so as to facilitate proper sealing of first chamber whereas upper section 528 and pivot section 530 are removable for cleaning and replacement purposes. However any number of parts is hereby contemplated for use such as one, two, three, four or more parts.

Similarly in one arrangement, as is shown, first chamber 520 is non-removable in nature, whereas second chamber 522 is removable in nature so as to facilitate cleaning and replacement of the second chamber 522. In one arrangement, as is shown, container 512 includes a divider 576.

Divider 576 is formed of any suitable size, shape and design and is configured to separate container 512 into an upper portion and a lower portion. In the arrangement shown, as one example, divider 576 is a flat and generally horizontally extending wall of the clamshell sections of container 512 such that when the two sections of container 512 are joined a sealed compartment is positioned below divider 576 whereas an compartment that is open to the open upper end 514 of container 512 is positioned above divider 576. In this arrangement, some, most or all of the electrical components are held within the sealed section of container 512 below divider 576, including heating element 556, pump 558 and the other electrical components of system 510. Also held within this sealed lower portion of container 512 is first chamber 520, which itself is sealed. Having the lower portion of container 512 being sealed provides protection to the electrical components and other components held within this section of the container 512.

Lid: Portable coffee brewing system 510 includes a lid 536. Lid 536 is formed of any suitable size, shape and design and is configured to close the upper end 514 of container 512 as well as to facilitate drinking out of the portable coffee brewing system 510 as well as facilitate the insertion and removal of a coffee grounds holding device 26. In the arrangement shown, as one example, lid 536 includes a main body 538. Main body 538 has an exterior sidewall that is similarly sized and shaped to the exterior sidewall of container 512 and includes a lip 540 positioned at its lower end. Lip 540 positioned at the lower end of main body 538 of lid 536 is configured to connect to and engage the upper end 514 of container 512, as well as connect to and engage an upper edge 578 of second chamber 522. In one arrangement a sealing member, such as an O-ring, a gasket, a seal or like sealing component, is positioned between the lower edge of lip 540 and the upper edge of 578 of second chamber 522 and or the upper end 514 of container 512 thereby sealing this connection.

In the arrangement shown, lip 540 extends outward a distance from the downwardly extending sidewall of the main body 538 of lid 536 thereby forming a shoulder having a larger diameter than the diameter of the exterior sidewall of lid 536. This outward extension serves as a stop surface that is configured to receive and engage a portion of collar 542. Collar 542 is formed of any suitable size, shape and design and is configured to engage and couple the lower edge of lid 536 to the upper end 514 of container 512. In the arrangement shown, collar 542 is a cylindrical member that fits around the lower end of lid 536 and stops by engagement of lip 540 while having a portion of collar 542 extend past and downward from lip 540. The interior surface of collar 542 that extends below lip 540 of lid 536 includes threads that engages threads in the exterior surface of the upper end 514 of container 512. In this way, collar 542 selectively connects lid 536 to container 512 by rotating collar 542 in a first direction, and collar 542 selectively disconnects lid 536 from container 512 by rotating collar 542 in a second direction opposite the first direction. In the arrangement shown, as one example, collar 542 is formed of an upper section 580, that engages and remains stationary with lid 536 and lip 540 and a lower section 582 includes threads on its interior surface that engages the upper end 514 of container 512 and rotates with respect to lid 536 and lip 540.

In the arrangement shown, as one example, lid 536 includes a first cover 544 connected to lid 536 by first hinge 546. First cover 544 is formed of any suitable size, shape and design and is configured to move between an open position and a closed position. In an open position, first cover 544 allows insertion and removal of coffee grounds holding device 26 into container 512 and./or lid 536. In the arrangement shown, as one example, first cover 544 covers basket 554 which is sized and shaped to receive and hold coffee grounds holding device 26 therein. Also, in the arrangement shown, as one example, pivot section 530 of hot water tube assembly 524 is connected to the lower surface of first cover 544 and moves with first cover 544 such that when first cover 544 is closed, first nipple 532, which is connected to the end of pivot section 530, penetrates the covering 110 of coffee grounds holding device 26 thereby forming an entry point into the coffee grounds holding device 26. Similarly as the first cover 544 is closed, the downward force applied to coffee grounds holding device 26 positioned below first cover 544 causes downward pressure onto coffee grounds holding device 26 thereby causing second nipple 534 to penetrate the lower wall of coffee grounds holding device 26 thereby forming an exit point out of coffee grounds holding device 26.

Basket 554 is formed of any suitable size, shape and design and is configured to receive and hold coffee grounds holding device 26. In the arrangement shown, as one example, basket 554 is formed within lid 536 and under first cover 544. However, in other arrangements, basket 554 is a removable member and/or a separate component that is held within lid 536 and/or within container 512. In the arrangement shown, basket 554 includes a generally cylindrical depression that is sized and shaped to receive coffee grounds holding device 26 therein with close and tight tolerances and includes a second nipple 534 positioned at its lower end that is configured to penetrate coffee grounds holding device 26 when first cover 544 is closed thereby providing a fluid passageway out of coffee grounds holding device 26 and into second chamber 522.

In the arrangement shown, as one example, lid 536 also includes a fill opening 584. Fill opening 584 is formed of any suitable size, shape and design and is configured to facilitate filling portable coffee brewing system 510 with fresh water before brewing. In the arrangement shown, fill opening 584 is positioned between basket 554 and first hinge 546 and connects to funnel 586. Funnel 586 includes a fill tube 588 that facilitates transfer water from funnel 586 and into first chamber 520. In one arrangement, fill tube 588 includes a valve 590 that facilitates flow of water into first chamber 520 but prevents the flow of water or air out of first chamber 520 so as to facilitate pressurization of first chamber 520 by pump 558. In one arrangement, first chamber 520 includes a vent that facilitates the passage of air out of first chamber 520 during a filling process. In the arrangement shown, fill tube 588 and funnel 586 fit within a recess 592 in the sidewall 572 of second chamber 522 which provides egress for these components. In one arrangement, when first cover 544 is closed, first cover 544 seals the upper end of basket 554 and/or fill opening 584, so as to prevent leaking.

In the arrangement shown, as one example, lid 536 also includes a pour spout 552. Pour spout 552 is formed of any suitable size, shape and design and is configured to facilitate pouring and/or drinking of coffee from the portable coffee brewing system 510. More specifically, pour spout 552 provides a pathway for brewed coffee held within the second chamber 522 to pass out of container 512. In the arrangement shown, as one example, pour spout 552 is positioned on the front side of lid 536, opposite first hinge 546. Also, in the arrangement shown, the upper end of pour spout 552 is covered by second cover 548 which is connected to lid 536 by second hinge 550. In an open position, second cover 548 provides access to pour spout 552 whereas in a closed position second cover 548 seals the upper end of pour spout 552 to prevent leaking.

Portable coffee brewing system 10 also includes button 564 that is used to control operation of the system 10. Portable coffee brewing system 10 also includes an electrical socket 560 that is used to electrically connect portable coffee brewing system 10 to an external power source. Alternatively, and/or in addition, portable coffee brewing system 10 may include an on-board power source, such as one or more batteries.

In Operation: When using portable coffee brewing system 510, the user opens first cover 544 thereby exposing basket 554 as well fill opening 584. The user fills the portable coffee brewing system 510 by pouring water into fill opening 584. This water is funneled by gravity through funnel 586 and down fill tube 588 and into first chamber 520. As water fills first chamber 520, air is vented out of first chamber 520. With first cover 544 open, a coffee grounds holding device 26 is inserted within basket 554. Once coffee grounds holding device 26 is inserted within basket 554 and the first chamber 520 filled to the desired level, the first cover 544 is closed. As first cover 544 is closed, first cover 544 rotates upon first hinge 546 until first cover 544 fully closes, and latches or snaps closed. In a fully closed position, first cover 544 seals fill opening 584 and/or basket 554. Also, as first cover 544 is closed, first cover 544 forces first nipple 532 to penetrate covering 110 of coffee grounds holding device 26 while second nipple 534 penetrates the bottom of coffee grounds holding device 26.

In this closed position, portable coffee brewing system 510 may be transported in a pre-brewed state. Water held within the first chamber 520 is held in place and does not leak as first chamber 520 is sealed. In addition, first cover 544 seals the upper end of basket 554 and/or fill opening 584, and second cover 548 seals pour spout 552. As such, portable coffee brewing system 510 maybe transported in a pre-brewed state without fear of leaking.

Once the user gets to their desired location, and/or the time is right, the user plugs in the portable coffee brewing system 510, or in a system 510 that is battery powered no plugging in is required. Next, the user activates the system 510 by pressing button 564. Upon activation, heating element 556 heats water held within first chamber 520. Once water within first chamber 520 heats to the desired temperature, pump 558 is activated. When pump 558 is activated, pump 558 sucks air through vent 562, or through another vent or opening and pushes this air into first chamber 520. As first chamber 520 is sealed, as pump 558 pushes air into first chamber 520, first chamber 520 pressurizes. As first chamber 520 pressurizes, heated water is forced up the hot water tube assembly 524. More specifically, hot water enters the open lower end of lower section 526 of hot water tube assembly 524 which is positioned just above the bottom wall 568 of first chamber 520. This water then passes up through the lower section 526 and out of first chamber 520, through the intersection joining the lower section 526 to the upper section 528. Next the water passes through the joint joining the upper section 528 to the pivot section 530. Next the water passes through the pivot section 530, through first nipple 532 which penetrates covering 110 and into the hollow interior of coffee grounds holding device 26. This water percolates through the coffee grounds held within the coffee grounds holding device 26 and out the second nipple 534. As the water, which is now coffee, drains out of the coffee grounds holding device 26 through second nipple 534 it moves by the force of gravity and is captured by the open hollow interior of second chamber 522. This process continues until all water in first chamber 520 transitions through the coffee grounds holding device 26 and into second chamber 522. One benefit of this system 510 and the use of air to pressurize first chamber 520 is that once all of the water passes through first chamber 520 the pressurized air has a tendency to force the water through the coffee grounds holding device 26 thereby preventing the last bit of water from lingering in the coffee grounds holding device 26 and hot water tube assembly 524, which can occur if a water pump is used instead of an air pump. That is, the use of pressurized air helps to complete the brewing process in a more efficient and thorough and cleaner manner that purges the remaining water from the system 510.

After brewing has completed, when the user is ready to drink coffee, tea, or whatever else was brewed, the user simply opens second cover 548, which pivots on second hinge 550, thereby exposing pour spout 552. Next, the user tips back the portable coffee brewing system 510 and drinks from the pour spout 552.

The user may remove and replace the coffee grounds holding device 26 by simply opening the first cover 554 and refill the first chamber 520 by pouring water into the fill opening 584. The user may also clean the portable coffee brewing system 510 by rotating the lower section 582 of collar 542 thereby releasing the lid 536 from the upper end 514 of container 512. In one arrangement, when lid 536 is removed, this removes the upper section 528 and/or the pivot section 530 of hot water tube assembly 524, which separate at the intersection between the lower section 526 and the upper section 528, thereby allowing these components to be cleaned and/or replaced. Once lid 536 is removed, this exposes second chamber 522 which can be removed, cleaned and replaced.

In the arrangement shown, as one example, even when lid 536 is removed and second chamber 522 is removed, the divider 576 of container 512 maintains in place and keeps the electronic components (such as heating element 556 and pump 558 as well as all the other electronic components) as well as first chamber 520 sealed and protected and in place within the lower portion of container 512. In an alternative arrangement, a first chamber 520 is also removable so as to facilitate cleaning and replacement.

The portable coffee brewing system 510 may be assembled in the opposite manner. That is, the second chamber 522 is dropped into the upper open end of container 512. Next, with the second chamber 522 in place and resting upon the upper surface of divider 576, lid 536 is installed by aligning the lower end of lid 536 with the upper end 514 of container 512 and tightening collar 542 in place. In this way, a new, useful, a non-obvious portable coffee brewing system 510 is presented.

Alternative Arrangement:

System:

In an alternative arrangement, with reference to FIGS. 41-51, a portable coffee brewing system (system 610) is presented that is configured to be used for cold brewing by recirculating fluid through coffee grounds over an extended period of time. This arrangement is similar to that previously presented and therefore this arrangement incorporates all of the teaching presented herein in prior embodiments unless specifically stated otherwise. In the arrangement shown, as one example, cold brewing does not require a heating element, which simplifies the design of the system 610 in some ways, while cold brewing complicates the design in other ways. In the arrangement shown, as one example, system 610 includes, among other components, a top housing 612, a pump 636, a tube 638, a basket housing 650, a punch 666, a container 680, a basket 694, a coffee grounds holding device 710, and a bottom housing 724.

Top Housing/Housing:

In the arrangement shown, as one example, portable coffee brewing system, system 610, is used in association with a top housing 612. Top housing 612 may be formed of any suitable size, shape and design and is configured to form the upper portion of system 610. In other words, top housing 612 is configured to hold various components of system 610 within the confines a housing.

Top housing 612 also includes an exterior wall 618 which forms a hollow interior 620 of the top housing 612. In the arrangement shown, as one example, exterior wall 618 extends in a generally circular manner from the top side 614 to a bottom side 616.

In the arrangement shown, as one example, the hollow interior 620 of top housing 612, is configured to house various components of system 610. In this arrangement, shown as one example, top housing 612 connects, houses and/or holds a microprocessor 626, a pump 636, a tube 638, a socket 644, and a basket housing 650, among other components, as are further described herein. Additionally, on the exterior wall of top housing 612, an On/Off button 624 and an indicator 632 feature can be found. These features are further described herein.

In the arrangement shown, as one example, top housing 612 includes a top side 614 and a bottom side 616 which extend in approximate parallel spaced relation to one another. Top side 614 is a generally flat surface. In the arrangement shown, as one example, top side 614 forms the enclosure surface of the upper side of top housing 612. In the arrangement shown, as one example, bottom side 616 forms the enclosure surface of the lower side of top housing 612. Bottom side 616 defines the bottom of the hollow interior 620 formed by the exterior wall 618 of top housing 612. In the arrangement shown, as one example, bottom side 616 is formed of a generally flat surface with an opening therein. In the arrangement shown, as one example, bottom side 616 includes a large circular opening formed to receive basket housing 650; basket housing 650 is further described herein.

In the arrangement shown, as one example, top housing 612 also includes a lip 622. Lip 622 is formed of any suitable size, shape and design and is configured to attach lower portion of system 610 to a container 680. In the arrangement shown, as one example, lip 622 extends outward, and in perpendicular relation, from the exterior wall 618. In the arrangement shown, as one example, lip 622 is a generally circular extension that extends outward in parallel relation to bottom side 616.

Lip 622 is configured to provide a surface to support top housing 612 and other components while resting on the rim of a container 680. Additionally, lip provides connecting features which allow the top housing to be connected to the bottom housing 724. In the arrangement shown, as one example, lip 622 of top housing 612 is configured to receive lip 734 of bottom housing 724 in close and tight tolerances. The lip 622 of top housing 612 and the lip 734 of bottom housing 724 fit together in such close and tight tolerances, or by other connecting methods or means, so as to prevent leakage, spillage, or debris from escaping or entering the hollow interior of the portable coffee brewing system (system 610).

Bottom Housing:

In the arrangement shown, system 610 is used in association with a bottom housing 724. Bottom housing 724 may be formed of any suitable size, shape and design and is configured to enclose the lower end of system 610 and connecting and/or interlocking in close and tight tolerances with top housing 612. In other words, bottom housing 724 is configured to cap those components which extend downward from the bottom of top housing 612. Said yet another way, bottom housing 724 is configured to form an enclosure for the lower portion of system 610. In the arrangement shown, as one example, bottom housing 724 forms a complete and sealed enclosure whenever the system 610 is not in use, being transported, stored, or the like. In the arrangement shown, as one example, bottom housing 724 is configured to be detached and reattached to top housing 612 as desired.

In an alternative embodiment, bottom housing 724 can also be a container 680. In this arrangement, the system may or may not be sealed. A container 680 may take many forms, including a simple coffee cup, a Ball Jar, a travel mug, or any other form of a container which the top housing 612 could rest upon. Container 680 is further described herein.

In the arrangement shown, as one example, bottom housing 724 is formed of a top side 726 and a bottom side 728 which extend in approximate parallel space relation to one another. Bottom side 728 is formed of a generally flat surface which enables system 610 to be placed on a flat surface such as a desk, countertop or table.

In the arrangement shown, as one example, bottom housing 724 also includes an exterior wall 730 which forms the hollow interior 732 of the bottom housing 724. In the arrangement shown, as one example, exterior wall 730 extends in a generally circular manner from the bottom side 728 to the top side 726, adjacent a lip 734.

In this arrangement, as is shown, the top side 726 of the bottom housing 724 is a generally flat surface with an opening therein that is capable of receiving components or parts of components from the top housing 612. Lip 734 of the bottom housing 724 is configured to mirror the lip 622 of the top housing 612 so the lip 734 can matingly pair with top housing 612. In an alternative, the lip 734 may be formed to aid in consumption of any fluid 690 within bottom housing 724, in the event the bottom housing 724 is used as a drinking container.

Bottom housing 724 may connect to top housing 612 by any manner, method or means. That is, bottom housing 724 may connect to top housing 612 by friction fit, wherein the upper end of bottom housing 724 overlaps and frictionally engages a portion of top housing 612, such as the exterior wall 658 of basket housing 650, or by any other portions of the bottom housing 724 and top housing 612 frictionally engaging one another. Bottom housing 724 may connect to top housing 612 by features such as detents, snap features, hooks, loops, elastic members, or by any other feature. Bottom housing 724 may connect to top housing 612 by magnetic engagement by one or both of the components having a magnet that engages a magnet or magnetic material of the other component. Bottom housing 724 may connect to top housing 612 by a threaded engagement. Any other manner, method or means of connecting the two components is hereby contemplated for use.

Container:

Portable coffee brewing system 610 is used in association with a container 680. Container 680 is formed of any suitable size, shape and design and is configured to house and hold the fluid 690 before, during and after brewing as well as support top housing 612 during brewing. Additionally, container 680 is configured to operably connect to the top housing 612. In the arrangement shown, as one example, container 680 has an exterior surface 682 that forms a generally cylindrical sidewall that extends from an open upper end 688 to a bottom end 686. Bottom end 686 and exterior surface 682 form a hollow interior 684. In this way, container 680 is configured to receive and hold the fluid 690.

In the arrangement shown, as one example, container 680 holds the fluid 690 that has not been altered by the system 610. Alternatively, container 680 may hold fluid 690 which has been altered by the system 610. In the arrangement shown, as one example, the fluid 690 of the system 610 is recirculated through the system 610 continuously so that no additional containers are needed. In the arrangement shown, as one example, container 680 is formed of a single piece. However, it is hereby contemplated that multiple containers 680 may be used or may be formed by any other number of parts such as a single unitary part, two, three, four, or more parts.

Figure 44:
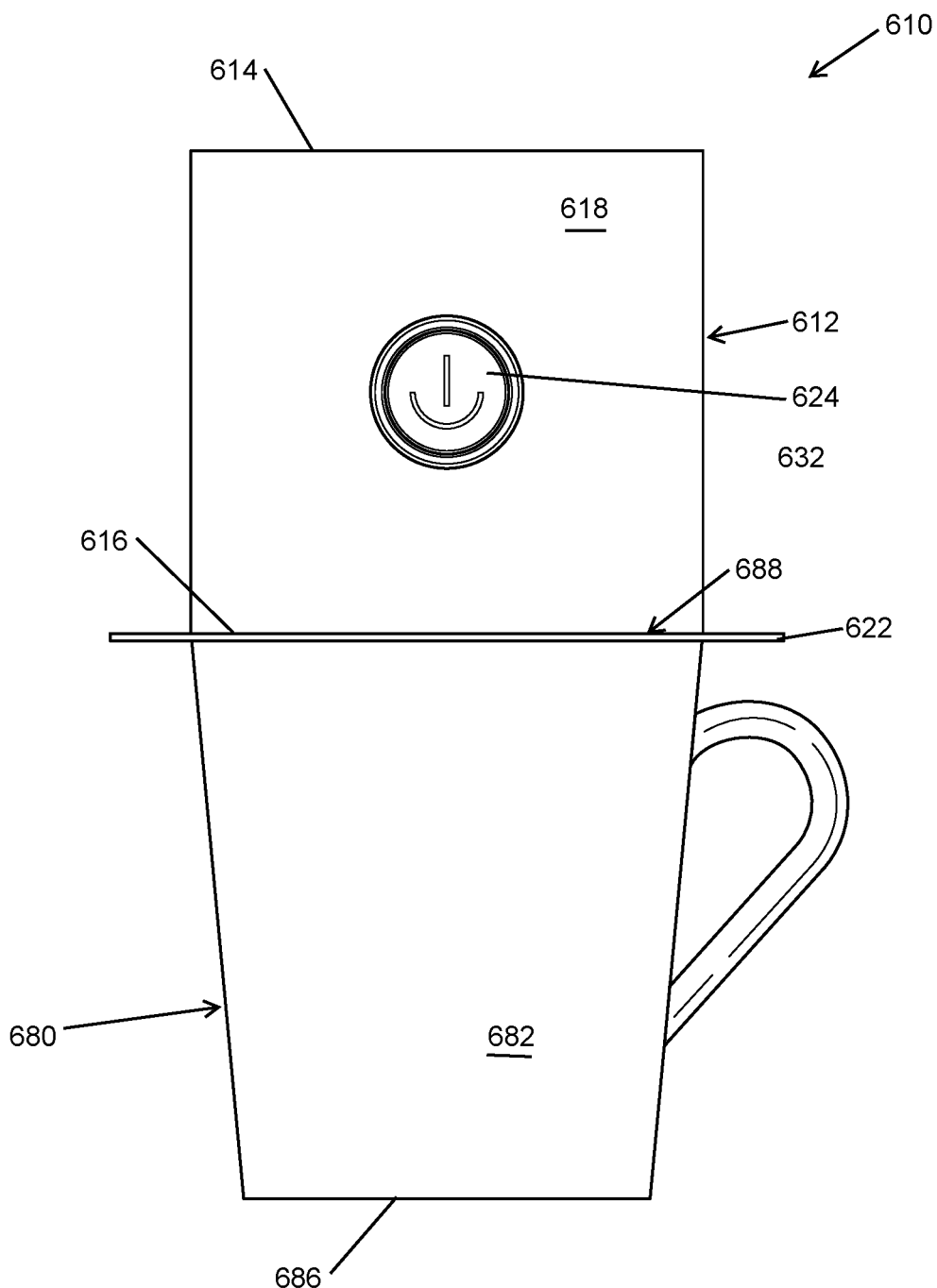
FIG. 44 is an elevation view, the view showing a top housing engaged with a container.

In the arrangement shown, as one example, in FIG. 44, top housing 612 is simply placed on top of the upper end of container 680 such that the top housing 612 rests upon and is supported by container 680 during brewing. This arrangement is effective and simple and works efficiently. This arrangement, however, is susceptible to being tipped over.

Because the arrangement is susceptible to being tipped over, a tilt sensor 912 may also be included. Tilt sensor 912 may be configured to detect when the system is not upright and, upon detection, immediately stop the brewing process.

Figure 45:
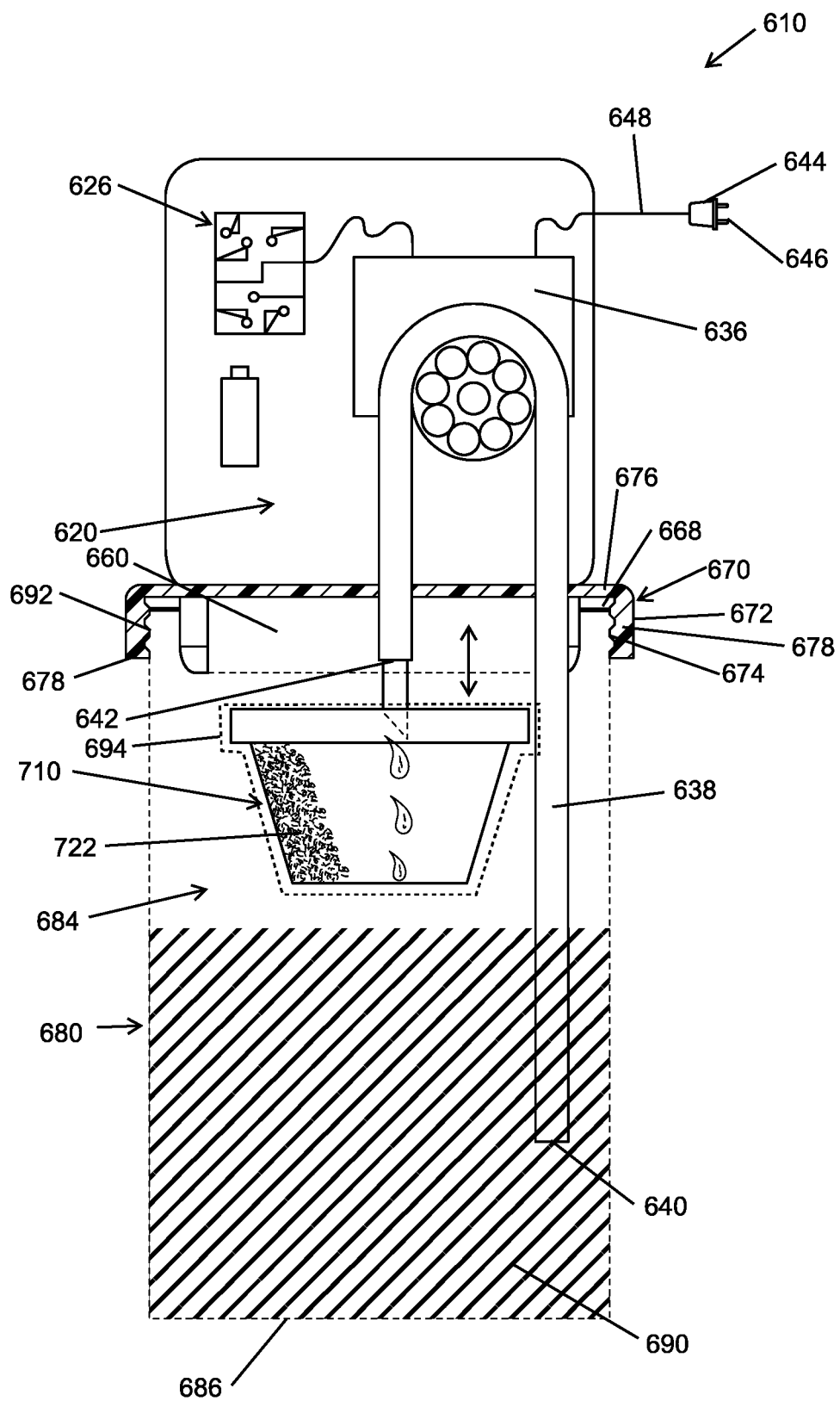
FIG. 45 is an elevation section view of the top housing of the portable coffee brewing system shown in FIGS. 41-51, the view showing the hollow interior of the top housing, the view showing some of the components housed within the top housing; the view showing a container threadedly attached to the collar and a coffee grounds holding device receiving fluid from the tube, the fluid being moved from the container to the coffee grounds holding device.
Figure 46:
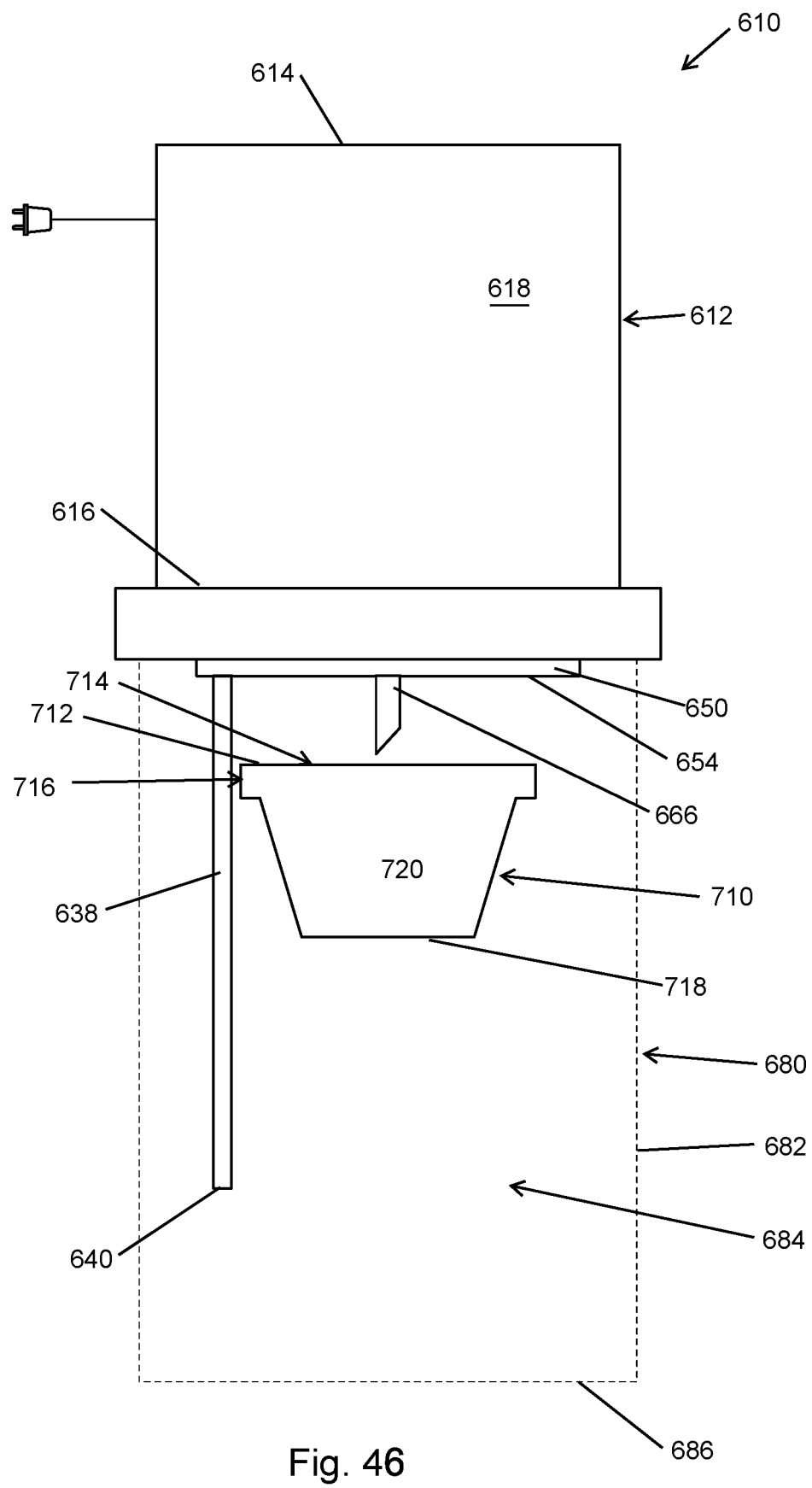
FIG. 46 is an elevation view of the portable coffee brewing system shown in FIGS. 41-51, the view showing the top housing with a plug extending therefrom; the view showing a container engaged with the top housing having a tube and a coffee grounds holding device in the hollow interior of the container.
Figure 47:
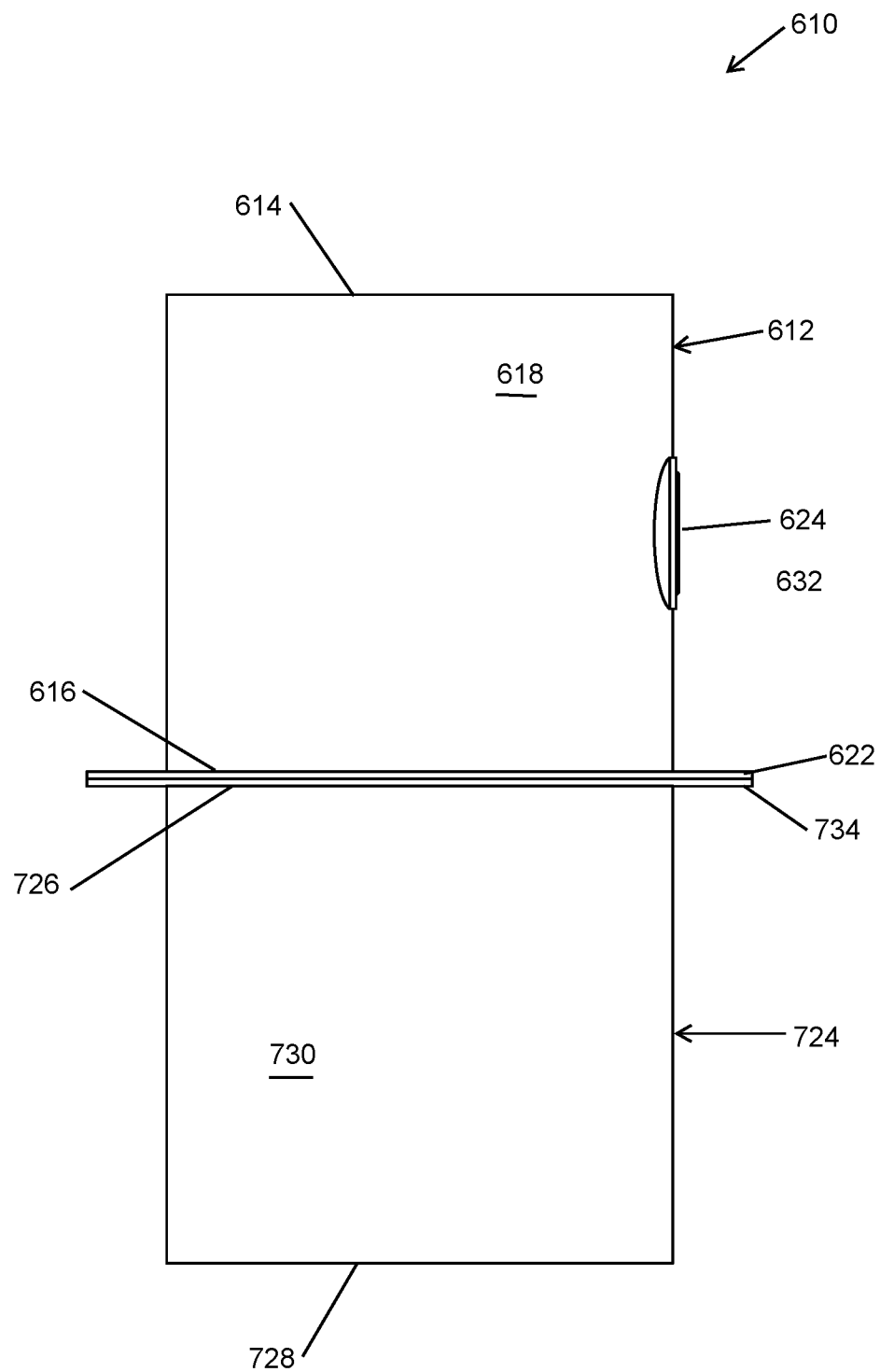
FIG. 47 is a left side elevation view of the portable coffee brewing system of FIGS. 41-51, the view showing a top housing engaged with a bottom housing.
Figure 48:
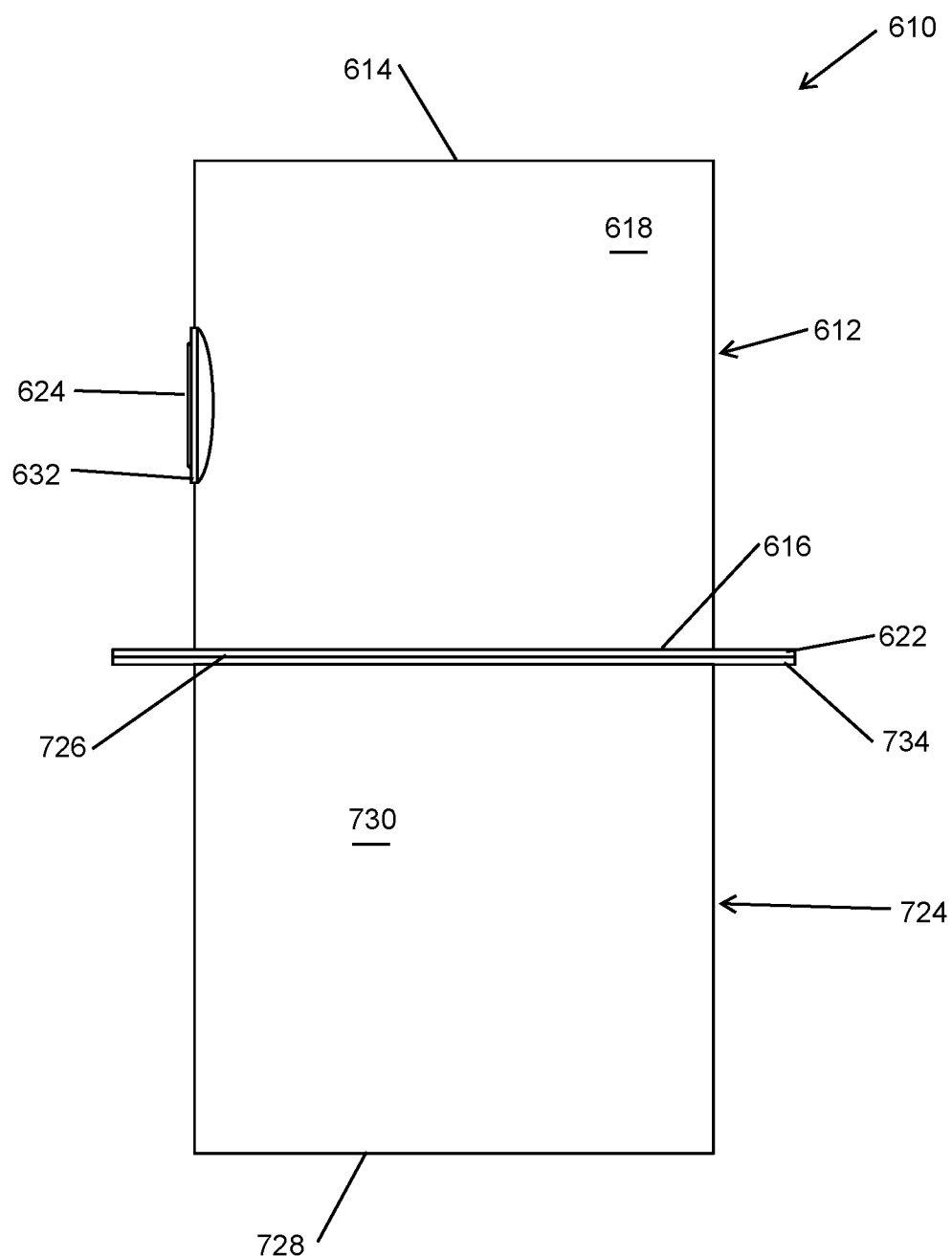
FIG. 48 is a right side elevation view of the portable coffee brewing system of FIGS. 41-51, the view showing a top housing engaged with a bottom housing.
Figure 49:
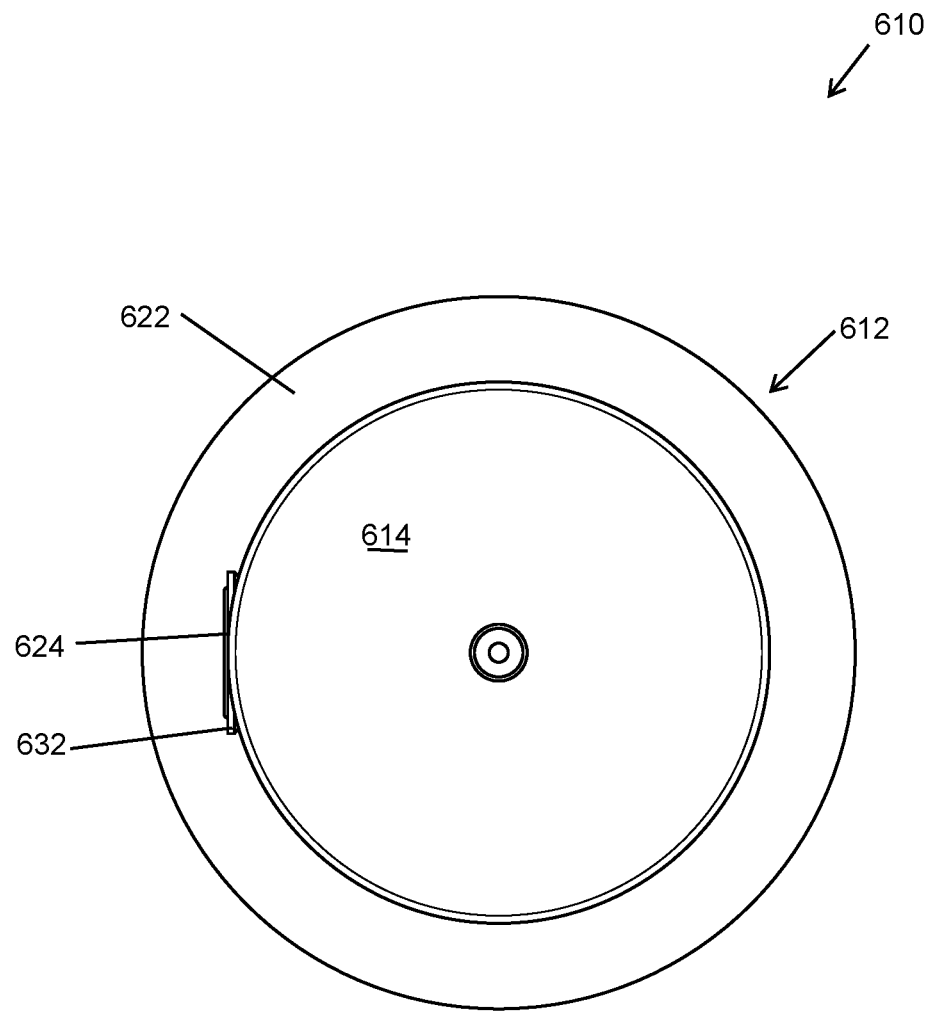
FIG. 49 is a top elevation view of the portable coffee brewing system of FIGS. 41-51, the view showing a top housing engaged with a bottom housing.
Figure 50:
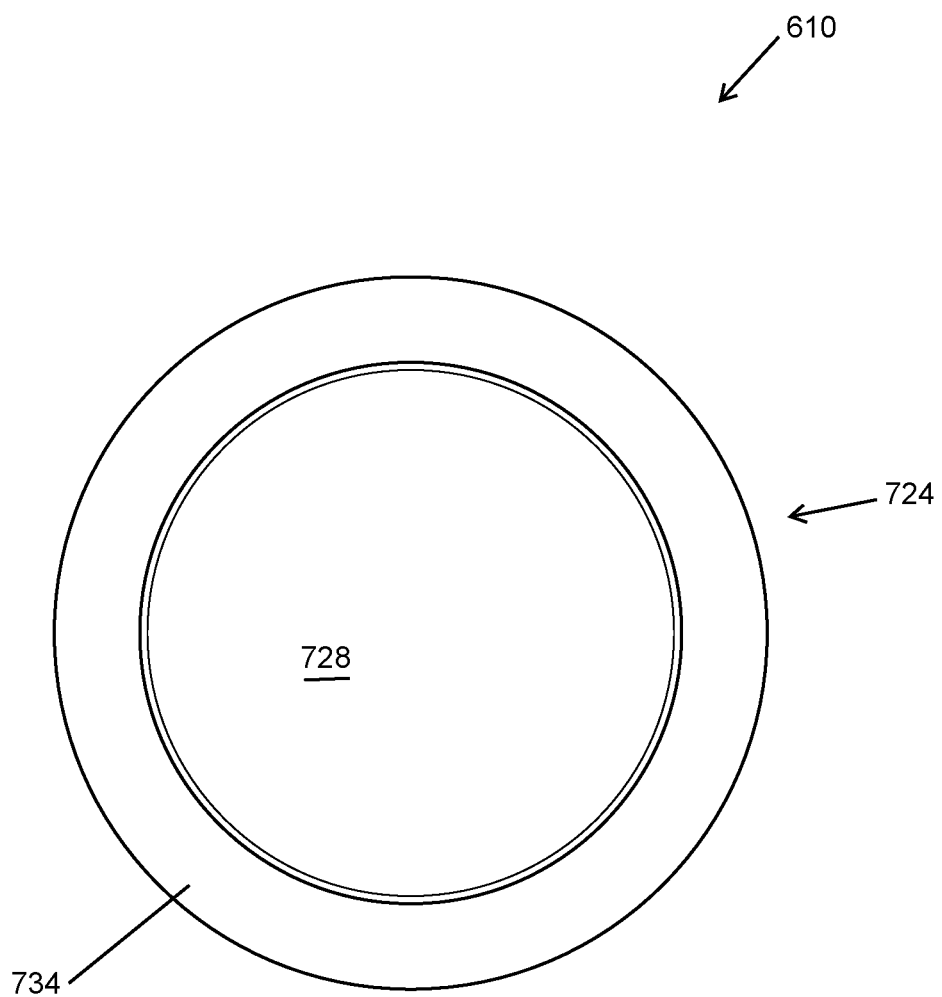
FIG. 50 is a bottom elevation view of the portable coffee brewing system of FIGS. 41-51, the view showing a top housing engaged with a bottom housing.
Figure 51:
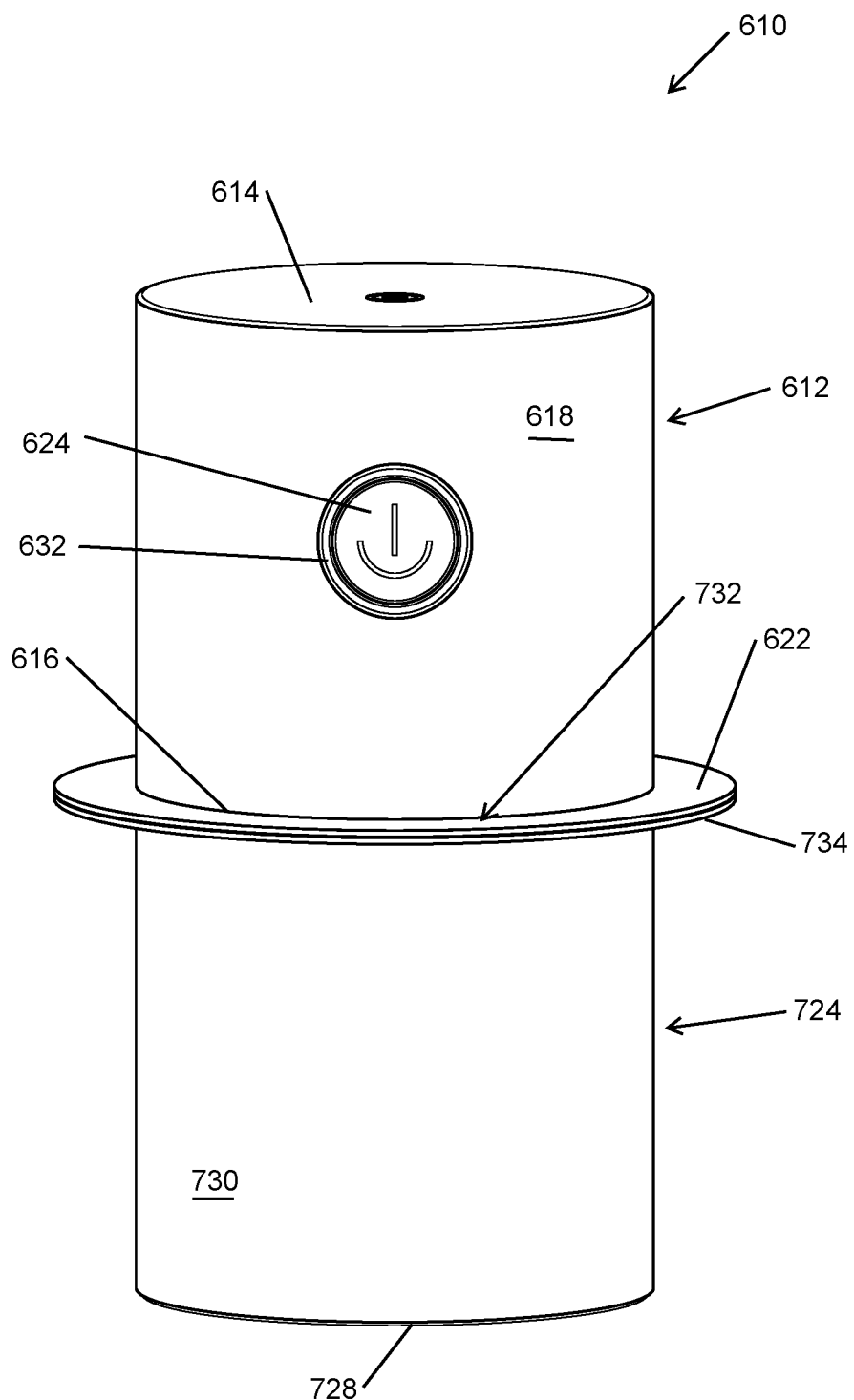
FIG. 51 is a front, top perspective view of the portable coffee brewing system of FIGS. 41-51, the view showing a top housing engaged with a bottom housing.

In the arrangement shown, as one example, in FIG. 45, container 680 is threadably connected to the top housing 612. In the arrangement shown, as one example, container 680 includes connecting features 692 at upper side of the exterior surface 682. Connecting features 692 are formed of any suitable size, shape and design and are configured to connect the container 680 to the top housing 612. In the arrangement shown, as one example, connecting features 692 are formed of threads that are engaged by threads 674 in a downwardly extending collar 670 connected to lip 622 in sealing threaded engagement. However, any other attachment means for engaging the container 680 to the top housing 612 are hereby contemplated for use, including but not limited to, friction fittings, lugs, interlocking, or other means.

Collar:

In the arrangement shown, as one example, lip 622 of top housing 612 includes a collar 670. Collar 670 is formed of any suitable size, shape and design and is configured to attach a container 680 to the top housing 612. With reference to FIG. 45, as shown as one example, collar 670 is formed of an upper section 676 which extends in a parallel spaced relation to the bottom side 616 of the top housing 612 and a lower section 678, which extends perpendicularly at the perimeter of upper section 676, in a circular ring-like manner.

In the arrangement shown, as one example, collar 670 includes a generally circular opening positioned at its middle that is defined by threads 674 located opposite, or along the interior surface, of the exterior surface 672 of the collar 670. In the arrangement shown, as one example, the threads 674 of the interior surface are sized and shaped to matingly receive and hold the connecting features 692 of the container 680 in threaded engagement thereby connecting and sealing the two components together. This arrangement allows for easy, simple, secure and sealed engagement by threading the two components together, while also allowing for easy and simple disengagement by unthreading the two components apart.

In an alternative arrangement, the top housing 612 may not include a collar 670. Top housing 612 can function without a collar 670. In this arrangement, as is shown in an example, the top housing 612 is without a collar 670. The top housing 612 rests upon a container and need not be sealed to a container or threadably attached or frictionally fit. Instead the process of brewing takes place without a collar 670.

Seal:

In the arrangement shown, as one example, the collar 670 includes a seal 668. Seal 668 is formed of any suitable size, shape and design and is configured to seal the top rim of the container 680 to the bottom side of the upper section 676 of the collar 670. Seal 668 is configured such that any fluid 690 within the container 680, or the rest of system 610, is held within system 610. In other words, whether the system 610 is on its side, upside down, or rolling around in a carrying case, the system 610 is sealed and capable of holding all fluids, coffee grounds, or other contents within the hollow interior 684 of the container 680 or within the hollow interior 660 of the basket housing 650, when the container 680 is engaged with the collar 670. In this arrangement, as is shown in one example, seal 668 is in constant contact with the exterior, top of the container 680, the rim forming the open upper end 688 of the container 680. When container 680 is engaged with seal 668 the hollow interior of container 680 and the lower end of system 610 is a closed system that cannot leak.

Basket Housing

In the arrangement shown, as one example, top housing 612 of system 610 includes a basket housing 650. Basket housing 650 is formed of any suitable size, shape and design and is configured to connect to top housing 612 and accept and hold the basket 694 of system 610. In the arrangement shown, as one example, basket housing 650 is formed of a top side 652 and a bottom side 654 which extend in approximate parallel spaced relation to one another. Top side 652 is generally flat and circular and is adjoined at its perimeter by exterior wall 658.

In the arrangement shown, as one example, exterior wall 658 forms a hollow interior 660. Hollow interior 660 is formed of any suitable size, shape and design and is configured to receive a basket 694, which will be described further herein. In the arrangement shown, as one example, hollow interior 660 is configured to frictionally fit basket 694 with close and tight tolerances so as to form a seal which fluid 690 cannot pass through, except through the defined path(s) defined by tube 638. Basket housing 650 and basket 694 may be connected to one another by any other manner, method or means, such as threaded engagement, frictional engagement, snap-fit, detents, or any other manner, method or means of connecting two components together or any combination thereof.

Said another way, basket housing 650 is designed to fit basket 694, and/or the coffee grounds holding device 710 in close and tight tolerances at a receiving member 662. The receiving member 662, discussed in further detail herein, creates a fit of close and tight tolerances while a punch 666 punctures the top of the coffee grounds holding device 710. Subsequently, a nozzle 704 or other opening allows for the fluid to flow out of the bottom of the basket 694 that may be associated with another punch 666 in the lower end of basket 694.

In the arrangement shown, as one example, basket housing 650 is sealed to the lower end of top housing 612 by any manner method or means such as by threading, adhering, welding, molding, gluing, screwing, bolting, or the like. In this way, the basket housing 650 seals to the lower end of top housing 612 and seals the hollow interior of top housing 612

Basket:

In the arrangement shown, as one example, system 610 includes a basket 694. Basket 694 is formed of any suitable size, shape and design and is configured to house the coffee grounds holding device 710. Additionally, basket 694 is configured to provide a seal against basket housing 650. In the arrangement shown, as one example, basket 694 is formed of a top side 696 and a bottom side 698 which extend in approximate parallel spaced relation to one another.

In the arrangement shown, as one example, basket 694 also includes an exterior wall 706 which forms a hollow interior of basket 694. In the arrangement shown, as one example, the upper part of exterior wall 706 of the basket 694 adjoins a collar 700. Collar 700 is generally circular and extends the perimeter of the top part of basket 694. Collar 700 is configured to engage the receiving member 662 of the basket housing 650 with close and tight tolerances. In this way, basket 694 frictionally engages top housing 612, however any other form of engagement is hereby contemplated for use including threaded engagement, snap fit engagement, or the like or any combination thereof.

In the arrangement shown, as one example, the bottom side 698 of basket 694 includes a nozzle 704 and in some cases another punch 666. Nozzle 704 is formed of any suitable size, shape and design and is configured to provide an opening for fluid to flow through the bottom of the basket 694 and into a container 680. In the arrangement shown, as one example, fluid 690 passes through a coffee grounds holding device 710 within the hollow interior of the basket 694 before passing through the nozzle 704. Basket 694 also includes a punch 666. Punch 666 is formed of any device that forms a hole into the coffee grounds holding device 710 to allow the passage of fluid out of coffee grounds holding device 710 and out nozzle 704.

Coffee Grounds Holding Device:

In the arrangement shown, as one example, system 610 is used in association with a coffee grounds holding device 710. Coffee grounds holding device 710 is formed of any suitable size, shape and design. In one arrangement, as is shown, coffee grounds holding device 710 is formed of what is commonly known as a "K-cup" which was designed and originally manufactured and distributed under the name Keurig which is part of Keurig Green Mountain, Inc. which has its headquarters in Waterbury, Vermont. These coffee grounds holding devices 710 are single use, single serve and are formed of a plastic container that is generally cylindrical in shape and narrows as it extends downward before terminating in a bottom wall. The coffee grounds holding device 710 includes a lip 716 connected to the top side 712 of exterior wall 720 and extends outward therefrom. However, any other form of a coffee grounds holding device 710 is hereby contemplated for use such as a reusable holder, or any other form or configuration of a coffee ground holding device 710.

The hollow interior formed by the coffee grounds holding device 710 is enclosed by a cover 714. A bottom side 718 of the coffee grounds holding device 710 is configured as the bottom surface of the coffee grounds holding device 710 and holds an amount of coffee grounds 722 therein. The bottom side 718 is capable of being pierced or punched, by punch 666, which allows for the passage of fluids there through while preventing the passage of coffee grounds 722. This arrangement allows for quick and easy insertion and removal of a coffee grounds holding device 710 into the basket 694.

Tube:

In the arrangement shown, portable coffee brewing system 610 is used in association with a tube 638. Tube 638 may be formed of any suitable size, shape and design and is configured to recirculate water from the container 680 to the coffee grounds holding device 710.

In the arrangement shown, as one example, tube 638 is formed of an elongated elastomer with a hollow interior having an inlet end 640 and an outlet end 642. In the arrangement shown, as one example, tube 638 extends in a continuous and uninterrupted manner from inlet end 640 to outlet end 642 thereby eliminating any need for seams, which can leak or break and/or can hold bacteria therein. In the arrangement shown, as one example, the inlet end 640 is extended by the elongated tube 638 and rests in the fluid 690 of the container 680. In the arrangement shown, as one example, the tube 638 then passes into the top housing 612 where the tube 638 is engaged by a pump 636. In the arrangement shown, as one example, after engaging the pump 636, the tube 638 extends into the basket housing 650 and connects to the nozzle 664 that connects to a punch 666. In the arrangement shown, as one example, the outlet end 642 is attached to upper side of the nozzle 664 of the basket housing 650 which connects to punch 666. In this way, the outlet end 642 connects with the basket housing 650 so fluid 690 can move directly into the basket housing 650. This arrangement prevents fluid 690 from entering into the hollow interior 620 of the top housing 612.

In the arrangement shown, as one example, a silicone rubber (an elastomer) is used. Silicone rubber is generally non-reactive, stable, and resistant to extreme environments such as hot and cold while maintaining its useful properties, such as, holding water and the ability to move fluid from one location to another without leaking (absent any adhesions or holes). In the arrangement shown, as one example, silicone rubber tubing is used. However, other materials or configurations of tubing are hereby contemplated for use.

In the arrangement shown, as one example, the silicone rubber tubing is highly flexible. This is advantageous and novel because of the incorporation of a peristaltic pump 636 in this operation. By incorporating a peristaltic pump 636 in the top housing 612, the need for connections is eliminated. This prevents risk of leakage of fluid 690 into the top housing 612. Additionally, this prevents any fluid 690 contamination because the peristaltic pump 636 never comes into contact with the fluid 690. Additionally, this enhances the flavor of the brewed beverage because the water is never diluted with any metal toxins or other resins or surfaces it may pick up from contact with mechanical equipment and the like. It is known in the art that some coffee brewing methods filter water multiple times to preserve the flavor of the brewed beverage. Therefore, the incorporation of a flexible silicone tube and a peristaltic pump is both novel and non-obvious for a portable coffee brewing system 610. In addition, the use of the peristaltic pump 636 makes it easier to clean the system 10

Pump:

In the arrangement shown, as one example, portable coffee brewing system 610 is used in association with a pump 636. Pump 636 may be formed of any suitable size, shape and design and is configured to move fluid 690 as well as air.

In the arrangement shown, as one example, pump 636 is a peristaltic pump. A peristaltic pump is a positive displacement pump used for pumping a variety of fluids. Peristaltic pumps are commonly known as roller pumps. When a fluid 690 is contained within tube 638, tube being a flexible tube 638, a rotor or number of rotors rolls and compress the flexible tube. As the rotors turn, the parts of the tube under compression is pinched closed, thus forcing the fluid 690 to move through the tube. Additionally, as the tube 638 opens to its natural state after the passing of the cam, fluid flow is induced to the pump. This process is also known as peristalsis and is used in many biological systems such as the gastrointestinal tract. However, this process has never been used in a portable coffee brewing system.

Typically, with a peristaltic pump, there will be two or more rollers occluding the tube 638, trapping between them a body of fluid. The body of fluid is then transported, at ambient pressure, toward the outlet end 642 of the tube 638. Peristaltic pumps may run continuously, or they may be indexed through partial revolutions to deliver smaller amounts of fluid.

In the arrangement shown, as one example, peristaltic pump is also capable of moving air through the tube 638. By using a peristaltic pump, which can move air through the tube 638, portable coffee brewing system 610 has introduced a line clearing process into coffee brewing devices. In this process, while the pump is running, the top housing 612 merely needs to be lifted from container such that air can enter the inlet end 640 of the tube 638. The peristaltic pump will then move air throughout the entire tube 638 to clear the tube 638 of any fluid 690.

This process is advantageous over other coffee brewing devices known in the art because known devices do not have a tube clearing process. Current known devices are capable of collecting fluid and allowing bacterial growth, clogging of tubes, among many other problems. For this reason, manufacturers of coffee brewing devices go to great lengths to require their machines be cleaned frequently by harsh chemicals. Introduction of harsh chemicals can not only damage the device, but cause human harm if left unrinsed. Additionally, any safe level of remaining chemicals in a brewing device line would contaminate the flavor of a brewed fluid. For this reason and many more, the pump 636 as described herein offers many advantages.

In an alternative arrangement, the system 610 may include a lift mechanism 736 which is capable of lifting or removing the inlet end 640 of the tube 638 out of the fluid 690 such that air may enter the tube 638 and begin the line clearing process without any human intervention. The lift mechanism 736 would be programmed on a timer 628 or triggered by another sensor programmed into the microprocessor 626.

Furthermore, in the arrangement shown, as one example, the pump 636 is able to run in reverse. This eliminates the step of lifting the top housing 612 out of the container such that air can enter into the inlet end 640. Instead, by incorporating a pump 636 which can run in the reverse direction, the entire brewing process can take place, along with line clearing, without any human interaction.

In an alternative embodiment, a reservoir 630 may also be introduced. In this case, a reservoir 630 could be housed within top housing 612 and introduce added fluid 690 which has not been brewed. This fluid 690 can be used for line clearing as well of for fluid dilution. Fluid dilution is common with the cold brewing process. The cold brewing process commonly creates a more potent, or concentrated, coffee. Fluid dilution may be desired.

With the introduction of a reservoir 630, a single tube 638 may still be used due to the properties of silicone tubing. Silicone tubing can be cured into a single piece. Additionally, check valves may be introduced to the system to prevent fluid from flowing into the reservoir 630 or in other undesired directions. Additionally, a reservoir 630 may be accompanied by a heating element 656 for warming fluid 690. Even with the introduction of check valves or an additional number of pumps 636, a novel feature of the arrangement shown, is that no fluid 690 would be able to leak into the top housing 612 where many electronic components and other mechanical components are housed. The introduction of water or other fluids with power and electronic components is undesired.

Figure 52:
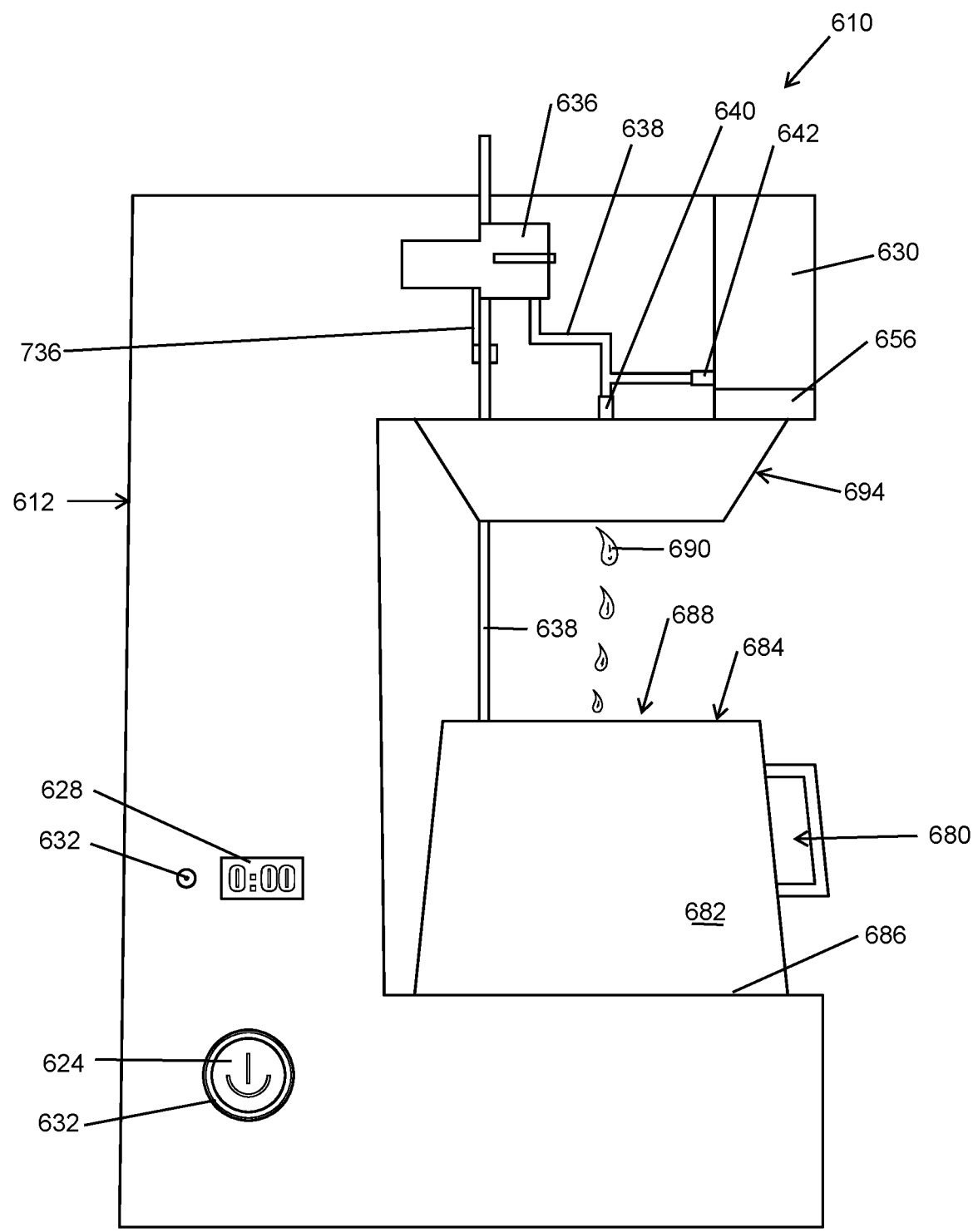
FIG. 52 is a countertop coffee brewing device, the view showing a coffee brewing device with a top housing, a middle housing, a basket housing, a coffee grounds holding device, a container and a tube; the view showing a hollow interior of a top housing including a pump, a lifting mechanism, a tube, a plurality of valves, and a reservoir housed within the top housing; the view showing a socket, a timer, an indicator, and an On/Off button on the exterior of the middle housing.
Figure 53:
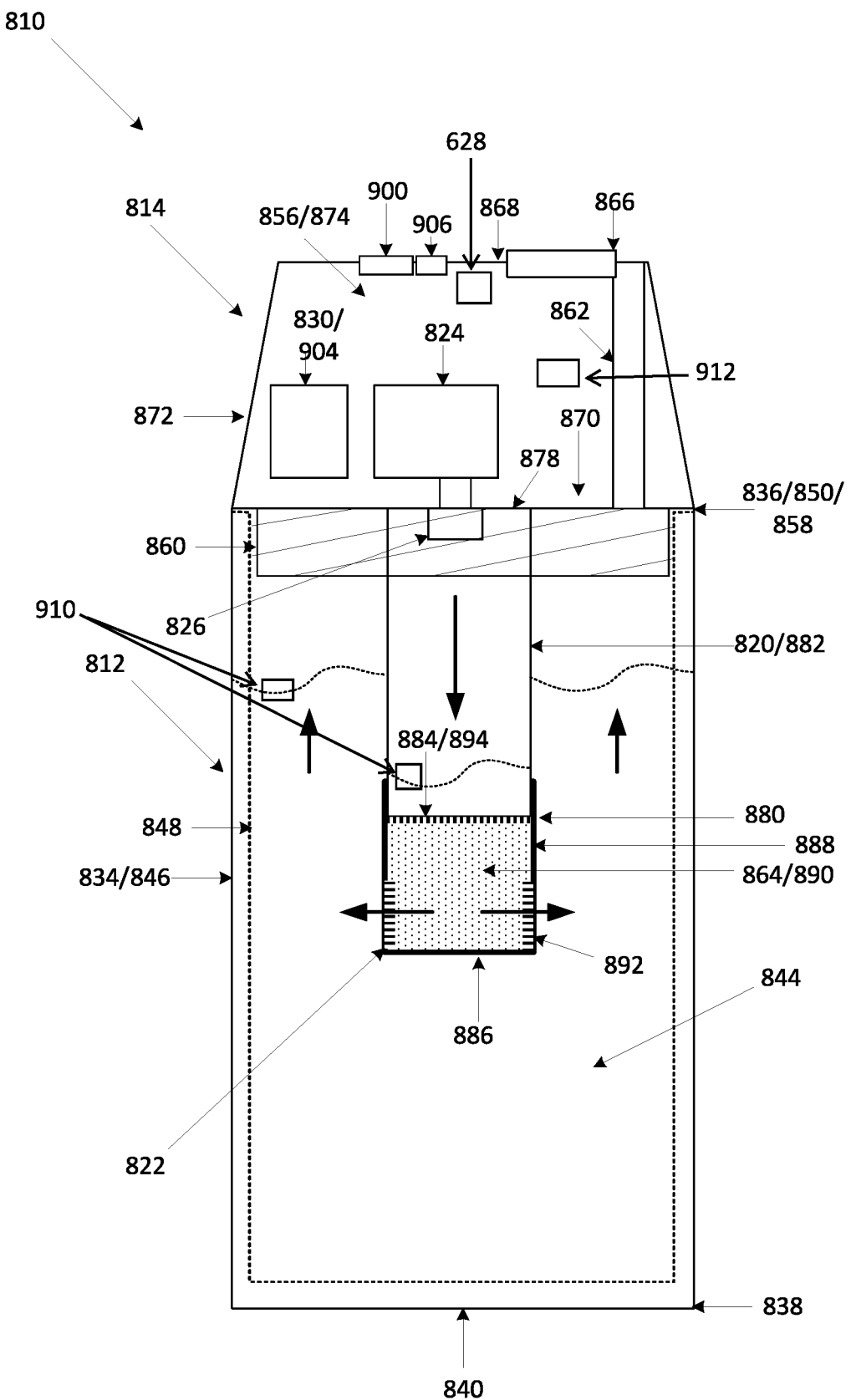
FIG. 53 is side cross section view of a countertop coffee brewing device, in accordance with one or more arrangements, the view showing air being pushed into an upper end of tube by the pump to cause fluid in the tube and basket to be pushed into the hollow interior of container.
Figure 54:
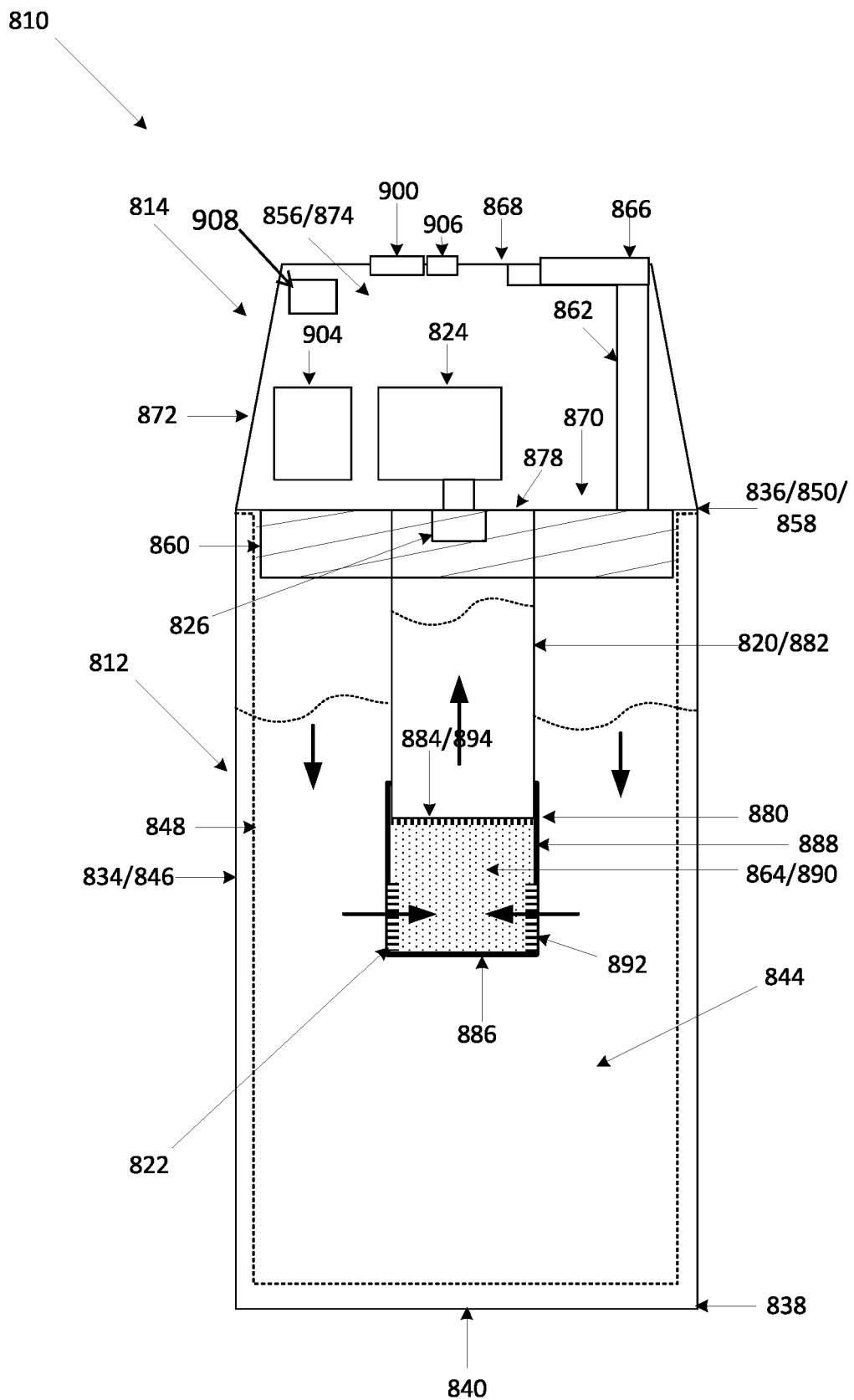
FIG. 54 is side cross section view of the countertop coffee brewing device shown in FIG. 53, in accordance with one or more arrangements, the view showing air being drawn from the upper end of tube by the pump to cause fluid in hollow interior of the container to be drawn into the basket, through coffee grounds and into tube.
Figure 55:
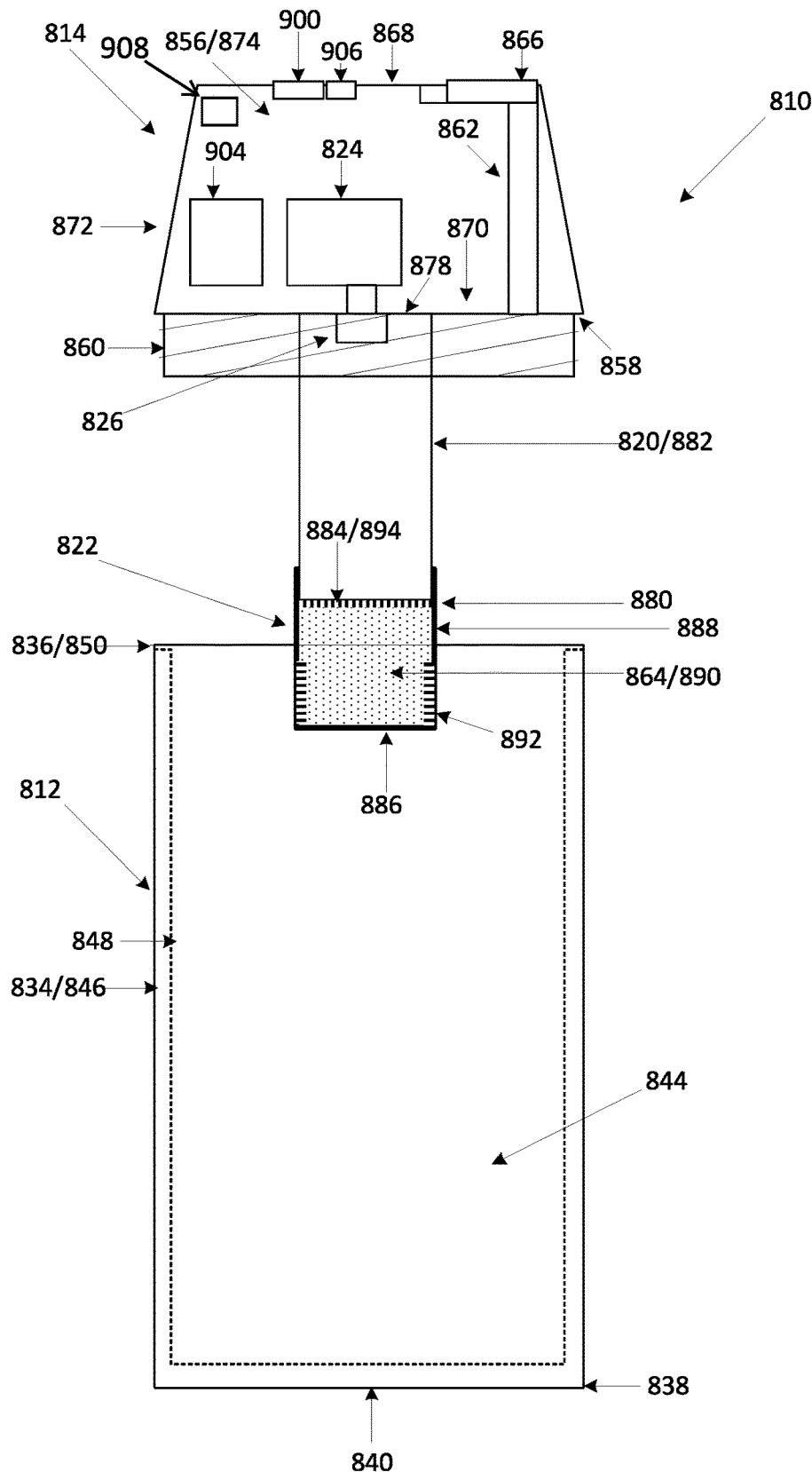
FIG. 55 is a side cross section exploded view of a countertop coffee brewing device, in accordance with one or more arrangements; the view showing a first arrangement of the lid assembly having a collar configured to fit within the upper end of a container of the countertop coffee brewing device.
Figure 56:
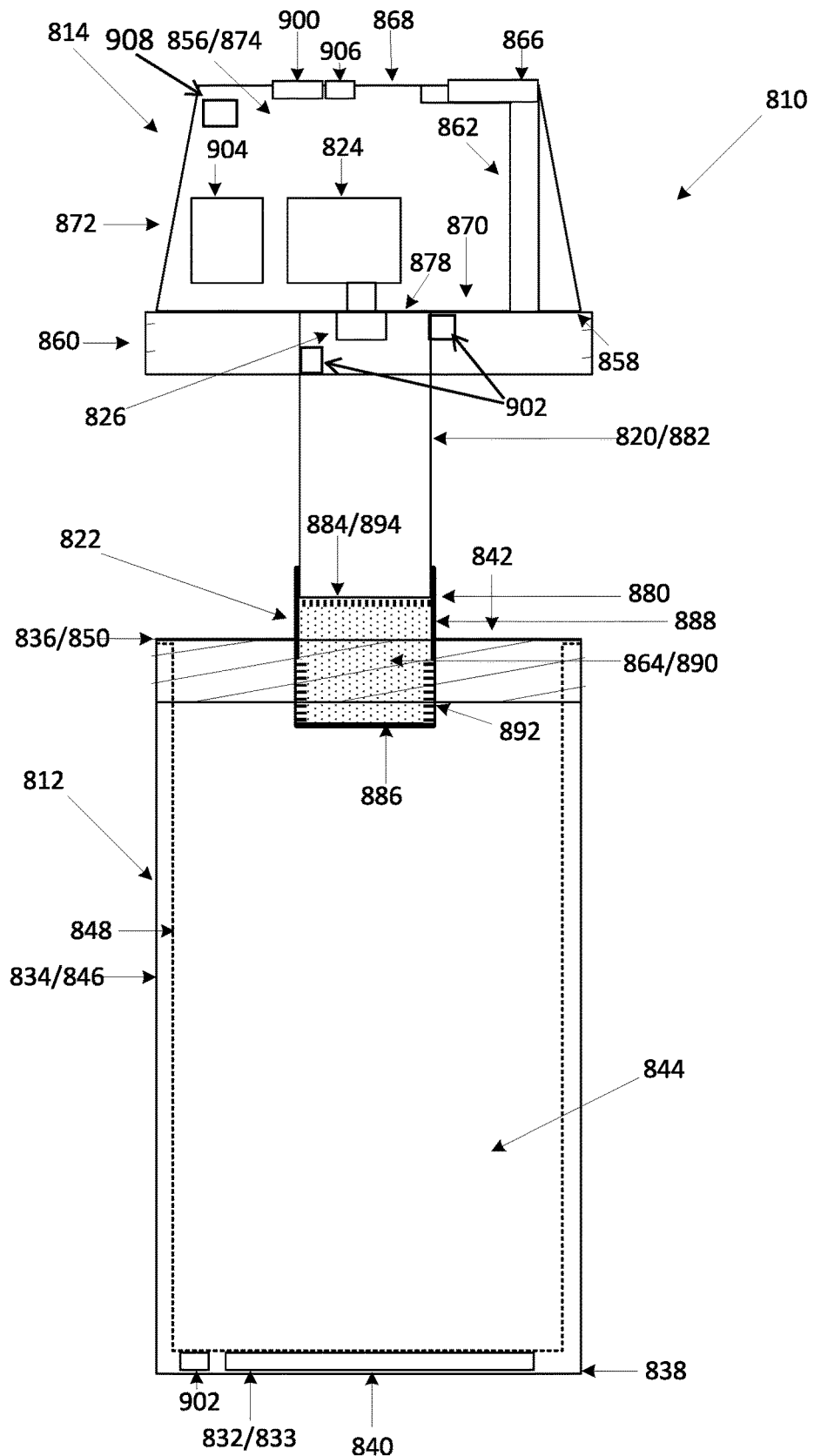
FIG. 56 is a side cross section exploded view of a countertop coffee brewing device, in accordance with one or more arrangements; the view showing a first arrangement of the lid assembly having a collar configured to fit over the upper end of a container of the countertop coffee brewing device.

As one example, with reference to FIG. 52, a check valve 740 may be placed in tube 638 at or near the outlet end 642 of tube 638 and a check valve 742 may be placed at the inlet from reservoir 630. In this arrangement, in normal operation, pump 636 recirculates fluid from inlet end 640 of tube 638 through the outlet end 642 of tube 638 and the presence of the check valves 740, 742 prevent fluid from flowing backward. At the end of the brewing process, which may be identified by a timer or when the user manually stops the brewing process, pump 636 operates in reverse thereby pulling fluid from reservoir 630 (note this fluid may be air or water or any other fluid) and push this fluid through tube 638 out the inlet end 640 of the tube 638 thereby clearing and cleaning the tube 638 for future uses. The tube 638 can also be cleaned by circulating clean water or other cleaning fluids through tube 638 using pump 636.

Microprocessor:

In the arrangement shown, portable coffee brewing system 610 is used in association with a microprocessor 626. Microprocessor 626 may be formed of any suitable size, shape and design and is configured to control the functions of all the processing and controls of system 610. In the arrangement shown, as one example, microprocessor 626 is a multipurpose digital integrated circuit that accepts binary data as input, processes it according to instructions stored in its memory, and provides results as output. Microprocessor 626 contains both combinational logic and sequential digital logic. Microprocessor 626 operates on numbers and symbols.

In the arrangement shown, as one example, microprocessor 626 is integrated into the functionality of the On/Off button 624, the plug 646 (or power source), and the pump 636, among other components. While microprocessor 626 is shown as working with one pump and one external power source, in the arrangement as is shown, any number of pumps, power sources, timers, indicators, or other components which can be integrated, controlled and/or tied into the functionality of a microprocessor 626 are hereby contemplated for use.

In the arrangement shown, a microprocessor 626, with the integration of a whole CPU (computer processing unit), is on one single chip to greatly reduces the cost and to greatly reduce the power consumed by portable coffee brewing system 610. This greatly increases the efficiency of system 610 and makes it possible that portable coffee brewing system 610 to be powered by lower power output sources. Additionally, other power sources are hereby contemplated for use, such as, a hardline (or common power outlet), a cell phone, a usb cord connected to computer or other electronic, a small solar power source, a usb connected to a campfire power generator, or a small power cell (or battery) housed within system 610 or outside of system 610. These and other power sources are hereby contemplated for use. In one arrangement, as is shown, a power cell is located within the top housing 612 of system 610. Also shown, is a plug 646 which can be plugged into a common power outlet, so a user may plug in system 610 almost anywhere.

Socket & Plug:

In the arrangement shown, system 610 is used in association with a socket 644. Socket 644 may be formed of any suitable size, shape and design and is configured to connect the interior components which require power to the exterior power lead 648 and plug 646. Any form of a socket 644 that connects two components together and allows for electrical transmission there between is hereby contemplated for use. This includes, but is not limited to, a two wire socket, a three wire socket, a headphone jack, a USB socket, or any other form of a socket. Socket 644 is sized and shaped to matingly receive plug 646 in a removable manner. Plug 646 is connected to power lead 648. Power lead is designed to be connected to an external power source, such as a wall plug in, a USB power, a cigarette lighter socket in a vehicle, or any other power source. In one arrangement, system 610 includes a completely self-contained power source within top housing 612 such as one or more batteries which may be rechargeable, or not rechargeable.

On/Off Button & Indicator:

In the arrangement shown, as one example, system 610 includes an On/Off button 624. On/Off button 624 may be formed of any suitable size, shape and design and is configured to start or stop the brewing process. Additionally, the On/Off button 624 may start or stop a timer 628 associated with the brewing process. Additionally, the On/Off button 624 may be used for other functions such as Bluetooth pairing capabilities or control for reverse and line clearing processes. Various On/Off button 624 functionalities can be programmed into the linked microprocessor 626, which vary depending on the amount of times the On/Off button 624 is pressed or the duration at which the On/Off button 624 is held down.

In the arrangement shown, as one example, On/Off button 624 is formed of a circular button located on the exterior wall 618 of the top housing 612. However, On/Off button 624 may be located anywhere which is convenient. Additionally, the single On/Off button 624 may be replaced by a plurality of buttons with a plurality of different functionalities. Additionally, in an alternative arrangement, no On/Off button 624 may exist as a user may control the system 610 with a smart phone or other connected device, including devices connected through the internet.

In the arrangement shown, as one example, On/Off button 624 is circular and is surrounded by a circular LED light capable of a plurality of colors. This light is also known as the indicator 632. The indicator 632 may be formed of any suitable size, shape and design and is configured to provide various notifications to the user of the current functional states of the portable coffee brewing system 610. As one example, the indicator 632 may light up when a user has pressed the On/Off button 624 a single time to start the brewing process. As another example, the indicator 632 may blink a flashing light to inform the user that the On/Off button 624 has been held down long enough to put the device in Bluetooth searchable mode for other devices, such as a smart phone, to "find" the portable coffee brewing system 610.

In an alternative arrangement, indicator 632 may take the form of a timer 628. Timer 628 would provide a user with a notification of how much time is left in the brewing process. In one arrangement, this amount of time may be programmed by a user to optimize the brewing process for different origins of coffee beans or different mediums for brewing, such as tea or the like. In yet another arrangement, a timer indicator may be used in addition to indicator 632. Timer 628 may be formed of any suitable size, shape and design. In one arrangement, timer 628 is formed of a digital timer indicating minutes and seconds. Other timers are hereby contemplated for use, including timers which are not displayed to the user but are instead programmed into the microprocessor.

In Operation:

When using portable coffee brewing system 610, the user first removes the bottom housing 724 from top housing 612. In the arrangement shown, as one example, this is accomplished by simply pulling top housing 612 and bottom housing 724 apart, thereby overcoming the frictional engagement between the two components. The user then removes the basket 694 from the basket housing 650. Again, in the arrangement shown, as one example, this is accomplished by simply pulling the basket 694 from the basket housing 650 thereby overcoming the frictional engagement between the two components. The user places a k-cup, or coffee grounds holding device 710 with coffee grounds 722 into the hollow interior of the basket 694 with the cover 714 of the coffee grounds holding device at the top of the basket 694. The user pushes down on the coffee grounds holding device 710 thereby causing the punch 666 in the lower portion of the basket 694 to puncture the bottom of the coffee grounds holding device 710 thereby forming an outlet for fluid running through the coffee grounds holding device 710.

Once the coffee grounds holding device 710 is inserted within basket 694, the basket 694 is frictionally fit into the basket housing 650. The basket 694 is frictionally fit within the hollow interior 660 of basket housing 650 by pressing the basket 694 into the basket housing 650. When the basket 694 is pressed within the hollow interior 660 of the basket housing 650, the collar 700 of the exterior wall 706 engages the receiving member 662 of the hollow interior 660 of the basket housing 650 thereby holding the two components frictionally together. The basket 694 will engage the basket housing 650 with close and tight tolerances such that no fluid 690 can escape.

When the basket 694 and coffee grounds holding device 710 are pressed into the basket housing 650, the punch 666 of the basket housing 650 penetrates the cover 714 of the coffee grounds holding device 710. When the punch 666 penetrates the cover 714, a clear path for which fluid can flow into the coffee grounds holding device 710 is created.

Once the basket 694 is placed within the basket housing 650, a container 680, filled with fluid, can be attached to the top housing 612. Alternatively the top housing 612 could be placed on top of any container 680. A ball jar, or threaded rim jar may be attached to the collar 670 of the top housing 612 by rotating the ball jar to engage the connecting features 692, or threads, with the threads 674 of the collar 670. The ball jar should be rotated until the top of the rim of the ball jar engages with the seal 668. Engaging the ball jar (container 680) with the seal 668 creates a closed position.

In this closed position, portable coffee brewing system 610 may be transported in a pre-brewed state. Alternatively, portable coffee brewing system 610 may be transported while brewing is occurring. Fluid held within the hollow interior 684 of the container 680 is held in place and does not leak as the container is sealed against the top housing 612. In addition, the basket housing 650 seals the upper end of the container 680. As such, portable coffee brewing system 610 may be transported in a pre-brewed state, or during the brewing process, without fear of leaking.

Once the user gets to their desired location, and/or the time is right, the user plugs in the portable coffee brewing system 610, or in a system 610 that is powered by an internal power cell, the user activates the brewing process. In the arrangement shown, as one example, a plug is shown hard-wired from the system 610 to a power outlet. However, other power sources are hereby contemplated for use such as a USB port wired to a cell phone or computer, a self-contained battery, a solar activated power source, or the like.

The user activates system 610 by pressing the On/Off button 624. In the arrangement shown, as one example, On/Off button is located in the exterior wall 618 of the top housing 612. Upon activation, the peristaltic pump 636 is powered on. The peristaltic pump 636 will begin pulling fluid 690 in the inlet end 640 of the tube 638. The fluid 690 will move through the tube 638, out of the outlet end 642 where the outlet end 642 is connected to the nozzle 664 of the basket housing 650. The fluid 690 will enter the coffee grounds holding device 710 through the puncture previously generated by the punch 666 in the cover 714 and out the opening formed by the punch 666 in the lower end of the basket 694 and out the nozzle 704. Once the fluid 690 has entered the coffee grounds holding device 710, the brewing process between fluid 690 and coffee grounds 722 begins. The brewing occurs in a continuous recirculation loop for the desired amount of time.

Within the coffee grounds holding device 710, or K-cup, water or fluid 690 is pulled through the coffee grounds using gravity (if the system 610 is sitting on the bottom side 728 of the bottom housing 724). This method of brewing is also known as gravitational feed or percolating, commonly associated with drip brew. Portable coffee brewing system 610 may work this way. Alternatively, the portable coffee brewing system 610 will also work even if it is placed on its side.

Another brewing method is pressurized percolation. As the peristaltic pump 636 forces more fluid 690 into the interior of the coffee grounds holding device 710, the fluid is forced through system 610 by pressure. This is a low pressure brewing method, however a high pressure brewing method is also hereby contemplated for use.

As the fluid is forced, either by pressure or by gravity through the coffee grounds holding device 710, the fluid 690 interacts with the coffee grounds 722 and extracts the correct degree of contents from the coffee including, in some cases, caffeine, among other flavors and aromas. More technically, the fluid 690 is dissolving the coffee grounds into soluble flavors. Various ratios can be programmed in different circumstances to create an optimal extraction strength and brew ratio.

Once the brewing process is complete and the fluid 690 has extracted the contents from the coffee grounds 722, the brewed fluid enters an opening formed by punch 666 at the bottom of the coffee grounds holding device 710 and exits the bottom through a nozzle 704.

In an alternative arrangement, once the brewing process is complete and the fluid 690 has extracted the desired amount of contents from the coffee grounds 722, the brewed fluid is forced through the bottom of the coffee grounds holding device 710 and into the lower part of the hollow interior of the basket 694. Once in the basket 694, the brewed coffee moves through the nozzle 704 located at the bottom side 698 of basket 694. The fluid enters the container 680.

The brewing process may be complete depending on the type of brewed beverage desired. Another advantage of this system is that because the contents are returned to the container 680, they are able to be recirculated through the system 610 for however long is desired. In the arrangement shown, as one example, fluid 690 may be recirculated through the system for 20 minutes to create an optimal "cold brew". Any amount of time is hereby contemplated for use.

The contents can be brewed at room temperature or placed in a cooling device to brew at colder temperatures. Also, warm fluid may be used. While the arrangement shown, as one example, does not include a heating or cooling apparatus, a heating or cooling apparatus to change the brewing temperature and conditions is hereby contemplated for use.

After brewing has completed, when the user is ready to drink coffee, tea, or whatever else was brewed, the user simply removes the container 680 from the top housing 612. The user may allow the line to clear by hovering the top housing 612 over the container 680 for a moment such that air is pumped into and through the tube 638 by pump 636 thereby clearing and cleaning tube 638. By hovering the top housing 612 over the container 680, no drips are spilled to undesired locations. Once the top housing 612 is removed, the user can drink the contents of the container 680.

Another advantage of this system is that the fluid 690 and the coffee grounds 722 are kept in an environment free of oxygen turnover. Brewed coffee, if kept hot, will deteriorate rapidly in flavor, as the heat acts as a catalyst in more rapid oxygen turnover with the coffee. Furthermore, reheating coffee after it has cooled tends to give it a "muddy" flavor, as reheating destroys compounds in the coffee that give it its flavors. Even when brewed at room temperature, deterioration of the coffee flavors will occur. However, if the coffee can be kept oxygen-free or relatively free of oxygen turnover, then it can retain its flavors, almost indefinitely (at room temperature). Thus, a sealed container, and furthermore, a sealed brewing device, deliver a higher quality, more flavorful coffee.

The portable coffee brewing system 610 is sealed entirely from the exterior by close and tight tolerances. The tube 638 is a unitary piece that does not allow oxygen turnover. The basket 694, basket housing 650, and container 680 are all sealed away from oxygen turnover. This provides a brewing process and sealed environment which will allow the coffee to retain and maintain its flavor.

This process may be repeated however many times the user desires. The user simply needs to replace the extracted coffee grounds 722 with fresh grounds. In other words, the user may replace the K-cup with a new K-cup which hasn't been used and place a second container with the desired amount of fluid 690 against the top housing 612.

Alternative Embodiment: With reference to FIG. 52 an alternative arrangement of portable coffee brewing system 610 is presented. This alternative arrangement presented in FIG. 52 is similar to portable coffee brewing system 610 presented in FIGS. 41-51, and therefore, unless specifically stated otherwise, the teachings presented herein apply to the embodiment presented in FIG. 52.

In the arrangement shown, as one example, countertop coffee brewing system 610 utilizes a similar method, process, and device for brewing coffee as referenced to FIGS. 41-51. The countertop coffee brewing system 610 with reference to the associated embodiment of FIGS. 41-51 presented herein are similar.

In the arrangement shown, as one example, and with reference to FIG. 52, the countertop brewing system 610 utilizes a housing 612. Housing 612 has a top side 614, a bottom side 616, an exterior wall 618 and a hollow interior 620. Housing 612 also has a large brewing space 738 where the container 680 can rest. Additionally, in brewing space 738, the coffee grounds holding device 710 can be inserted and removed.

Alternate Arrangement

With reference to FIGS. 53-56 an alternative arrangement is presented that is similar to the various arrangements presented in FIGS. 1-52, and in which, includes many components that are similar if not identical to those described with reference to FIGS. 1-52. Accordingly, discussion related to arrangements and components described with reference to FIGS. 1-52 applies equally to arrangements and components described with reference to FIGS. 53-56 unless stated otherwise.

In the arrangements shown, a portable coffee brewing system 810 is presented that includes a container 812, a lid assembly 814, a pump 824, tube member 820, a basket 822, a check valve 826, and electrical components 830, among various other components.

Container 812: Container 812 is formed of any suitable size, shape and design and is any form of a liquid holding vessel such as a cup, a mug, a travel mug, a thermal mug, or the like. In one arrangement, as is shown, container 812 includes a sidewall 834 that extends in a generally circular manner from upper end 836 to lower end 838, a bottom 840 extending between sidewall 834 at lower end 838, an open top 842 at upper end 836 and a hollow interior 844 therein. In one or more arrangements, container 812 includes outer container 846 (formed by the sidewall 834 and bottom 840) and an inner sleeve 848.

Sleeve 848:

Sleeve 848 is formed of any suitable size, shape and design and is configured to fit within outer container 846 and hold liquid/coffee therein. In one arrangement, sleeve 848 is formed of a metallic material such as aluminum, stainless steel or the like, whereas outer container 846 is formed of a plastic or composite material. In the arrangement shown, sleeve 848 is configured to fit within outer container 846 and generally follow the contours of outer container 846 with a space between the exterior surface of sleeve 848 and the interior surface of outer container 846.

In the arrangement shown, sleeve 848 includes a lip 850 extending outward from the upper end 836 of sleeve 848. Lip 850 contacts outer container 846 at upper end 836 and in one arrangement seals to outer container 846 at upper end 836. Lip 850 helps to prevent liquid from getting between container 213 and sleeve 848. Lip 850 also helps to index the position of sleeve 848 within container 812. That is, sleeve 848 is fully inserted within outer container 846 when lip 850 engages the top of outer container 846.

In one arrangement, sleeve 848 is removable from outer container 846 thereby allowing for easy cleaning of sleeve 848, such as by throwing the sleeve 848 in the dishwasher. In another arrangement, sleeve 848 is non-removable from outer container 846, thereby ensuring a proper and enduring seal is made between sleeve 848 and outer container 846, thereby preventing any liquid from getting between sleeve 848 and container 812.

Lid Assembly 814:

Lid assembly 814 is configured to be inserted into and attached to upper end 836 of container 812. Lid assembly 814 is formed of any suitable size shape and design and serves to close the open top 842 of container 812 as well as to facilitate drinking out of the portable coffee brewing system 810. In the arrangement shown, as one example, lid has a main body 856, lip 858, a collar 860, a pour spout 862, and a cover 866, among other components.

Main Body 856:

Main body 856 is formed of any suitable size, shape and design and is configured to cover open top 842 and house pump 824 and electrical components 830, among other components of system 10. In the arrangement shown, as one example, main body 856 has a generally cylindrical shape having a top 868, a bottom 870, and a cylindrical sidewall 872 extending between the top 868 and the bottom 870. In this example arrangement, main body 856 has a hollow interior 874 defined by top 868, bottom 870, and cylindrical sidewall 872.

Lip 858:

Lip 858 is formed of any suitable size shape and design and is configured to connect to and engage the upper end 836 of container 812. In this example arrangement, lip 858 positioned at the bottom 870 of main body 856 of lid assembly 814. In the arrangement shown, lip 858 extends outward a distance from the sidewall 872 of the main body 856 of lid assembly 814 thereby forming a shoulder having a larger diameter than the diameter of the exterior sidewall of lid assembly 814. This lip 858 serves as a stop surface that is configured to receive and engage upper end 836 of container 812.

Collar 860:

Collar 860 is formed of any suitable size, shape and design and is configured to engage and couple lid assembly 814 to the upper end 836 of container 812. In the arrangement shown, collar 860 is a cylindrical member extends downward from lip 850 and is configured to fit around upper end 836 of container 812. In this example arrangement, the interior surface of collar 860 includes threads that engages threads in the exterior surface of the upper end 836 of container 812. In this way, collar 860 selectively connects lid assembly 814 to container 812 by rotating collar 860 in a first direction, and collar 860 selectively disconnects lid assembly 814 from container 812 by rotating collar 860 in a second direction opposite the first direction. In one arrangement a sealing member (not shown), such as an O-ring, a gasket, a seal or like sealing component, is positioned between the lower edge of lip 858 and upper end 836 of container 812 thereby sealing this connection.

However, the embodiments are not so limited. Rather, it is contemplated that lid assembly 814 may connect with upper end 836 of container 812 using any structure or method. For example, in addition to or in lieu of thread, collar 860 may include a seal (not shown) that provides a frictional connection and seal between the inner surface of collar 860 and the outer surface of container 812. As one alternative example, in one or more arrangements, collar 860 may be configured to fit within upper end 836 of container 812 so an outer surface of collar 860 engages with and connects to an inter surface of container 812. In this alternative arrangement, the exterior surface of collar 860 may include threads that engages threads in the interior surface of the upper end 836 of container 812 to facilitate connecting collar 860 with container 812.

Pour Spout 862 and Cover 866:

Pour spout 862 is formed of any suitable size, shape, or design and is configured to provide a fluidic pathway through lid assembly 814 to hollow interior 844 of container 812 to facilitate drinking of the contents by a user. In the arrangement shown, as one example, pour spout 862 provides a fluidic channel extending from top 868 of main body 856 of lid assembly 814, proximate to sidewall 872, to bottom 870 of main body 856.

In this example arrangement, pour spout 862 of lid assembly 814 is selectively opened and closed by cover 866. Cover 866 is formed of any suitable size, shape, or design, and is configured to selectably open and close pour spout 862. In the arrangement shown, as one example, cover 866 is a generally rectangular shaped door configured to slide in a first direction, to cover and close pour spout 862, and slide in the opposite direction to uncover pour spout 862, however any other form of a cover 866 is hereby contemplated for use.

Tube Member 820:

Tube member 820 is formed of any suitable size shape and design and is configured to provide a fluidic connection between pump 824 in lid assembly 814 to basket 822. In the arrangement shown, tube member 820 has a generally cylindrical shape having an upper end 878, a lower end 880, and a cylindrical sidewall 882 extending downward from the upper end 878, connected to bottom 870 of lid assembly 815, to the lower end 880. In this example, tube member 820 has a diameter that is smaller than that of sidewall 834 of container 812 so as to permit tube member 820 to be inserted into hollow interior 844 of container 812.

Basket 822:

In this example arrangement, basket 822 is connected to lower end 880 of tube member 820. Basket 822 is formed of any suitable size shape and design and is configured to hold coffee grounds 864 during the brewing process, while permitting liquids to flow between hollow interior 844 of container 812 and basket 822 and between tube member 820 and basket 822.

In the arrangement shown, as one example, basket 822 has an open upper end 884, a bottom 886, and a cylindrical sidewall 888 forming a hollow interior 890. In this example arrangement, upper end 888 is configured to fit over lower end 880 of tube member 820 to facilitate selectable connection of basket 822 thereto. In one or more arrangements, for example, the interior surface of upper end 888 may include threads that engages threads in the exterior surface of the lower end 880 of tube member 820. In this way, basket 822 selectively connects to lower end 880 of tube member 829 by rotating basket 822 in a first direction, relative to tube member 820, and basket 822 selectively disconnects from lower end 880 of tube member 829 by rotating basket 822 in a second direction opposite the first direction.

When basket 822 is detached from tube member 820, open upper end 888 permits coffee grounds to be inserted into or removed from hollow interior 890. In the example shown, a screen filter 892 or filter material is attached at the bottom of tube member 820 to prevent coffee grounds in basket 822 from entering tube member 820 while allowing liquid to pass through it. Alternatively, screen filter 892 may be formed as part of basket 822 (e.g., as a top lid of basket). In the arrangement shown, basket 822 includes one or more screen filters 894 which provide a fluidic pathway between basket 822 and hollow interior 844 of container 812 while holding coffee grounds within basket 822. However, embodiments are not limited to the positioning of screen filters 892 and 894 shown in the figures. Rather, it is contemplated that in one or more arrangements, basket may include additional screen filters positioned in other locations, such as in the bottom 886 of basket 822.

Pump 824:

Pump 824 is fluidically connected to upper end 878 of tube member 820. Pump 824 is formed of any suitable size shape and design and is configured to facilitate movement of fluids during brewing. In some various arrangements pump 824 may be implemented using various types of pumps including but not limited to for example, positive displacement pumps (e.g., bellows pumps, plunger pumps, diaphragm pumps, piston pumps, peristaltic pump, rotary lobe pumps, rotary gear pumps, progressive cavity pumps, screw pumps, rope pumps, impeller pumps, and/or roots-type pump), impulse pumps, gravity pumps, velocity pumps (e.g., axial-flow pumps, radial-flow pumps), valveless pumps, and/or any other device capable of inducing movement of fluid within tube member 820. In the arrangement shown, as one example, pump 824 is a reciprocating pump that alternates between drawing air out from upper end 878 of tube member 820 and pushing air into upper end 878 of tube member 820.

When air is drawn out from tube member 820, lower pressure in tube member 820 draws liquid in hollow interior 844 of container 812, into basket, through coffee grounds, and into lower end 880 of tube member 820. When air is pushed into tube member 820, higher pressure in tube member 820 pushes liquid back in the opposite direction into hollow interior 844 of container 812. In this manner, liquid is moved back and forth through coffee grounds during the brew process. Since coffee is not passed through pump 824 in this example arrangement, cleaning of pump 824 is not required to maintain smooth and sanitary operation.

Check Valve 826:

In one or more arrangements, system 810 includes a check valve 826 positioned in tube member 820. Check valve 826 is formed of any suitable size shape and design and is configured to prevent liquid in the tube member 820 from reaching pump 824, while permitting pump 824 to move air in both directions. In one or more example arrangements, check valve is a one way watertight valve that permits air to flow through valve when closed. In another example arrangement, check valve is a flexible membrane or balloon fitted within tube member 820 and is configured to provide a water tight seal. Flexibility of such membrane permits pump 824 to move a limited amount of air back and forth to a from upper end 878 of tube member 820. In yet another example arrangement, check valve 826 may be a screen filter material having screen size suitable to prevent liquid water from flowing through such screen filter material while permitting air to flow through such screen filter material. However, it is contemplated that check valve 826 may be implemented using any other means or method to permit flow of air while inhibiting flow of liquids.

While some arrangements may be primarily described with reference to operation in which pump 824 moves fluids back and forth through basket 822, embodiments are not so limited. Rather, it is contemplated that in some various embodiments pump 824 may be configured and arranged to move fluids in container 812, through pump 824 and coffee grounds in basket 822 in a single direction in circular pathway.

Heating Element 832 and Cooling Element 833:

In some arrangements, portable coffee brewing system 810 is configured to optionally perform hot brewing of coffee. In such arrangements, portable coffee brewing system 810 optionally includes a heating element 832. Heating element 832 is formed of any suitable size, shape and design configured to facilitate heating of liquid within portable coffee brewing system 810 to a desired temperature for brewing coffee. In one or more arrangements, heating element 832 may be implemented using various types of heating elements including but not limited to, for example, resistive heating elements, infrared heating elements, ultra violet heating elements, Peltier heating elements, and/or any other type of heating elements. In one or more arrangements, heating element 832 may be implemented and operated in a similar manner to heating elements 16, 248, 316, 556, and/or 656 described with reference to FIGS. 1-52.

In addition to or in lieu of heating element 832, in one or more arrangements portable coffee brewing system 810 may optionally include a cooling element 833 (not shown) configured to cool contents of container 812 to a desired temperature for brewing and/or serving. In various arrangements, cooling element 833 may be implemented using various types of cooling arrangements including but not limited to, for example, Peltier cooling, heat pump, evaporative cooling system, and/or any other system or element or cooling.

In some various arrangements, heating element 832 and/or cooling element 833 may be positioned to directly heat/cools liquids (e.g., inside of container 812, tube member 820 or any other location where liquids are present or transported to) or may be indirectly heated (e.g., by heating inner sleeve 848 or another component of system 810 that contacts liquids held within system 810). In the arrangement shown, as one example, heating element 832 and/or cooling element 833 is located proximate the bottom 840 of container 812 between outer container 846 and inner sleeve 848. At this location, heating element 832 and/or cooling element 833 is configured to indirectly heat/cool contents of container 812 by heating/cooling sleeve 848.

Alternatively, no heating element or cooling element is present and in this arrangement, the system 810 brews at ambient temperature, or at the temperature of the fluid placed within hollow interior 844. In this arrangement, system 810 may brew what is known as cold brewed coffee.

Electrical Components 830:

In one or more arrangements, pump 824, heating element 832 (if included), and/or other components of system 810 are controlled by electrical components 830. Electrical components 830 are formed of any suitable size, shape, design, technology or arrangement, and are configured to operate pump 824, heating element 832 (if included), status indicators and/or other components of system 810 to facilitate brewing of coffee.

In some various arrangements, electrical components 830 may include but are not limited to, for example, controls 900 (e.g., switches, buttons, and/or other user inputs), sensors 902 (e.g. temperature sensors, flow rate sensors, voltage sensors, and/or other type of sensor), a microprocessor 904, status indicators 906 (e.g. LEDs, displays, alarms, and/or any other type of status indicator), and/or communication circuits 908 (e.g., wired and/or wireless transmitters, receivers, antennas, and/or any other communication circuit).

In some various arrangements, the controls 900, sensors 902, microprocessor 904, status indicators 906, communication circuit 908 and other electrical components 830 of system 810 may be configured, arranged, and operated, for example, as described with reference to switch 122, sensors 124, and microprocessor 126; switch 256, sensor 278, microprocessor 280, and controller 282; microprocessor 352, transceiver 354, sensor 360, circuit board 362, antenna 364, and switch 366; display 398, alarm 400, application, 404, and computing device 406; and/or button 624, microprocessor 626, and timer 628.

Controls 900:

Controls 900 may be formed of any suitable size, shape and design and is configured to facilitate user control of system 810. In some various arrangements, controls 900 may include but are not limited to switches, buttons, joysticks, touch pads touch screens, and/or any other device for user input. In the arrangement shown, as one example, controls 900 are implemented as a one or more buttons located on the exterior surface of the top 868 of main body 856 of lid assembly 814. However, embodiments are not so limited. Rather, it is contemplated that controls 900 may additionally or alternatively include any other type of control and/or may be located at any position of system 810. Additionally or alternative, controls may be provided by a device (e.g., a smartphone or Bluetooth controller) that is communicatively connected to system 810. In various arrangements, controls 900 may be used to start or stop the brewing process, configure brewing parameters (e.g., temperature, brew duration, etc.), start or stop a timer 628 associated with the brewing process, configure alert and notification options, and/or set any other options of system 810.

Sensors 902:

Sensors 902 are formed of any suitable size shape and design and is configured to sense one or more conditions of the system 810. In some various arrangements, sensors 902 may include but is not limited to a temperature sensor, flow rate sensor, voltage sensor, and/or other type of sensor. In one or more example arrangement, sensors 902 are temperature sensors, such as a thermometer or the like, however any other form of a sensors 902 is hereby contemplated for use. On this example arrangement, sensor 902 is communicatively connected to microprocessor 904 by wired or wireless connection (e.g., via Bluetooth, WIFI, cellular networks, and/or other communication networks).

In the arrangement shown, as one example, sensor 902 is proximate the bottom 840 of container 812 between outer container 846 and inner sleeve 848. However, arrangements are not so limited. Rather, it is contemplated that in some various arrangements sensor 902 may be located at any position of system 810 suitable for sensing the one or more conditions of system 810.

In another arrangement, as one example, sensor 902 is able to determine water level on the inside of the tube member 820 and/or on the inside of the container 812. The sensor is within the top of the tube member 820 and/or proximate the top of the container 812. When the water level reaches the sensor 902, information is sent which initiates the change in direction of flow.

Microprocessor 904:

Microprocessor 904 receives information from controls 900 and/or sensor 902 and processes this information to facilitate operation of pump 824 and/or other components of portable coffee brewing system 810 and brewing of coffee. Microprocessor 904 may be formed of any suitable size, shape and design and is configured to control the functions of all the processing and controls of system 810. In the arrangement shown, as one example, microprocessor 904 is a multipurpose digital integrated circuit that accepts binary data as input, processes it according to instructions stored in its memory, and provides results as output. Microprocessor 904 may contain combinational logic and/or sequential digital logic. Microprocessor 904 operates on numbers and symbols.

In the arrangement shown, as one example, microprocessor 904 may be integrated with controls 900, pump 824 and/or other electrical components 830 of system 810. While microprocessor 904 is shown as working with one pump and one external power source, in the arrangement as is shown, any number of pumps, power sources, timers, indicators, or other components which can be integrated, controlled and/or tied into the functionality of a microprocessor 904 are hereby contemplated for use.

In the arrangement shown, a microprocessor 904, with the integration of a whole CPU (computer processing unit), is on one single chip to greatly reduce the cost and to greatly reduce the power consumed by portable coffee brewing system 810. This greatly increases the efficiency of system 810 and makes it possible for portable coffee brewing system 810 to be powered by lower power output sources.

Additionally, other power sources are hereby contemplated for use, such as, a hardline (or common power outlet), a cell phone, a USB cord connected to computer or other electronic, a small solar power source, a USB connected to a campfire power generator, or a small power cell (or battery) housed within system 810 or outside of system 810.

Although embodiments are primarily described with reference to use of a microprocessor 904 to control operation of components of portable coffee brewing system 810, embodiments are not so limited. Rather, it is contemplated that in various arrangements, components of portable coffee brewing system 810 may be controlled by any type of logic circuit including but not limited to control discreet logic circuits (e.g., ASIC) and/or programmable logic circuits such as programmable integrated circuits (e.g., field programmable gate arrays and/or programmable ICs) and/or processing circuits (e.g., a computer, microcontroller, system-on-chip, smart phone, server, and/or cloud computing resources).

Status Indicator 906:

The status indicator 906 may be formed of any suitable size, shape and design and is configured to display information related to the portable coffee brewing system 810. In various arrangements, status indicator 906 may communicate status using various means for communication including but not limited to, for example, LEDs, displays, audible alerts, SMS messages, push notifications, emails, and/or any other type of status indicator.

In the arrangement shown, as one example, status indicator 906 is implemented as a LED located on the exterior surface of the top 868 of main body 856 of lid assembly 814. However, embodiments are not so limited. Rather, it is contemplated that status indicator 906 may additionally or alternatively include any other type of status indicator and/or may be located at any position of system 810. Additionally or alternative, status indicator 906 may be provided by a device (e.g., a smartphone) that is communicatively connected to system 810.

In some various arrangements, microprocessor 904 may operate status indicator 906 to display the status of the system, the temperature of the fluid within container 812, the amount of time the system 810 is set to brew for, the temperature the system 810 is set to brew at, the amount of brewing time left, the current time, the time at which brewing will start, the amount of time that must pass before brewing will start, or any other information relevant to the system 810.

Communication Circuit 908:

In some arrangements, portable coffee brewing system 810 includes a communication circuit 908. Communication circuit 908 is formed of any suitable size, shape, or design, and is configured to facilitate communication with one or more to facilitate remote control and/or monitoring of portable coffee brewing system 810. In one or more arrangements, as one example, communication circuit 908 includes a transmitter (for one way communication) or transceiver (for two way communication). In one or more arrangements, communication circuit 908 is connected to antenna, which may be a monopole antenna, dipole antenna, a loop antenna, a fractal antenna, or any other form of an antenna, to facilitate transmission and/or reception of signals in the form of electromagnetic radio frequencies. Additionally or alternatively, in one or more arrangements, communication circuit 908 may be connected to a light emitting diode (or other light emitting device) and/or a light sensor to facilitate communication of signals using light (e.g., infrared communication). Communication circuit 908 may be configured to communicate using various wired and/or wireless communication technologies and protocols over various networks and/or mediums including but not limited to, for example, RFID, Near Field Communication (NFC), infrared and optical communication, 802.3/Ethernet, 802.11/WIFI, Wi-Max, Bluetooth, Bluetooth low energy, UltraWideband (UWB), 802.15.4/ZigBee, ZWave, GSM/EDGE, UMTS/HSPA+/HSDPA, CDMA, LTE, FM/VHF/UHF networks, and/or any other communication protocol, technology or network.

In some various arrangements, communication circuit 908 may be configured to operate as described with reference to transceiver 354 and antenna 364, to facilitate remote operation of portable coffee brewing system 810 by an application (e.g., as described with reference to application 404) running on a handheld device, such as a cell phone, tablet, laptop or other computing device communicatively connected to portable coffee brewing system 810 via communication circuit 908.

In Operation:

In operation, a user desiring to use the portable coffee brewing system 810 removes lid assembly 814 from upper end 836 of container 812. In the arrangement shown, as one example, lid assembly 814 is removed from upper end 836 of container 812 by rotating collar 860 of lid assembly 814 relative to container 812.

In the arrangement shown, basket 822 has an open upper end 888, a bottom 890, and a cylindrical sidewall 888 forming a hollow interior. In this example arrangement, upper end 888 is configured to fit over lower end 880 of tube member 820 to facilitate selectable connection of basket 822 thereto. In one or more arrangements, for example, the interior surface of upper end 888 may include threads that engage threads in the exterior surface of the lower end 880 of tube member 820. In this way, basket 822 selectively connects to lower end 880 of tube member 829 by basket 822 in a first direction, and basket 822 selectively disconnects from lower end 880 of tube member 829 by rotating basket 822 in a second direction opposite the first direction.

With lid assembly 814 removed, basket 822 is removed from lower end 880 of tube member 820 to permit user to remove old coffee grounds, clean basket 822, and/or add fresh coffee grounds to basket 822. In the arrangement shown, as one example, basket 822 is removed from lower end 880 of tube member 820 by rotating basket 822 relative to tube member 820. Once fresh coffee grounds are added to basket 822, basket 822 is reattached to lower end 880 of tube member 820 by placing an upper end of basket 822 over lower end 880 of tube member 820 and rotating basket 822 in the opposite direction.

Water is added to hollow interior 844 of container 812 through open top 842. Once container 812 is filled with water, lid assembly 814 is reattached to upper end 836 of container 812 by inserting lower end 880 of tube member 820 and basket 822 down through open top of 842 of container 812 until submerged into the water within hollow interior 844 of container 812.

In this position, lid assembly 814 is rotated relative to container 812, which causes threads of collar 860 of lid assembly 814 to engage threaded of container and tighten down lid assembly 814 until the lip 858 of lid assembly 814 is sealed against upper end 836 of container 812. In one or more arrangements, a compressible member, such as a plastic or rubber or composite O-ring is placed at the intersection between container 812 and lid assembly 814 to ensure proper sealing. In this condition, the portable coffee brewing system 810 is both portable as well as ready to brew a fresh cup of coffee.

When the user is ready to begin brewing, they plug a power lead (e.g., similar to power lead 132 or 684) into an external power source (e.g., a power socket) to power portable coffee brewing system 810. However, in one or more embodiments, portable coffee brewing system 810 may include an internal power supply (e.g., a battery). In such embodiments, a user may brew coffee without needing to connect the power lead of portable coffee brewing system 810 into an external power source.

Once power is provided to portable coffee brewing system 810 (if required), the user turns the brewing function on by use of controls 900 (e.g., switch, button or other control of electronic components 830). If portable coffee brewing system 810 includes a heating element 832, the user may select between cold brew and hot brew settings.

In one or more arrangements, user may additionally or alternatively select a number of brew options including but not limited to length of brewing time, time to start brewing, brewing and/or serving temperature (if heating element 832 or cooling element 833 is included), alert options (e.g., audible alert, led alert, txt message, push notification, and/or other mechanism for notification) and/or any other parameter relating to brewing of coffee.

If available and required for the selected brewing options, microprocessor 904 activates heating element 832 or cooling element 833 thereby heating or cooling the water within hollow interior 844 of container 812. As this is occurring, the sensor 902 senses the water temperature and transmits this information to microprocessor 904. Once microprocessor 904 detects that the pre-set brewing temperature has been reached (such as for example between 198° F. and 200° F. for hot brewing of coffee) microprocessor 904 activates pump 824 to begin brewing. If system 810 does not include heating element 832 or cooling element 833, or temperature adjustment of water is not required microprocessor 904 may activate pump 824 without heating or cooling of the water (e.g., brewing coffee with water at room temperature).

In the arrangement shown, as one example, pump 824 alternates between drawing air out from upper end 878 of tube member 820 and pushing air into upper end 878 of tube member 820 when activated. When air is drawn out from tube member 820 by pump 824, lower pressure in tube member 820 draws liquid in hollow interior 844 of container 812, into basket, through coffee grounds, and into lower end 880 of tube member 820. When air is pushed into tube member 820 by pump 824, higher pressure in tube member 820 pushes liquid back in the opposite direction into hollow interior 844 of container 812. To determine when to change the direction of the fluid flow, sensors 902 located proximate the upper end of the container 812 and/or within the upper end of the tube member 820 detect when fluid has reached them and send information which initiates the change. In this manner, liquid is moved back and forth through coffee grounds to facilitate brewing. In this way, system 810 oscillates between pulling and pushing an amount of water through the coffee grounds. Or, said another way, system 810 iterates between pulling and pushing an amount of water through the coffee grounds.

In another embodiment, liquid is moved back and forth through coffee grounds based on a timer 628. In this way, system 810 oscillates between pulling and pushing an amount of water through the coffee grounds based on set amounts of time. For example, the timer 628 may be set to pull in fluid for 30 seconds and then switch to pushing out fluid for 30 seconds. The timer 628 may also be set to repeat that process for a certain amount of time.

In another embodiment, sensors 902 are float sensors 910. In this manner, liquid is moved back and forth through coffee grounds based on a float sensor 910 which sits above the fluid. In this way, system 810 oscillates between pulling and pushing based on the engagement of the float sensor 910. For example, the system 810 may pull in fluid to the tube raising the float sensor 910. Once the float sensor 910 hits the top, it is engaged and triggers the pushing of fluid out of the tube member 820. Fluid will then start entering the container 812 thereby pushing a float sensor 910 in the container 812 toward the top. Once the float sensor 910 in the container 812 reaches the top, the float sensor 910 is engaged and triggers the reversal of flow.

The process is repeated until brewing is completed and pump 824 is deactivated. In some arrangements, microprocessor 904 may be configured to deactivate pump 824 automatically when brewing is completed (e.g., after coffee has been brewed for a pre-set amount of time). It is recognized that time required for brewing depends upon the temperature at which coffee is brewed. In one or more arrangements, microprocessor 904 may be configured to brew coffee for shorter first time duration when set for hot brewing of coffee and brew coffee for a longer second time duration when set for cold brewing of coffee. Additionally or alternatively, microprocessor 904 may be configured to brew coffee for a duration of time determined as a function of a brewing temperature specified by the user. Additionally or alternatively, microprocessor 904 may be configured to brew coffee for a user specified duration of time. Additionally or alternatively, in some arrangements microprocessor 904 may be configured to deactivate pump 824 in response to manual input by user via controls 900 of portable coffee brewing system 810.

After the coffee is fully brewed, the user unplugs the power lead (if included and plugged into an external power source) and slides the cover 866 rearward thereby exposing the pour spout 862 which allows the user to drink directly from the container 812.

Once empty, the user may clean the system by removing lid assembly from upper end 836 of container 812 and removing basket 822 from lower end 880 of tube member 820. Used coffee grounds in hollow interior 890 of basket 822 are discarded. Container 812, basket 822, tube member 820 can be washed (e.g., with soap and water or placing them in a dishwasher). In some arrangements, sleeve 848 may be detached and removed from outer container 846 for cleaning separately from outer container 846 of container 812. Once clean, basket 822 may be reattached to tube member 820 of lid assembly, sleeve 848 reattached to container 812 (if applicable), lid assembly 814 reattached to upper end of container 812, and the system 810 is ready to be used again.

Because the arrangement is susceptible to being tipped over, a tilt sensor 912 may also be included. Tilt sensor 912 may be configured to detect when the system is not upright and, upon detection, immediately stop the brewing process.

From the above discussion, it will be appreciated that portable coffee brewing system 810 presented improves upon the state of the art. That is, the portable coffee brewing system shown and described herein: is easy to use; brews a pleasing and high quality cup of coffee; is inexpensive to manufacture; has an intuitive design; has a robust and durable design; has a long and useful life; has a simple and ergonomic design; allows a user to make a fresh cup of coffee whenever and wherever they so desire; allows a user to load the device with water and coffee grounds at one time and one place while allowing for brewing of the coffee at another time and another place; uses what are known as K-cups; has an appealing design; is safe to use; is easy to clean; and does not leak; and/or that requires little maintenance, among countless other features and advantages.

It will be appreciated by those skilled in the art that other various modifications could be made to the device without parting from the spirit and scope of this disclosure. All such modifications and changes fall within the scope of the claims and are intended to be covered thereby.

What is claimed:

1. A portable coffee brewing system, comprising:
    a container;
       the container having a sidewall extending between an upper end and a lower end;
       a bottom connected adjacent the lower end of the sidewall;
       wherein the container defines a hollow interior;
    a lid assembly connected adjacent the upper end of the container;
       the lid assembly having a top, a bottom, a sidewall, and a hollow interior;
    a pump positioned in the hollow interior of the lid assembly;
    a tube;
       the tube having an upper end and a lower end;
       the tube fluidically connected to the pump;
    a basket;
       the basket fluidically connected to the tube;
       the basket having a hollow interior configured to hold an amount of coffee grounds;
       wherein when activated, the pump moves fluid via the tube to cause liquid in the hollow interior of the container to be moved through the amount of coffee grounds in the hollow interior of the basket thereby brewing coffee.

2. The system of 1, wherein the basket has a first screen providing a fluidic passageway between the hollow interior of the basket and the hollow interior of the container,
    wherein the basket has a second screen providing a fluidic passageway between the hollow interior of the basket and the tube.

3. The system of 1, wherein the basket is fluidically connected to the lower end of the tube.

4. The system of 1, further comprising, a device configured and arranged to prevent liquid in the tube from contacting the pump while permitting air in the tube to be drawn into pump.

5. The system of 1, wherein operation of the pump is configured to alternate between drawing air in through the upper end of the tube and blowing air into the upper end of the tube.

6. The system of 1, wherein the basket has a first screen providing a fluidic passageway between the hollow interior of the basket and the hollow interior of the container,
    wherein the basket has a second screen providing a fluidic passageway between the hollow interior of the basket and the tube;
    wherein operation of the pump is configured to cause liquid in the hollow interior of the container to be sequentially drawn into the basket through the first screen and pushed out of basket through the first screen into the hollow interior of the container.

7. The system of 1, further comprising a pour spout positioned in the lid assembly, wherein the pour spout is opened and closed by a slidable cover.

8. The system of 1, further comprising a heating element.

9. The system of 1, further comprising a heating element, wherein when activated, the heating element heats fluid within the hollow interior of the container.

10. The system of 1, further comprising a cooling element.

11. The system of 1, wherein the pump is powered by a battery positioned in the hollow interior of the lid assembly.

12. The system of 1, wherein the basket is removable from the end of the tube.

13. The system of 1, wherein basket is configured to threadably engage the lower end of the tube.

14. The system of 1, wherein the basket is configured to frictionally engage the lower end of the tube.

15. The system of 1, wherein the lid assembly is removable from the upper end of the container.

16. The system of 1, wherein the pump is a peristaltic pump.

17. The system of 1, further comprising a control input, wherein the control input is configured to facilitate the activation and deactivation of the pump.

18. The system of 1, further comprising a timer, wherein the timer is configured to facilitate the timed activation and deactivation of the pump.

19. The system of 1, further comprising a microprocessor, wherein the microprocessor is configured to facilitate operation of the system.

20. A portable coffee brewing system, comprising:
    a container;
       the container having a sidewall extending between an upper end and a lower end;
       a bottom connected adjacent the lower end of the sidewall;
       wherein the container defines a hollow interior;
    a lid assembly connected adjacent the upper end of the container;
       the lid assembly having a top, a bottom, a sidewall;
    a reciprocating pump;
    a basket;
       the basket fluidically connected to the reciprocating pump;
       the basket having a hollow interior configured to hold an amount of coffee grounds;
    wherein when activated, the reciprocating pump alternates between moving fluid in a first direction, to cause liquid in the hollow interior of the container to be drawn into the basket from the hollow interior of the container, and moving fluid in a second direction, to cause liquid in the basket to be pushed into the hollow interior of the container.

21. The system of 20, further comprising sensors, wherein the sensors are configured to detect fluid level and initiate a change in direction of flow.

22. The system of 20, further comprising tilt sensors, wherein the tilt sensors are configured to detect whether the system is no longer upright and immediately deactivate the reciprocating pump.

23. The system of 20, further comprising a timer, wherein the timer is configured to control operation of the reciprocating pump.

24. The system of 20, further comprising a tube;
    the tube providing fluidic connection between the reciprocating pump and the basket.

25. The system of 20, further comprising, a device configured and arranged to prevent liquid from contacting the reciprocating pump while permitting air in the tube to be drawn into reciprocating pump.

26. The system of 20, further comprising a pour spout positioned in the lid assembly, wherein the pour spout is opened and closed by a slidable cover.

27. The system of 20, further comprising a heating element.

28. The system of 20, further comprising a heating element, wherein when activated, the heating element heats fluid within the hollow interior of the container.

29. The system of 20, further comprising a cooling element.

30. The system of 20, wherein the reciprocating pump is powered by a battery.

31. The system of 20, wherein the lid assembly is removable from the upper end of the container.

32. The system of 20, wherein the basket is configured to frictionally engage the lower end of the tube.

33. The system of 20, further comprising a control input, wherein the control input is configured to facilitate the activation and deactivation of the reciprocating pump.

34. The system of 20, further comprising a timer, wherein the timer is configured to facilitate the timed activation and deactivation of the reciprocating pump.

35. The system of 20, further comprising a microprocessor, wherein the microprocessor is configured to facilitate operation of the system.

* * * * *